(12) United States Patent
Mudd et al.

(10) Patent No.: US 10,782,165 B2
(45) Date of Patent: Sep. 22, 2020

(54) FLOW CONTROL SYSTEM, METHOD, AND APPARATUS

(71) Applicant: Reno Technologies, Inc., Wilmington, DE (US)

(72) Inventors: Daniel T. Mudd, Reno, NV (US); Patti J. Mudd, Reno, NV (US)

(73) Assignee: ICHOR SYSTEMS, INC.

( * ) Notice: Subject to any disclaimer, the term of this patent is extended or adjusted under 35 U.S.C. 154(b) by 197 days.

(21) Appl. No.: 15/939,649

(22) Filed: Mar. 29, 2018

(65) Prior Publication Data

US 2018/0216976 A1  Aug. 2, 2018

Related U.S. Application Data

(63) Continuation of application No. 15/087,130, filed on Mar. 31, 2016, now Pat. No. 9,958,302, which is a continuation-in-part of application No. 14/854,043, filed on Sep. 15, 2015, which is a continuation of application No. 13/590,152, filed on Aug. 20, 2012, now Pat. No. 9,188,989, said application No.
(Continued)

(51) Int. Cl.
| | |
|---|---|
| *B01F 5/06* | (2006.01) |
| *G01F 1/36* | (2006.01) |
| *F16K 37/00* | (2006.01) |
| *F16K 47/08* | (2006.01) |
| *F16K 27/00* | (2006.01) |
| *G01F 1/88* | (2006.01) |
| *G01F 15/00* | (2006.01) |
| *G05D 7/06* | (2006.01) |

(52) U.S. Cl.
CPC .............. *G01F 1/36* (2013.01); *F16K 27/003* (2013.01); *F16K 37/005* (2013.01); *F16K 47/08* (2013.01); *G01F 1/88* (2013.01); *G01F 15/002* (2013.01); *G01F 15/005* (2013.01); *G05D 7/0635* (2013.01)

(58) Field of Classification Search
CPC .. G01F 1/36; G01F 5/00; G01F 5/005; G05D 7/0647; Y10T 137/7761
See application file for complete search history.

(56) References Cited

U.S. PATENT DOCUMENTS

| | | |
|---|---|---|
| 2,666,297 A | 1/1954 | Skousgaard |
| 3,271,994 A | 9/1966 | Fournier et al. |
| (Continued) | | |

FOREIGN PATENT DOCUMENTS

| | | |
|---|---|---|
| CN | 1816733 | 8/2006 |
| CN | 102354228 | 2/2012 |
| (Continued) | | |

OTHER PUBLICATIONS

US 8,746,051 B2, 06/2014, Yasuda et al. (withdrawn)

*Primary Examiner* — Reinaldo Sanchez-Medina
(74) *Attorney, Agent, or Firm* — The Belles Group, P.C.

(57) ABSTRACT

In one embodiment, a system for controlling the delivery of process gas has a first mass flow device and a pressure transducer. The first mass flow device has a substrate block with an inlet conduit and an outlet conduit. A proportional valve having a first valve body is mounted to the substrate block and fluidly connected to the inlet conduit. A characterized restrictor is fluidly connected to the proportional valve and the outlet conduit.

20 Claims, 42 Drawing Sheets

Related U.S. Application Data

15/087,130 is a continuation-in-part of application No. 14/022,165, filed on Sep. 9, 2013, now Pat. No. 9,690,301, said application No. 15/087,130 is a continuation-in-part of application No. 14/183,494, filed on Feb. 18, 2014, now Pat. No. 9,448,564, said application No. 15/087,030 is a continuation-in-part of application No. 14/887,334, filed on Oct. 20, 2015, which is a continuation-in-part of application No. 14/700,125, filed on Apr. 29, 2015, now abandoned, and a continuation-in-part of application No. 13/590,152, filed on Aug. 20, 2012, now Pat. No. 9,188,989.

(60) Provisional application No. 61/575,359, filed on Aug. 20, 2011, provisional application No. 61/743,748, filed on Sep. 10, 2012, provisional application No. 61/850,503, filed on Feb. 15, 2013, provisional application No. 61/996,146, filed on Apr. 29, 2014, provisional application No. 61/575,359, filed on Aug. 20, 2011.

(56) References Cited

U.S. PATENT DOCUMENTS

| | | |
|---|---|---|
| 3,335,748 A | 8/1967 | Klemm et al. |
| 3,453,861 A | 7/1969 | Levasseur |
| 3,491,946 A | 1/1970 | Muller |
| 3,504,692 A | 4/1970 | Goldstein |
| 3,559,482 A | 2/1971 | Baker et al. |
| 3,570,807 A | 3/1971 | Sturman et al. |
| 3,807,456 A | 4/1974 | Colletti |
| 3,814,341 A | 6/1974 | Dent et al. |
| 3,841,520 A | 10/1974 | Bryant et al. |
| 3,910,113 A | 10/1975 | Brown |
| 4,015,626 A | 4/1977 | Thordarson |
| 4,096,746 A | 6/1978 | Wilson et al. |
| 4,118,009 A | 10/1978 | Chmura |
| 4,203,465 A | 5/1980 | Rissi |
| 4,253,156 A | 2/1981 | Lisle et al. |
| 4,275,752 A | 6/1981 | Collier et al. |
| 4,304,263 A | 12/1981 | Choate |
| 4,315,523 A | 2/1982 | Mahawili et al. |
| 4,327,757 A | 5/1982 | Weevers |
| 4,406,161 A | 9/1983 | Locke et al. |
| 4,462,915 A | 7/1984 | Friedman |
| 4,576,043 A | 3/1986 | Nguyen |
| 4,589,440 A | 5/1986 | Panet |
| 4,718,443 A | 1/1988 | Adney et al. |
| 4,741,359 A | 5/1988 | Siebald |
| 4,796,651 A | 1/1989 | Ginn et al. |
| 4,858,643 A | 8/1989 | Vavra et al. |
| 4,888,117 A | 12/1989 | Brown et al. |
| 4,904,285 A | 2/1990 | Yamada et al. |
| 4,918,995 A | 4/1990 | Pearman et al. |
| 5,003,810 A | 4/1991 | Jepson et al. |
| 5,044,199 A | 9/1991 | Drexel et al. |
| 5,052,363 A | 10/1991 | Stiles |
| 5,062,446 A | 11/1991 | Anderson |
| 5,080,131 A | 1/1992 | Ono et al. |
| 5,100,100 A | 3/1992 | Benson et al. |
| 5,100,551 A | 3/1992 | Pall et al. |
| 5,114,447 A | 5/1992 | Davis et al. |
| 5,123,439 A | 6/1992 | Powers |
| 5,129,418 A | 7/1992 | Shimomura et al. |
| 5,152,483 A | 10/1992 | Maeng |
| 5,159,951 A | 11/1992 | Ono et al. |
| 5,161,576 A | 11/1992 | Hekkert et al. |
| 5,187,771 A | 2/1993 | Uchida |
| 5,187,972 A | 2/1993 | Defriez |
| 5,190,068 A | 3/1993 | Philbin |
| 5,259,243 A | 11/1993 | Drexel et al. |
| 5,280,773 A | 1/1994 | Becker |
| 5,285,673 A | 2/1994 | Drexel et al. |
| 5,297,427 A | 3/1994 | Shambayati |
| 5,305,638 A | 4/1994 | Saghatchi et al. |
| 5,311,762 A | 5/1994 | Drexel |
| 5,321,992 A | 6/1994 | Mudd et al. |
| 5,325,705 A | 7/1994 | Tom |
| 5,329,966 A | 7/1994 | Fenimore et al. |
| 5,359,878 A | 11/1994 | Mudd |
| 5,419,133 A | 5/1995 | Schneider |
| 5,439,026 A | 8/1995 | Moriya et al. |
| 5,445,035 A | 8/1995 | Delajoud |
| 5,511,585 A | 4/1996 | Lee |
| 5,542,284 A | 8/1996 | Layzell et al. |
| 5,549,271 A | 8/1996 | Kautz |
| 5,583,282 A | 12/1996 | Tom |
| 5,624,409 A | 4/1997 | Scale |
| 5,660,207 A | 8/1997 | Mudd |
| 5,669,408 A | 9/1997 | Nishino et al. |
| 5,711,786 A | 1/1998 | Hinishaw |
| 5,730,181 A | 3/1998 | Doyle et al. |
| 5,762,086 A | 6/1998 | Ollivier |
| 5,804,717 A | 9/1998 | Lucas |
| 5,816,285 A | 10/1998 | Ohmi et al. |
| 5,865,205 A | 2/1999 | Wilmer |
| 5,868,159 A | 2/1999 | Loan et al. |
| 5,904,170 A | 5/1999 | Harvey et al. |
| 5,911,238 A | 6/1999 | Bump et al. |
| 5,917,066 A | 6/1999 | Eisenmann et al. |
| 5,918,616 A | 7/1999 | Sanfilippo et al. |
| 5,935,418 A | 8/1999 | Chakrabarty et al. |
| 5,944,048 A | 8/1999 | Bump et al. |
| 5,970,801 A | 10/1999 | Ciobanu et al. |
| 5,975,126 A | 11/1999 | Bump et al. |
| 5,988,211 A | 11/1999 | Cornell |
| 6,015,590 A | 1/2000 | Suntola |
| 6,026,834 A | 2/2000 | Azima |
| 6,026,847 A | 2/2000 | Reinicke et al. |
| 6,062,246 A | 5/2000 | Tanaka et al. |
| 6,062,256 A | 5/2000 | Miller et al. |
| 6,074,691 A | 6/2000 | Schmitt et al. |
| 6,080,219 A | 6/2000 | Jha et al. |
| 6,116,269 A | 9/2000 | Maxson |
| 6,119,710 A | 9/2000 | Brown |
| 6,125,869 A | 10/2000 | Horiuchi |
| 6,138,708 A | 10/2000 | Waldbusser |
| 6,152,162 A | 11/2000 | Balazy et al. |
| 6,178,995 B1 | 1/2001 | Ohmi et al. |
| 6,269,692 B1 | 8/2001 | Drexel et al. |
| 6,303,501 B1 | 10/2001 | Chen et al. |
| 6,314,991 B1 | 11/2001 | Gill |
| 6,352,001 B1 | 3/2002 | Wickert et al. |
| 6,422,256 B1 | 7/2002 | Balazy et al. |
| 6,422,264 B2 | 7/2002 | Ohmi et al. |
| 6,425,281 B1 | 7/2002 | Sheriff et al. |
| 6,443,174 B2 | 9/2002 | Mudd |
| 6,539,968 B1 | 4/2003 | White et al. |
| 6,561,218 B2 | 5/2003 | Mudd |
| 6,564,825 B2 | 5/2003 | Lowery et al. |
| 6,631,334 B2 | 10/2003 | Grosshart |
| 6,655,408 B2 | 12/2003 | Linthorst |
| 6,712,084 B2 | 3/2004 | Shajii et al. |
| 6,752,166 B2 | 6/2004 | Lull et al. |
| 6,799,603 B1 | 10/2004 | Moore |
| 6,832,628 B2 | 12/2004 | Thordarson et al. |
| 6,868,862 B2 | 3/2005 | Shajii et al. |
| 6,881,263 B2 | 4/2005 | Lindfors et al. |
| 6,948,508 B2 | 9/2005 | Shajii et al. |
| 7,037,372 B2 | 5/2006 | Lindfors et al. |
| 7,073,392 B2 | 7/2006 | Lull et al. |
| 7,136,767 B2 | 11/2006 | Shajii et al. |
| 7,216,019 B2 | 5/2007 | Tinsley et al. |
| 7,252,032 B2 | 8/2007 | Scheffel et al. |
| 7,334,602 B2 | 2/2008 | Ahn |
| 7,337,805 B2 | 3/2008 | Brown et al. |
| 7,353,841 B2 | 4/2008 | Kono et al. |
| 7,370,664 B2 | 5/2008 | Glite |
| 7,424,346 B2 | 9/2008 | Shajii et al. |
| 7,431,045 B2 | 10/2008 | Mudd et al. |
| 7,474,968 B2 | 1/2009 | Ding et al. |
| 7,552,015 B2 | 6/2009 | Shajii et al. |
| 7,615,120 B2 | 11/2009 | Shajii et al. |

(56) References Cited

U.S. PATENT DOCUMENTS

| | | |
|---|---|---|
| 7,628,861 B2 | 12/2009 | Clark |
| 7,662,233 B2 | 2/2010 | Sneh |
| 7,680,399 B2 | 3/2010 | Buchanan et al. |
| 7,682,946 B2 | 3/2010 | Ma et al. |
| 7,693,606 B2 | 4/2010 | Ahmad et al. |
| 7,706,925 B2 | 4/2010 | Ding et al. |
| 7,717,061 B2 | 5/2010 | Ishizaka et al. |
| 7,757,554 B2 | 7/2010 | Ding et al. |
| 7,809,473 B2 | 10/2010 | Shajii et al. |
| 7,826,986 B2 | 11/2010 | McDonald |
| 7,850,779 B2 | 12/2010 | Ma et al. |
| 7,874,208 B2 | 1/2011 | Redemann et al. |
| 7,881,829 B2 | 2/2011 | Yoneda et al. |
| 7,891,228 B2 | 2/2011 | Ding et al. |
| 7,905,139 B2 | 3/2011 | Lull |
| 7,918,238 B2 | 4/2011 | Tanaka et al. |
| 7,922,150 B2 | 4/2011 | Cripps et al. |
| 7,974,544 B2 | 7/2011 | Kobayashi |
| 7,979,165 B2 | 7/2011 | Gotoh et al. |
| 8,100,382 B2 | 1/2012 | Robertson, III et al. |
| 8,104,323 B2 | 1/2012 | Yasuda |
| 8,112,182 B2 | 2/2012 | Tokuhisa et al. |
| 8,183,781 B2 | 5/2012 | Sangam |
| 8,201,989 B2 | 6/2012 | Itoh et al. |
| 8,205,629 B2 | 6/2012 | Gregor et al. |
| 8,265,795 B2 | 9/2012 | Takahashi et al. |
| 8,282,992 B2 | 10/2012 | Myo et al. |
| 8,291,857 B2 | 10/2012 | Lam et al. |
| 8,293,015 B2 | 10/2012 | Lam et al. |
| 8,340,827 B2 | 12/2012 | Yun et al. |
| 8,343,258 B2 | 1/2013 | Guan |
| 8,343,279 B2 | 1/2013 | Myo et al. |
| 8,356,623 B2 | 1/2013 | Isobe et al. |
| 8,376,312 B2 | 2/2013 | Mudd et al. |
| 8,382,897 B2 | 2/2013 | Sangam |
| 8,408,245 B2 | 4/2013 | Feldman et al. |
| 8,443,649 B2 | 5/2013 | Yasuda et al. |
| 8,460,753 B2 | 6/2013 | Xiao et al. |
| 8,504,318 B2 | 8/2013 | Mendelson et al. |
| 8,505,478 B2 | 8/2013 | Suekane et al. |
| 8,511,337 B2 | 8/2013 | Nishimura |
| 8,573,247 B2 | 11/2013 | Ushigusa et al. |
| 8,744,784 B2 | 6/2014 | Yasuda et al. |
| 8,770,215 B1 | 7/2014 | Mudd et al. |
| 8,789,556 B2 | 7/2014 | Yasuda et al. |
| 8,793,082 B2 | 7/2014 | Ding et al. |
| 8,800,589 B2 | 8/2014 | Minami et al. |
| 8,826,935 B2 * | 9/2014 | Nakada ............ G01F 1/00 137/486 |
| 8,851,105 B2 | 10/2014 | Kashima et al. |
| 8,910,656 B2 | 12/2014 | Yasuda |
| 9,027,585 B2 | 5/2015 | Smirnov |
| 9,081,388 B2 | 7/2015 | Tanaka et al. |
| 9,188,989 B1 | 11/2015 | Mudd et al. |
| 9,207,139 B2 | 12/2015 | Jones et al. |
| 9,223,318 B2 | 12/2015 | Takeuchi et al. |
| 9,690,301 B2 | 6/2017 | Mudd et al. |
| 2001/0013363 A1 | 8/2001 | Kitayama et al. |
| 2002/0002996 A1 | 1/2002 | Mudd |
| 2002/0014206 A1 | 2/2002 | Mudd |
| 2002/0046612 A1 | 4/2002 | Mudd |
| 2002/0095225 A1 | 7/2002 | Huang et al. |
| 2004/0007180 A1 | 1/2004 | Yamasaki et al. |
| 2004/0083807 A1 | 5/2004 | Mudd et al. |
| 2005/0056211 A1 | 3/2005 | Lindfors et al. |
| 2005/0087299 A1 | 4/2005 | Okabe et al. |
| 2005/0098906 A1 | 5/2005 | Satoh et al. |
| 2006/0005883 A1 | 1/2006 | Mudd et al. |
| 2006/0037644 A1 | 2/2006 | Nishikawa et al. |
| 2006/0060139 A1 | 3/2006 | Meneghini et al. |
| 2006/0124173 A1 | 6/2006 | An |
| 2006/0130755 A1 | 6/2006 | Clark |
| 2007/0089789 A1 | 4/2007 | Mudd et al. |
| 2007/0110636 A1 | 5/2007 | Lee et al. |
| 2007/0227659 A1 | 10/2007 | Iizuka |
| 2008/0041481 A1 | 2/2008 | Mudd et al. |
| 2008/0305014 A1 | 12/2008 | Honda |
| 2009/0101217 A1 | 4/2009 | Ushigusa et al. |
| 2010/0110399 A1 | 5/2010 | Lyons |
| 2010/0138051 A1 | 6/2010 | Glime |
| 2010/0224264 A1 | 9/2010 | Homan et al. |
| 2010/0269924 A1 | 10/2010 | Yasuda |
| 2011/0108126 A1 | 5/2011 | Monkowski et al. |
| 2012/0116596 A1 | 5/2012 | Yoneda et al. |
| 2012/0132291 A1 | 5/2012 | Monkowski et al. |
| 2012/0180876 A1 | 7/2012 | Hayashi et al. |
| 2012/0318383 A1 | 12/2012 | Yasuda et al. |
| 2013/0092256 A1 | 4/2013 | Yasuda et al. |
| 2013/0092258 A1 | 4/2013 | Yasuda et al. |
| 2013/0118596 A1 | 5/2013 | Horsky |
| 2013/0186499 A1 | 7/2013 | Yada et al. |
| 2014/0034164 A1 | 2/2014 | Yasuda |
| 2014/0069527 A1 | 3/2014 | Mudd et al. |
| 2014/0083514 A1 | 3/2014 | Ding |
| 2014/0158211 A1 | 6/2014 | Ding et al. |
| 2014/0190578 A1 | 7/2014 | Hayashi |
| 2014/0230915 A1 | 8/2014 | Mudd et al. |
| 2014/0260963 A1 | 9/2014 | Wang |
| 2015/0007897 A1 | 1/2015 | Valentine et al. |
| 2015/0027558 A1 | 1/2015 | Kehoe et al. |
| 2015/0121988 A1 | 5/2015 | Banares et al. |
| 2015/0212524 A1 | 7/2015 | Kehoe et al. |
| 2015/0362391 A1 | 12/2015 | Suzuki et al. |
| 2016/0011604 A1 | 1/2016 | Mudd et al. |
| 2016/0018828 A1 | 1/2016 | Mudd et al. |
| 2016/0041564 A1 | 2/2016 | Mudd et al. |
| 2016/0124439 A1 | 5/2016 | Yasuda et al. |

FOREIGN PATENT DOCUMENTS

| | | |
|---|---|---|
| CN | 103838261 | 6/2014 |
| DE | 69535683 | 1/2009 |
| EP | 0468793 | 1/1992 |
| EP | 0671484 | 9/1995 |
| EP | 0689040 | 12/1995 |
| JP | 11119835 | 4/1999 |
| JP | 2000018407 | 1/2000 |
| JP | 2004157719 | 6/2004 |
| JP | 3557087 | 8/2004 |
| JP | 2004302914 | 10/2004 |
| JP | 2007041870 | 2/2007 |
| JP | 4137666 | 8/2008 |
| JP | 4146746 | 9/2008 |
| JP | 2009079667 | 4/2009 |
| JP | 4351495 | 10/2009 |
| JP | 2009300403 | 12/2009 |
| JP | 4572139 | 10/2010 |
| JP | 4589846 | 12/2010 |
| JP | 4705140 | 6/2011 |
| JP | 2011171337 | 9/2011 |
| JP | 4974000 | 7/2012 |
| JP | 5090559 | 12/2012 |
| JP | 5091821 | 12/2012 |
| TW | 201414990 | 4/2014 |
| WO | WO8700267 | 1/1987 |
| WO | WO03081361 | 10/2003 |
| WO | WO200401516 | 12/2003 |
| WO | WO2011040409 | 4/2011 |

\* cited by examiner

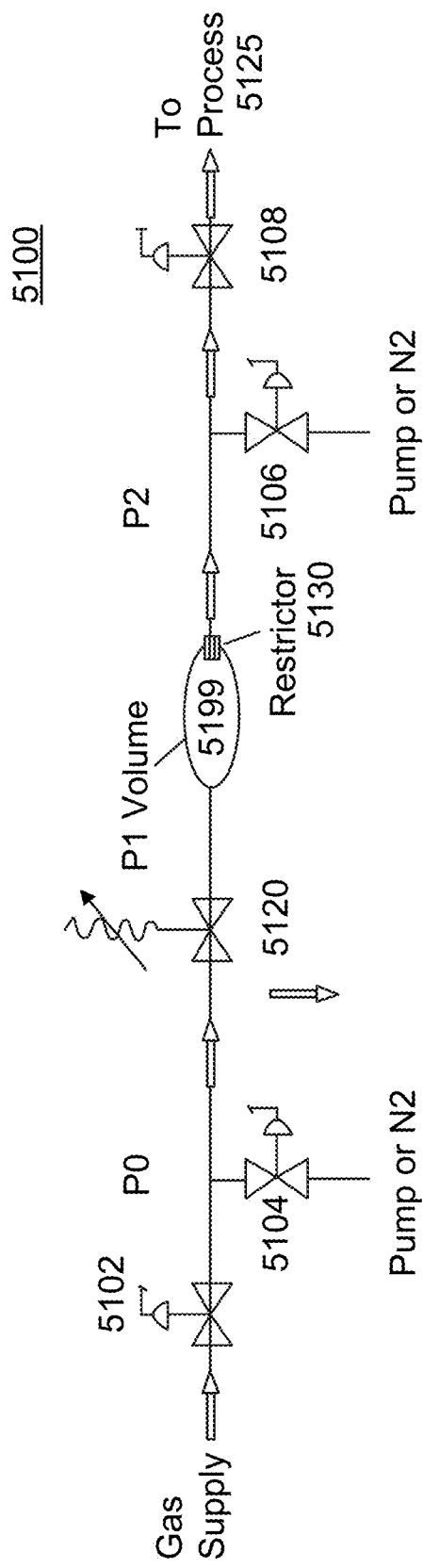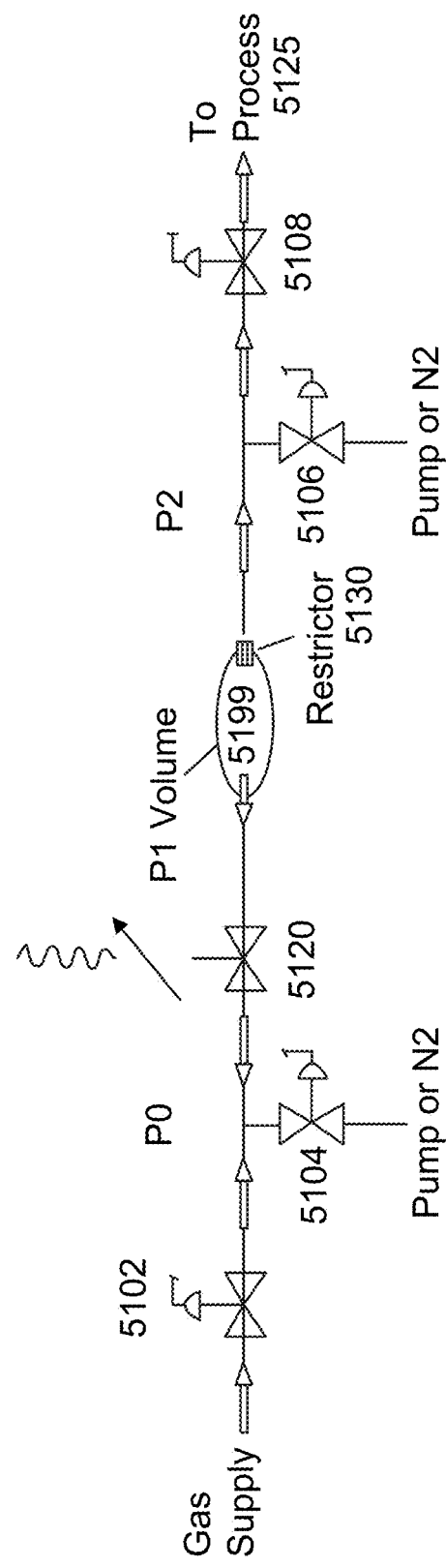
FIG. 28A
FIG. 28B

FLOW CONTROL SYSTEM, METHOD, AND APPARATUS

CROSS REFERENCE TO RELATED APPLICATIONS

The present application is a continuation of U.S. patent application Ser. No. 15/087,130, filed Mar. 31, 2016, which is (1) a continuation in part of U.S. patent application Ser. No. 14/854,043, filed Sep. 15, 2015, which is a continuation of U.S. patent application Ser. No. 13/590,152 (now U.S. Pat. No. 9,188,989), filed Aug. 20, 2012, which in turn claims the benefit of U.S. Provisional Patent Application No. 61/575,359, filed Aug. 20, 2011; (2) a continuation in part of U.S. patent application Ser. No. 14/022,165 (now U.S. Pat. No. 9,690,301), filed Sep. 9, 2013, which in turn claims the benefit of U.S. Provisional Patent Application No. 61/743,748, filed Sep. 10, 2012; (3) a continuation in part of U.S. patent application Ser. No. 14/183,494 (now U.S. Pat. No. 9,448,564), filed Feb. 18, 2014, which in turn claims the benefit of U.S. Provisional Patent Application No. 61/850,503, filed Feb. 15, 2013; and (4) continuation in part of U.S. patent application Ser. No. 14/887,334, filed Oct. 20, 2015, which is (a) a continuation in part of U.S. patent application Ser. No. 14/700,125, filed Apr. 29, 2015, which in turn claims the benefit of U.S. Provisional Patent Application No. 61/996,146, filed Apr. 29, 2014, and (b) a continuation in part of U.S. patent application Ser. No. 13/590,152 (now U.S. Pat. No. 9,188,989), filed Aug. 20, 2012, which in turn claims the benefit of U.S. Provisional Patent Application No. 61/575,359, filed Aug. 20, 2011, the entireties of which are incorporated herein by reference.

BACKGROUND

Mass flow control has been one of the key technologies in semiconductor chip fabrication. Mass flow controllers (MFCs) are important components for delivering process gases for semiconductor fabrication. An MFC is a device used to measure and control the flow of fluids and gasses.

As the technology of chip fabrication has improved, so has the demand on the MFC. Semiconductor fabrication processing increasingly requires increased performance, including more accurate measurements, lower equipment costs, greater speed, more consistency in timing in the delivery of gases, and space-saving layouts.

BRIEF SUMMARY

Disclosed are gas delivery methods, systems, and apparatus. In one embodiment, a control apparatus for delivery of a process gas includes an inlet conduit; a valve operably coupled to the inlet conduit and alterable between an open condition and a closed condition, the valve having a first conductance and being downstream of the inlet conduit; a characterized restrictor operably coupled to the valve, the characterized restrictor having a second conductance and being downstream of the valve; and an outlet conduit operably coupled to the characterized restrictor and being downstream of the characterized restrictor; wherein a ratio of the first conductance to the second conductance is 10:1 or higher.

In one embodiment, an apparatus (e.g., a flow node) operates in conjunction with an upstream, remotely-located pressure regulation for controlled delivery of process gas. The apparatus includes a valve controlled by an actuator to receive a process gas into a conduit. A characterized restrictor is placed in series and adjacent with the valve seat to provide a primary flow restriction while having a minimized volume between the valve seat and the characterized restrictor.

In one embodiment, a conductance of the characterized restrictor is low enough relative to a conductance of the valve seat that the valve seat creates a negligible pressure drop compared to the pressure drop created by the characterized restrictor. Once the process gas has passed through the characterized restrictor, an outlet exhausts the process gas from the conduit. By knowing the characterization of the restrictor, and accordingly controlling a pressure of the process gas, the desired mass flow is delivered.

In one embodiment, a pressure measurement device, such as a pressure transducer, is located within an upstream pressure regulator such as an electronic regulator. In another embodiment, a vent is provided to bleed down the process gas. As a result of venting, the process gas pressure can be quickly reduced.

In some embodiments, a plurality of parallel flow nodes provides a wider dynamic range of flow rates in less space than a standard MFC and with less cost than providing multiple MFC to cover an equivalent operating range. For example, one flow node can be activated for low flow rates, while another flow node can be activated for higher flow rates. Further, the flow nodes can share an upstream pressure measurement and control device and an outlet. Numerous other embodiments are possible, as described in more detail below. Advantageously, space and cost are reduced, while improving a dynamic range relative to other MFC devices.

In yet another embodiment, an MFC has a standard envelope with an enclosure and a corresponding base. A pressure transducer is communicatively coupled to a process gas in a proportional inlet valve without being physically coupled to the base. The space on the base, formerly occupied by the pressure transducer, is available for additional component integration. In one embodiment, a second pressure transducer is located remotely and shared by multiple MFCs.

In another embodiment, an envelope is smaller than the standards. A pressure transducer is communicatively coupled to a process gas in an inlet valve without being physically coupled to the base. In this case, the components are arranged to be more compact in view of space formerly occupied by the pressure transducer. While this shorter embodiment does not fit the larger current interface standards it is obvious that making a device larger is easier than making one smaller and the smaller device might be readily expanded to fit current applications or be adopted as the new future interface standard that is periodically adopted.

In an embodiment, an MFC utilizes a second pressure transducer that is remotely located downstream from the MFC.

In another embodiment, an MFC has a self-relieving P1 pressure.

In still another embodiment, an MFC has a first LFE and a second LFE configured in parallel to produce a wide-range MFC that maintains its accuracy over a range that previously required two separate MFCs.

Additionally, a mini IGS style MFC, which utilizes the smaller square interface currently used by air valve, can have a pressure transducer communicatively coupled to a process gas in a proportional inlet valve without being physically coupled to a base. Optionally, a venting orifice can be provided.

Advantageously, the MFC layout provides additional space on a standard MFC envelope, and the MFC layout allows a smaller MFC envelope.

In yet another embodiment, to provide a gas delivery apparatus to output a process gas as rapid square waves by increasing a time constant, a time constant is increased, leading to improved rapid square waves for output from gas flows out of an accumulation volume between a gas supplying component (e.g., an MFC or electronic regulator) and an on-off valve. To do so, a high impedance flow restrictor is added in series with a valve seat of the on-off valve. An enclosure is attached to a base with a conduit channeling through the base to receive a supply of the process gas and output the process gas from the gas delivery apparatus to the semiconductor process.

In another embodiment, a wave generation component comprises a gas supply component or system and the on-off valve downstream from the gas supply component, coupled to receive the process gas in the conduit. The wave generation component during an off cycle when the on-off valve is closed to build pressure from the process gas in an accumulation volume. During an on cycle when the on-off valve is open the wave generation component releases the process gas according to a time constant.

In an embodiment, a flow restrictor installed in a throat of the on-off valve, outputs the rapid square waves of flow to the conduit at a predefined magnitude and duration. The flow restrictor is selected to have an impedance that is high enough to significantly raise the time constant of the flow out of the accumulation volume, during the on cycle, such that flow decay in each square wave pulse over the on cycle decreases to within a tolerance, wherein the time constant is at least in part a function of the flow restrictor impedance.

Advantageously, rapid square waves are produced with an initial flow at a desired magnitude and duration during an on cycle, with the magnitude remaining nearly constant.

In yet another embodiment, a gas delivery apparatus comprises an MFC, a flow node and associated electronic regulator, sensors and control system, or any related device that depressurizes (bleeds down) an accumulation volume by switching from a default forward flow mode, from a gas supply, to a reverse flow mode out of the accumulated volume. More specifically, an electronic regulator of the apparatus can open and close its proportional valve in accordance with control coefficients in a PID controlled manner or it can open and close its proportional valve in a more basic, fully open or fully closed "On/Off" or "Bang/Bang" manner. Variable restriction from the proportional valve controls a pressure of an accumulation volume located downstream from the gas supply. The most rapid depressurization will occur if, assuming actions are taken to reduce the pressure in front of the valve, when the proportional valve opens fully immediately when commanded, i.e. "bang open". However, this technique can introduce variability in the depressurization timing and final pressure value. If more control of the depressurization timing and final pressure is desired for the accumulation volume, PID control of the proportional valve can be used in conjunction with feedback from the existing pressure transducer and other algorithms. In one embodiment, during a forward flow mode, a proportional valve is further opened for increasing target pressure when an upstream pressure is greater than a downstream pressure of the accumulated volume. By contrast, during the reverse flow mode, the proportional valve is further opened for decreasing target pressure when the upstream pressure is less than the downstream pressure of the accumulated volume.

In some embodiments, a purge valve and a gas supply valve are located upstream of the proportional valve being adjusted. Initially, in the forward flow mode, the gas supply valve is open and the purge valve is closed to build up pressure on the proportional valve. Pressure is decreased on the proportional valve when switching to the reverse flow mode by closing the gas supply valve and opening the purge valve. As a result, the pressure drop in combination with further opening the proportional valve, quickly evacuates process gas from the accumulated volume through the purge valve while in the reverse flow mode.

One implementation utilizes a characterized restrictor disposed downstream of the proportional valve and the accumulated volume to generate a specific mass flow rate based on a pressure of the accumulated volume. In one example, depressurization reduces a first mass flow rate to a second mass flow rate for the same process gas.

In one embodiment, a system for controlling the delivery of process gas has a first mass flow device and a pressure transducer. The first mass flow device has a substrate block with an inlet conduit and an outlet conduit. A proportional valve having a first valve body is mounted to the substrate block and fluidly connected to the inlet conduit. A characterized restrictor is fluidly connected to the proportional valve and the outlet conduit.

In another embodiment, a system for processing articles include first and second flow controllers. Each of the first and second flow controllers have a printed circuit board, an inlet conduit, and an outlet conduit. The outlet conduits of the first and second flow controllers are fluidly connected. A pressure transducer is also fluidly connected to the outlet conduits of the first and second flow controllers. Measurements from the pressure transducer are received by the printed circuit boards of the first and second flow controllers.

In some embodiments, a system for processing articles include first and second flow controllers. Each of the first and second flow controllers have a proportional valve, an inlet conduit, and an outlet conduit. The outlet conduits of the first and second flow controllers are fluidly connected. A pressure transducer is also fluidly connected to the outlet conduits of the first and second flow controllers. Measurements from the pressure transducer control operation of the proportional valves of the first and second flow controllers.

Advantageously, semiconductor processing efficiency is improved through (1) faster transition response times for process gas delivery, particularly at low flow rates and (2) more accurate flow control at lower flow rates. Additionally, lower flow rates than currently used become practical as smaller full scale devices can be built with lower conductance restrictors because the bleed down time limitation of 4 seconds, or similar, can readily be met for all restrictors given this reverse flow operation as described.

BRIEF DESCRIPTION OF THE DRAWINGS

The invention of the present disclosure will become more fully understood from the detailed description and the accompanying drawings, wherein:

FIGS. 28A-B are block diagrams illustrating more abstract views of components involved in a forward flow mode and in a reverse flow mode, according to an embodiment.

DETAILED DESCRIPTION

Figure 1A:
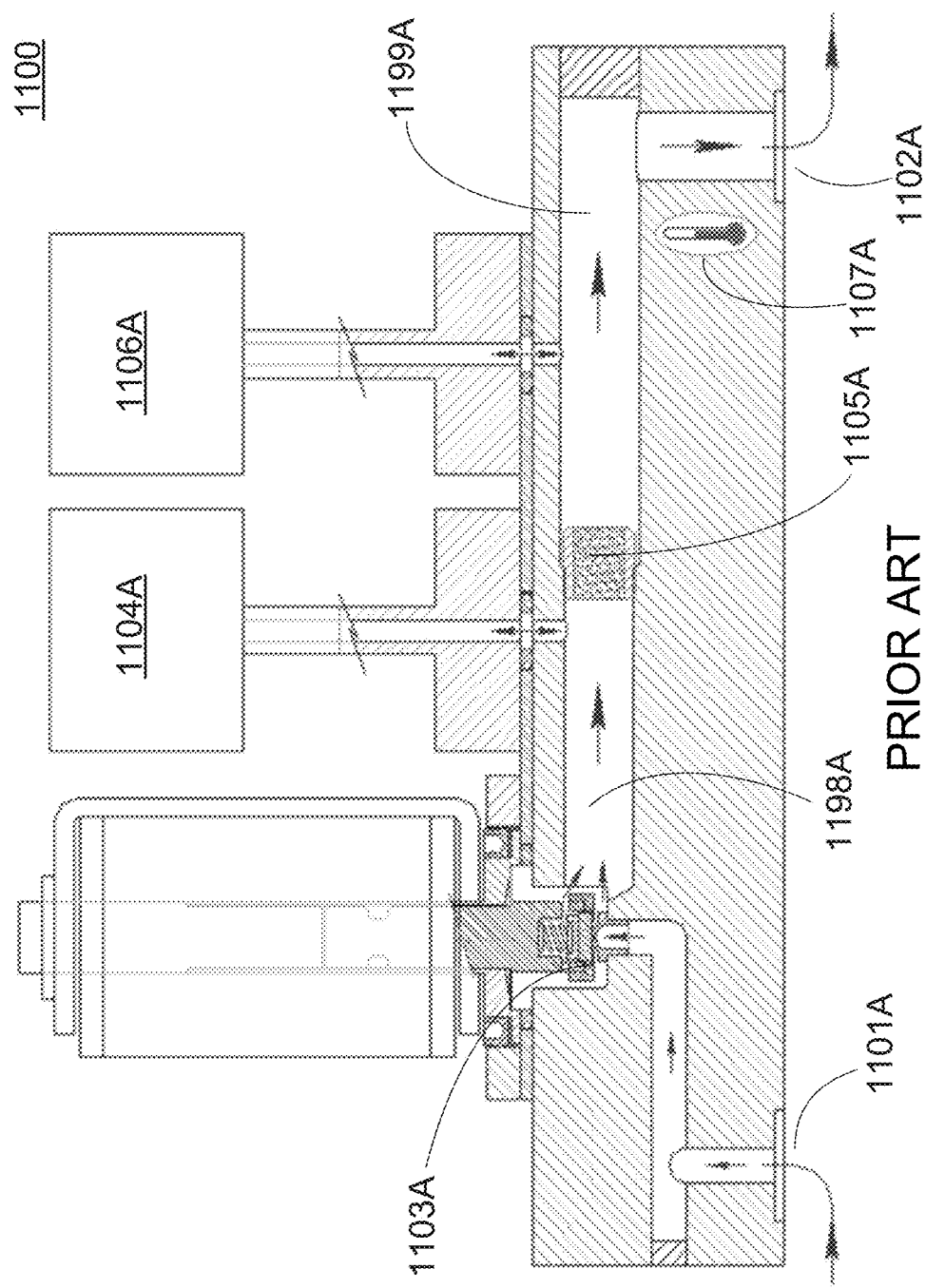
FIG. 1A is a schematic diagram illustrating a pressure based MFC with a volume (V1) to measure pressure.

The following description of the preferred embodiment(s) is merely exemplary in nature and is in no way intended to limit the invention or inventions. The description of illustrative embodiments is intended to be read in connection with the accompanying drawings, which are to be considered part of the entire written description. In the description of the exemplary embodiments disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top," "bottom," "front" and "rear" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," "secured" and other similar terms refer to a relationship wherein structures are secured or attached to one another either directly or indirectly through intervening structures, as well as both movable or rigid attachments or relationships, unless expressly described otherwise. The discussion herein describes and illustrates some possible non-limiting combinations of features that may exist alone or in other combinations of features. Furthermore, as used herein, the term "or" is to be interpreted as a logical operator that results in true whenever one or more of its operands are true.

The disclosure is divided into four sections. Section I discusses a device and method for delivering process gas using a remote pressure measurement device. Section II discusses an MFC device with space saving layouts and improved functionalities. Section III discusses a gas delivery apparatus to output a process gas as rapid square waves of flow. Section IV discusses an electronic regulator utilizing reverse flow for fast bleed down of gas pressure in a gas delivery apparatus supplying a process gas at specific mass flow rates to a process. Different embodiments disclosed in the respective sections can be used together as part of a gas delivery apparatus, method, or system. To the extent a term, reference number, or symbol is used differently in different sections, context should be taken from the relevant section and not the other sections.

Section I

FIG. 1A is a schematic diagram illustrating a pressure based MFC 1100 with a volume (V1) in conduit 1198A that is used to measure pressure. MFC 1100 has an inlet port 1101A, an outlet port 1102A, a proportional inlet valve 1103A, a first pressure transducer 1104A, a restrictor 1105A, a second pressure transducer 1106A and a temperature sensor 1107A. The first pressure transducer 1104A measures pressure over V1 as an input for pressure regulation and is operates so that pressure at the first pressure transducer 1104A closely matches the pressure at an inlet of the restrictor 1105A. The second pressure transducer 1106A is located downstream and a temperature sensor 1107A is used to increase accuracy.

Figure 1B:
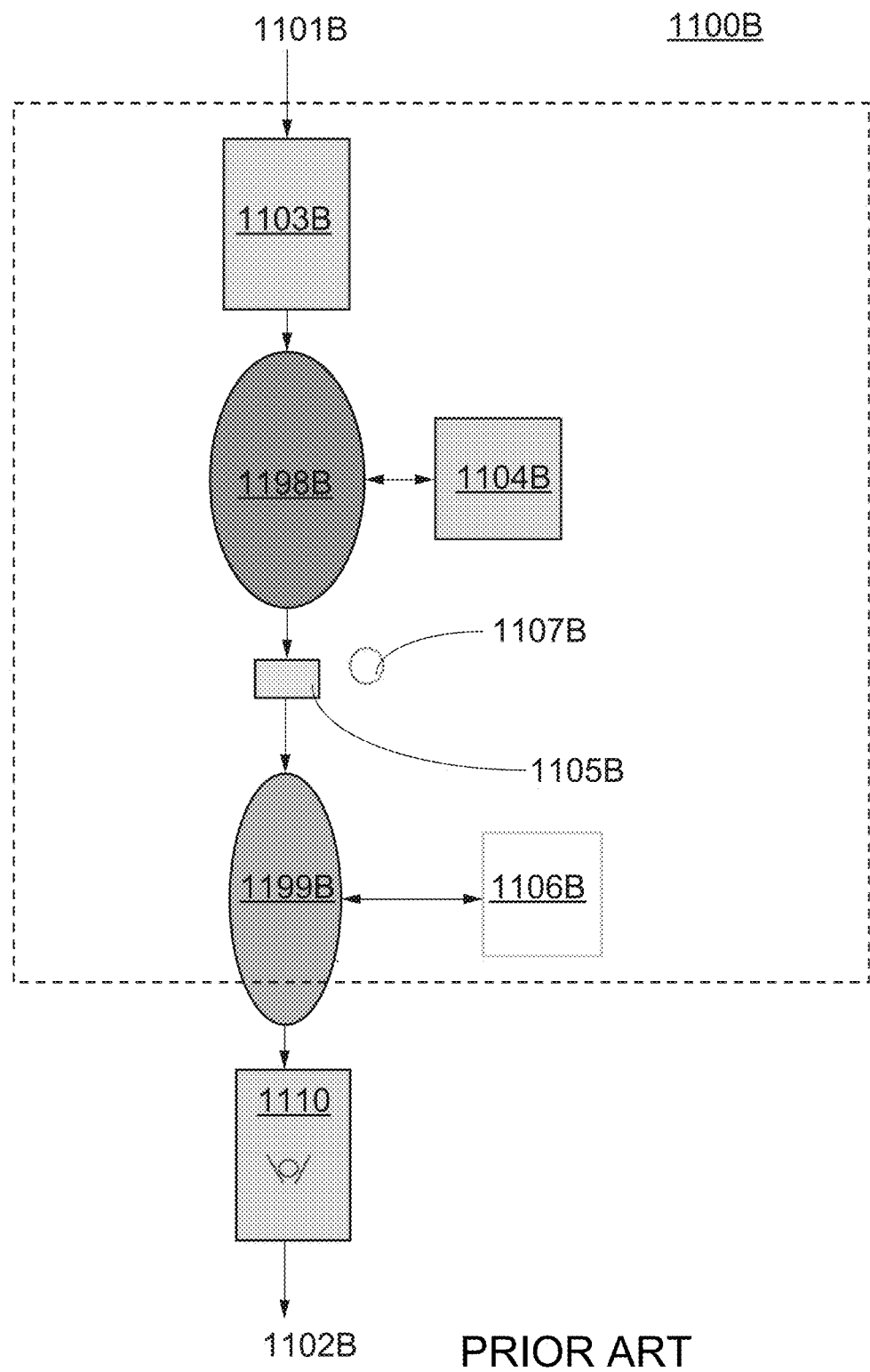
FIG. 1B is a block diagram of FIG. 1A illustrating a flow order for a process gas through a pressure based MFC.

FIG. 1B is a block diagram of FIG. 1A illustrating a flow order for a process gas through the pressure based MFC 1100B. As shown, a process gas moves through a proportional valve 1103B to a conduit containing V1 1198B where the process gas is measured by a first pressure transducer 1104B. Next the gas passes through restrictor 1105B into a conduit with volume V2, 1199B, where the pressure representative of the pressure at the outlet of the restrictor is measured. Finally, the process gas often exhausts from the MFC 1100B to a process through an isolation valve actuator and seat 1110.

Problematically, the space consumed by V1 hinders further efficiencies in accuracy, bleed down performance, space consumption and costs of gas delivery systems used for processing. Furthermore, when an external control directs the MFC to stop or reduce the magnitude of the gas flow to a lower rate of flow, V1 produces undesirable slow bleed down times to the new flow value.

What is needed is a flow node to provide an accurate delivery of process gas without the inefficiencies of MFCs having a local pressure measurement directly on V1, by utilizing a remote pressure measurement of V1 pressure to reduce the bleed down volume while still providing pressure measurements that represent the pressure of the gas inlet to the restrictor with sufficient accuracy to maintain the specified accuracy of the flow device.

A device and method for a flow node to control gas flow utilizing a remote pressure measurement device are disclosed. In general, the flow node disclosed herein eliminates the local pressure measurement directly on V1 needed by MFCs because a resulting pressure drop across conduits and poppet and valve seat of the flow node is designed to be insignificant relative to the remote measurement. The disclosed techniques can be implemented in a semiconductor fabrication process, or any other environment requiring flow rates of gas or fluid (e.g., low flow, high flow, 0.1 sccm, or 30,000 sccm) within tight tolerance limits or where reduced equipment cost is desired.

Figure 2A:
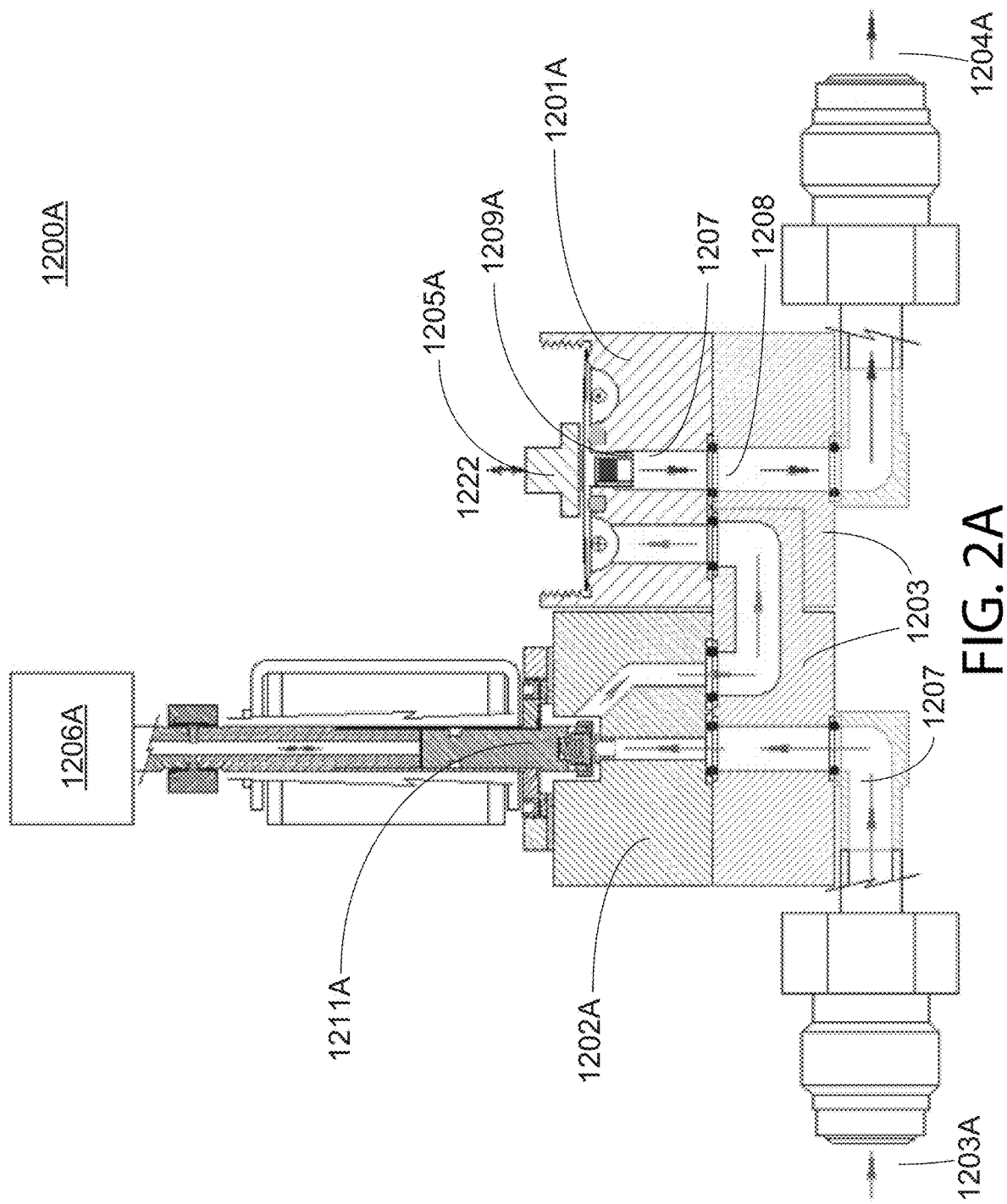
FIG. 2A is a schematic diagram illustrating a gas stick including a flow node with a remote pressure measurement, according to an embodiment.

FIG. 2A is a block diagram illustrating a gas stick 1200A that includes a flow node 1201A making use of a remote pressure measurement, according to an embodiment. The gas stick 1200A also includes an electronic regulator 1202A and an inlet 1203A and outlet 1204A to a conduit.

The inlet 1203A of a VCR fitting (e.g., as produced by Parker Corporation) receives a process gas into a conduit. Nitrogen is an exemplary process gas, but any suitable gas or fluid could be substituted. The conduit(s) can be any suitable tubing or plumbing, either rigid or flexible, to move the process gas through and to the electronic regulator 1202A and the flow node 1201A. The conduit can have an outside diameter of, for example, ¼ inch and inside diameter of 3/16 inch. K1S substrate blocks 1203, as manufactured by Hytron Corporation, serve as an interconnecting platform for the electronic regulator 1202A, the flow node 1201A and the inlet conduit 1203A and outlet 1204A conduit.

The outlet 1204A of a VCR fitting delivers the process gas to a next conduit for eventual use by the process. In some embodiments, additional processing is performed on the process gas, such as mixing with other gases, or the like.

The flow node 1201A includes a valve seat and poppet assembly 1205A, an actuator 1222 (represented by the arrow up/down arrow), internal conduits 1207 (can represent one or more portions of conduit), interface sealing surfaces 1208 and a characterized restrictor 1209A. The flow node 1201A is connected in series with an upstream electronic regulator 1202A having a pressure transducer 1206A. Generally, the flow node 1201A limits a mass flow of gas or liquids that is in accordance with a pressure of a gas or liquids as measured upstream. Optionally a pressure measurement and/or temperature assumed, measured or communicated by other instrumentation elsewhere in the system can be used to improve the accuracy of the flow if available.

The valve seat and poppet assembly 1205A includes an opening for gas flow and a movable poppet to preclude gas flow. In operation, the poppet moves between on and off by opening to allow process gas to flow into the conduit and closing to stop the process gas. In one embodiment, the valve seat has a high conductance relative to the characterized restrictor 1209A (or alternatively, has low impedance relative to the characterized restrictor), for example, a ratio of 10:1, 200:1 (preferred) or higher. The conductance of an on/off valve such as used in the flow node, can be the maximum practical amount for a design envelope. With an MFC using a proportional valve as opposed to an on/off isolation valve, conductance has to be balanced with (and thus, is limited by) flow resolution needs.

The characterized restrictor 1209A is located, in one embodiment, directly adjacent to and in series with the valve seat and poppet assembly 1205A. The characterized flow restrictor 1209A can be a laminar flow element (compressible or in-compressible flow), an orifice (sonic, sub sonic or molecular), a venturi nozzle (sonic, sub sonic or molecular), or the like. As discussed, the characterized restrictor 1209A is selected to provide the desired full-scale flow at or slightly below the target full scale pressure to be delivered to the flow node 1201A and still have a low conductance relative to a conductance of the valve seat. A resulting pressure drop from the pressure regulator output, through the conduits to the flow node 1201A and across the valve seat of the flow node 1201A is small enough to be ignored so that a pressure measurement within the flow node 1201A is not required to achieve a desired accuracy.

For example, a characterized restrictor designed to flow 5,000 sccm at P1=2000 Torr is placed in the throat of an air valve with a flow impedance and associated plumbing that generates, for instance, a 0.15 Torr pressure drop when delivering the 5000 sccm flow through the restrictor at 2000 Torr. The induced flow error would be roughly 0.15% of reading if the characterized restrictor is a compressible laminar flow element. The 0.15% is well within the 1% reading of the device and is acceptable allowing the device to maintain it specified accuracy.

An electronic regulator 1202A with the pressure 1206A transducer and a proportional valve 1211A measures and correspondingly controls a pressure of the process gas within the conduit. A proportional valve 1211A of the electronic regulator 1202A modulates to control a pressure of the process gas inlet in accordance with pressure set points. The pressure set points can be received automatically from a controller or manually input. In some embodiments, the pressure set points are externally calculated to cause a desired mass flow rate. In some embodiments, the electronic regulator can maintain accuracy from an upstream location for flows up to 8 SLM (standard liter per minute) on N2 (nitrogen) or 4 SLM on SF6 (sulfur hexafluoride) for flow nodes using a ¼" air valve commonly used in the industry. In other embodiments, flow rates can be higher if larger standard components or non-standard modified components are used. At a certain point as flow rate gets larger, parasitic losses of pressure across the valve seat make the overall pressure drop larger, relative to the pressure delivered to the restrictor 1209A, than manageable to maintain flow measurement accuracy.

Figure 2B:
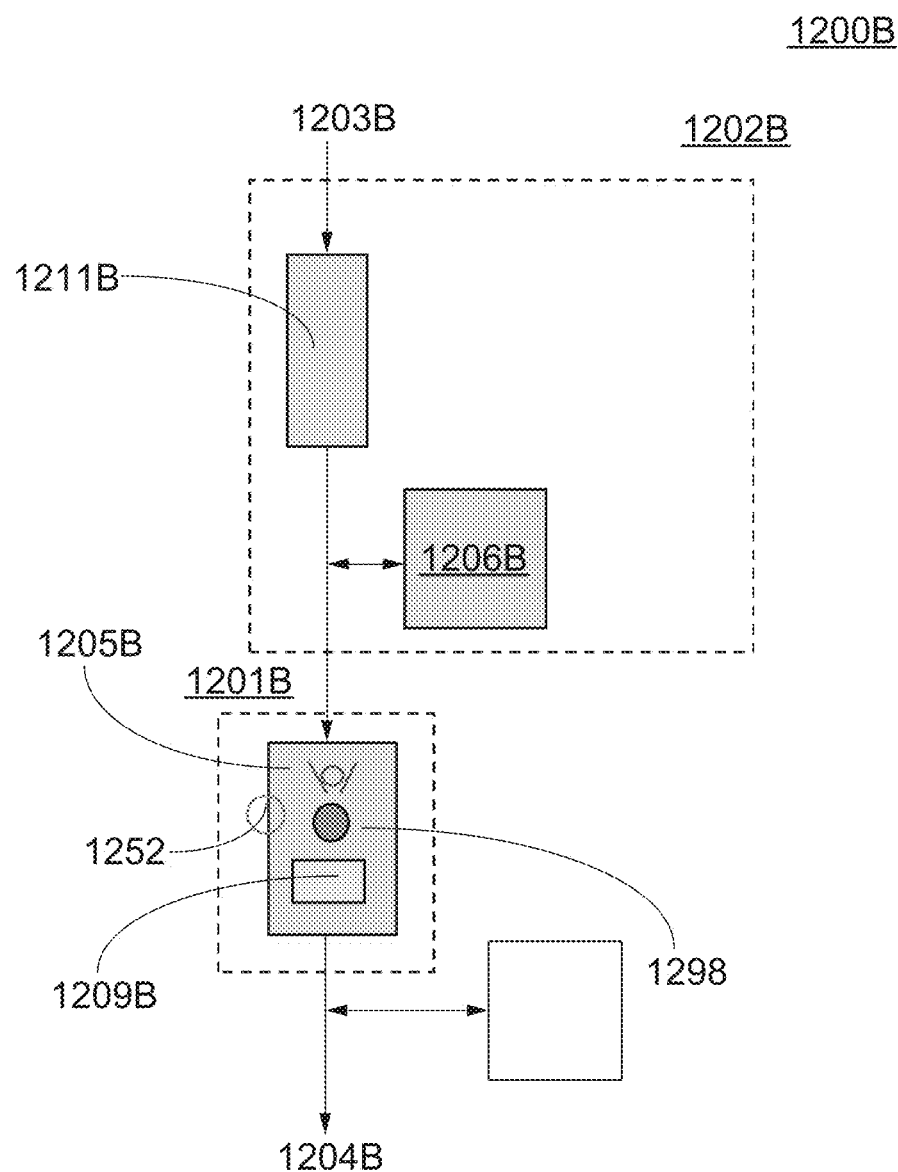
FIG. 2B is a block diagram of FIG. 2A illustrating a flow order for a process gas though a gas stick including a flow node making use of a remote pressure measurement, according to an embodiment.

FIG. 2B is a block diagram of FIG. 2A illustrating a flow order for a process gas though a gas stick 1200B that includes a flow node 1201B with a remote pressure measurement, according to an embodiment.

The gas is received through an inlet 1203B to a proportional valve 1211B that is modulated in coordination with a pressure transducer 1206B to control pressure to the 1201B flow node. A volume 1298 for bleed down between the valve seat and poppet assembly 1205B and the characterized restrictor 1209B is minimized for faster bleed down (e.g., 50× faster). By minimizing the distance and geometry, the volume 1298 of gas between the components is minimized. An exemplary volume of the resulting bleed off volume can be a negligible at 0.02 cc, 0.01 cc or less. As shown in FIG. 1B, an exemplary bleed off volume of an MFC can be 0.50 cc. Optionally, a temperature sensor 1252 provides an internal temperature measurement, although temperature can also be received from external components such as a gas box temperature controller or sensor.

Additionally, the MFC has typical measurements of 1.1" (W)×4.1" (L)×5" (H), compared to a flow node constructed from an air valve having measurements of 1.1" (W)×1.1" (L)×4' (H) for similar operational parameters. Further, the pressure based MFC can cost $2,500, while an air valve can cost $90 in volume and a characterized restrictor to press in the air valve and make a flow node from the air valve, can cost an additional $20.

Figure 3A:
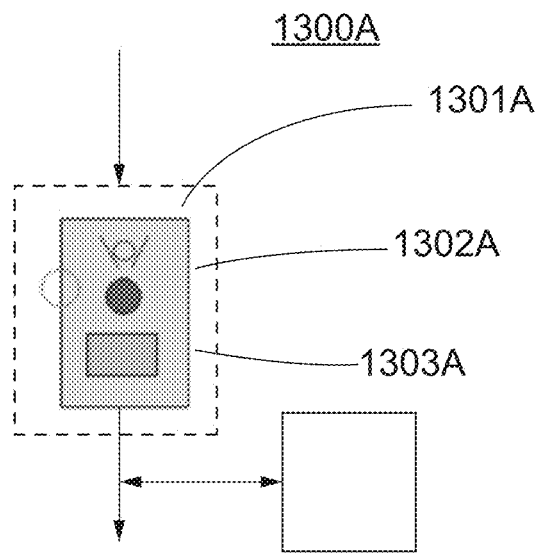
FIGS. 3A-3B are schematic diagrams illustrating alternative configurations of a valve relative to a characterized restrictor, according to some embodiments.
Figure 3B:
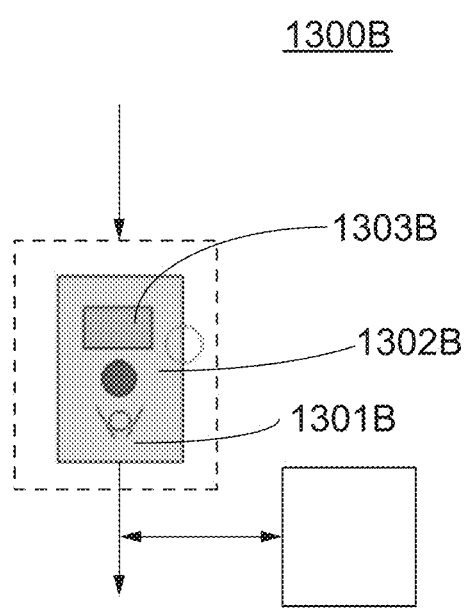

FIGS. 3A-3B are schematic diagrams illustrating alternative configurations of a valve relative to a characterized restrictor, according to some embodiments.

In more detail, the valve seat and poppet assembly 1301A of a first configuration in FIG. 3A are located upstream of the characterized restrictor 1303A. In some cases, the characterized restrictor 1303A can be exposed to the multiple gases from other flow nodes and MFCs exhausting to a common conduit. In a no flow condition, the isolation on the flow node is closed, and small amounts of these other gases can backflow into the restrictor 1303A which can lead to reliability issues such as corrosion or particle generation in the case where the gases are incompatible or in reacting families. In an alternative configuration of FIG. 3B, a characterized restrictor 1303B is located upstream of a valve seat and poppet assembly 1301B. By locating the valve seat and poppet assembly 1301B downstream, the backflow is remediated. On the other hand, the buildup of gas pressure between the restrictor 1303B and the downstream valve seat can cause a microburst which may be objectionable in some cases. So long as the ratio of conductance remains, the flow node operates within tolerable error limits.

Figure 4A:
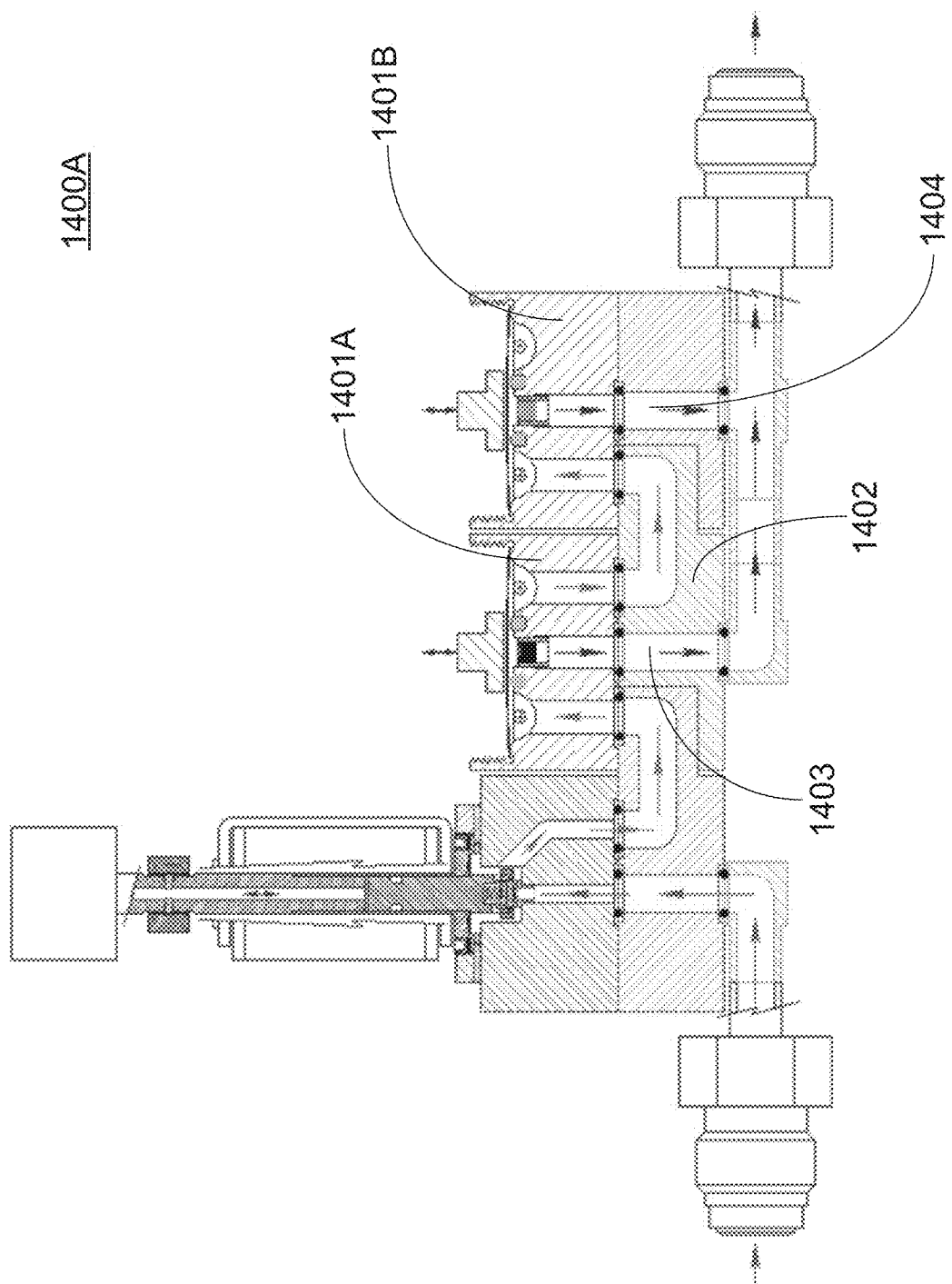
FIGS. 4A-4C are schematic diagrams illustrating alternative configurations of multiple flow nodes, according to some embodiments.
Figure 4B:
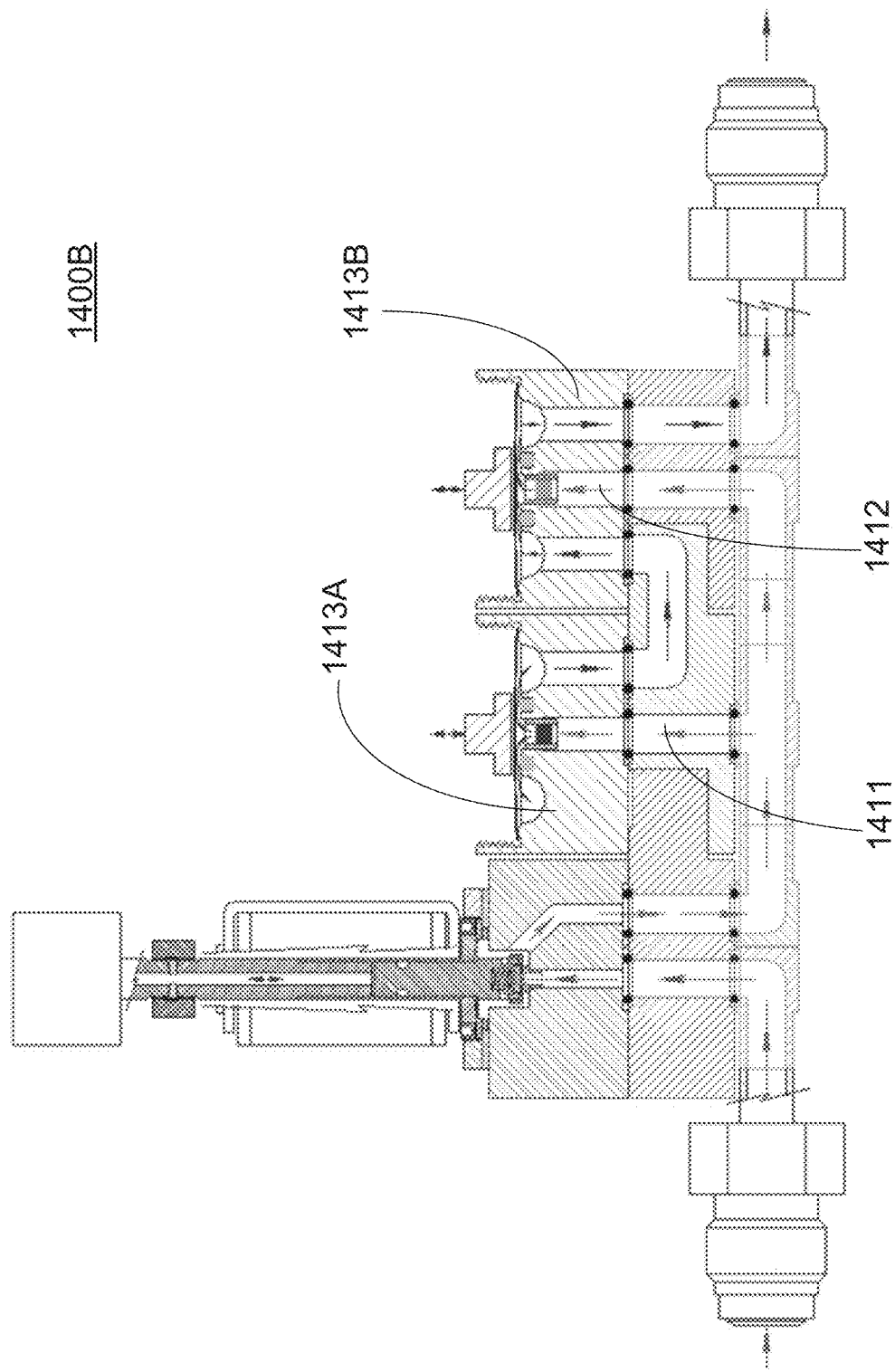
Figure 4C:
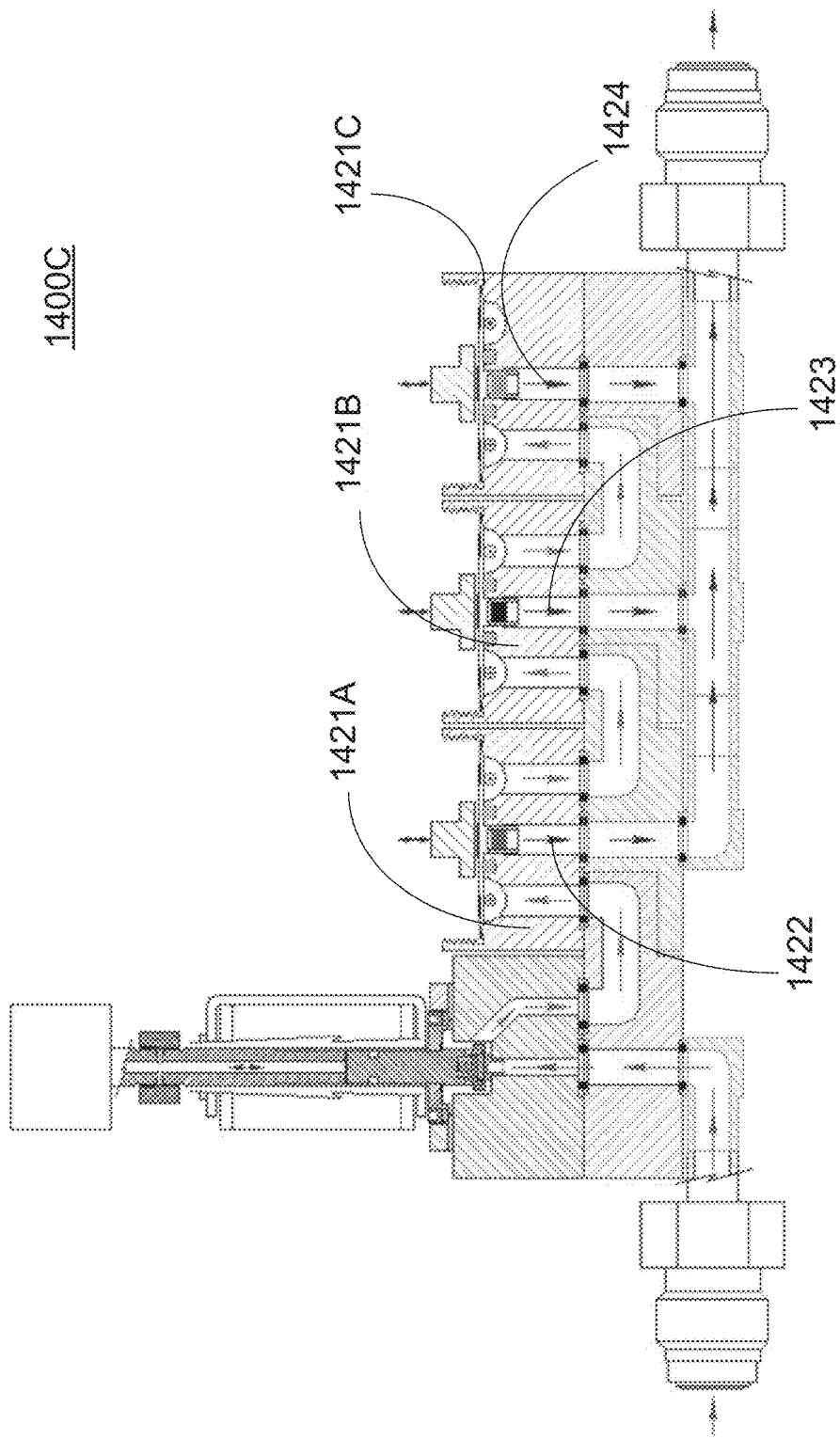

FIGS. 4A-4C are schematic diagrams illustrating alternative configurations of multiple flow nodes, according to some embodiments.

Specifically, FIG. 4A shows a gas stick 1400A with two flow nodes 1401A,B in parallel. An additional K1S substrate 1402 is needed to support the additional flow nodes.

In operation, the process gas can flow through either flow node or both. When flow node 1401A is open, the process gas flows to a conduit 1403 and when flow node 1401B is open, the process gas flows to a conduit 1404. For example, one flow node can be configured to accurately handle low flows while the other flow node accurately handles all non-low flows. The dual flow node thus increases an overall dynamic range that is superior to an MFC. Further efficiency is achieved because a single pressure transducer is shared between the flow nodes.

While the characterized restrictors are located downstream of the valve seat in the FIG. 4A, FIG. 4B shows an example of characterized restrictors located upstream of the valve seat. When a flow node 1413A is open, the process gas inlets through a conduit 1411, and when a flow node 1413B is open, the process gas inlets through a conduit 1412.

A further example of FIG. 4C shows an embodiment of a gas stick 1400C with three flow nodes 1421A-C in a parallel configuration. This configuration provides the equivalent capability as three separate MFCs, but only occupies one third the space while providing a cost savings. The embodiment also shows characterized restrictor located downstream of the valve seat and poppet assemblies, although the opposite configuration is also possible. When the flow node 1421A is open, the process gas flows through a conduit 1422, when the flow node 1421B is open, the process gas flows through a conduit 1423, and when the flow node 1421C is open, the process gas flows through a conduit 1424.

Figure 5A:
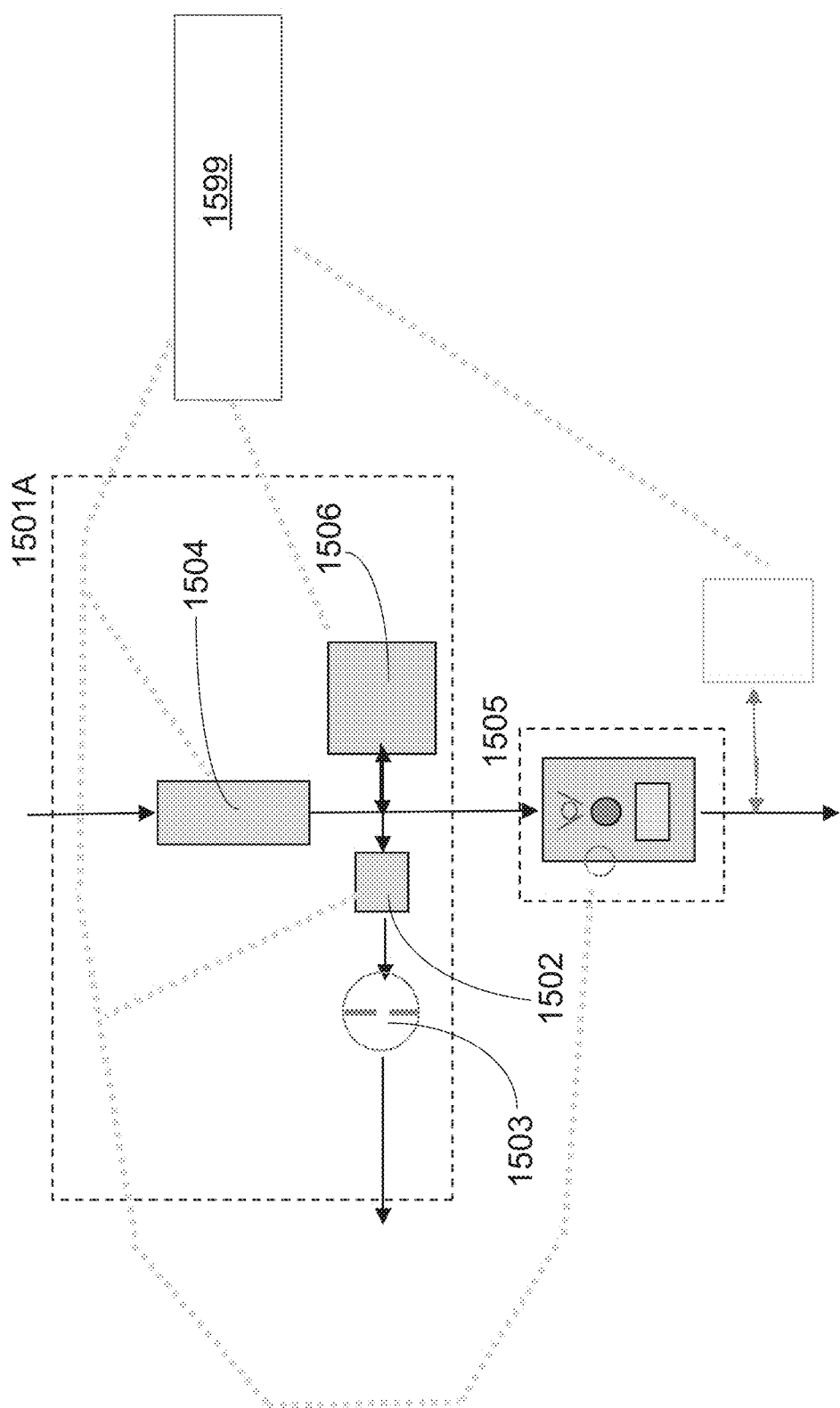
FIG. 5A is a block diagram illustrating a flow node supplied by a self-venting electronic regulator, according to some embodiments.
Figure 5B:
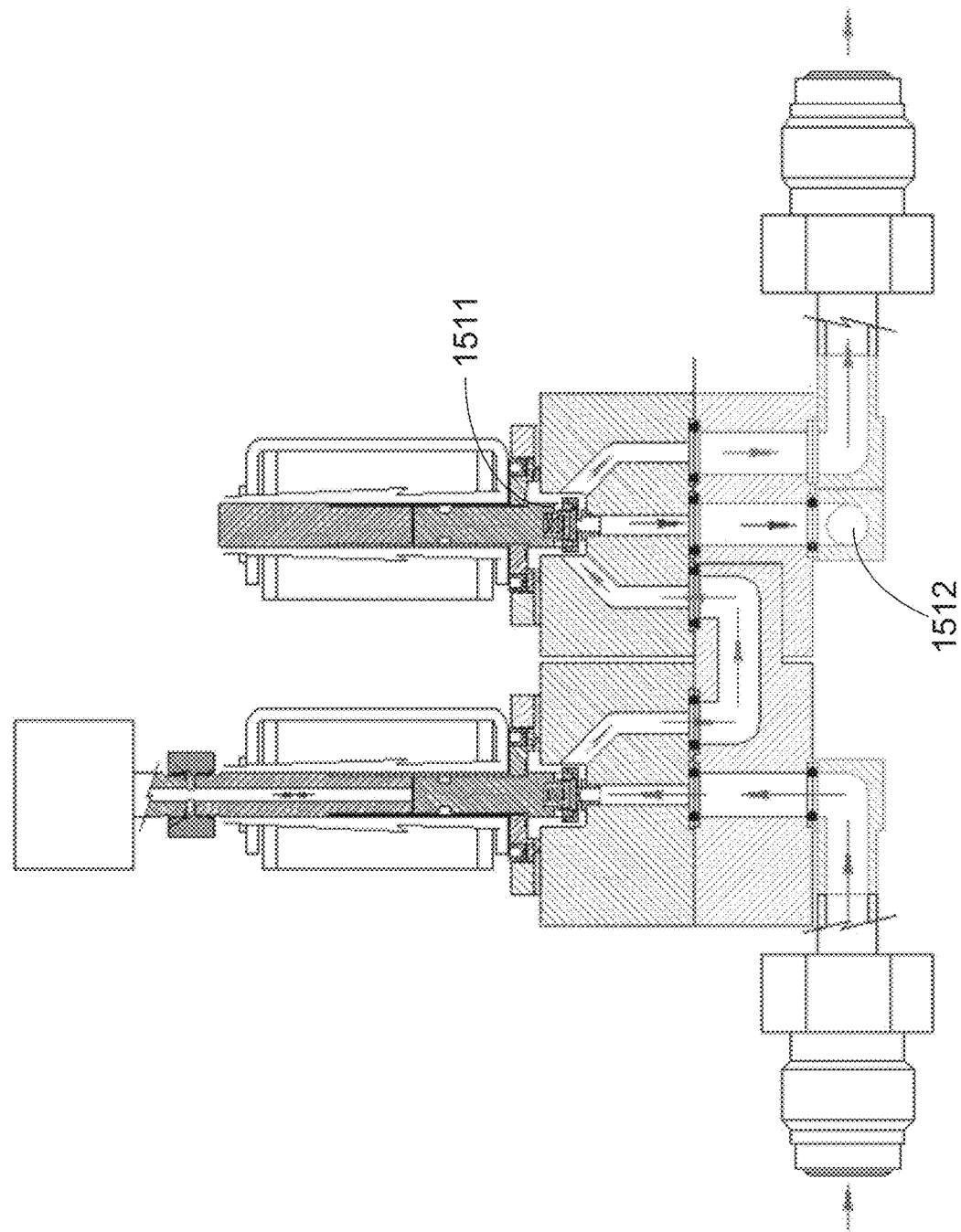
FIGS. 5B-5C are schematic diagrams illustrating an electronic regulator of FIG. 5A used in conjunction with self-venting mechanisms, according to some embodiments.
Figure 5C:
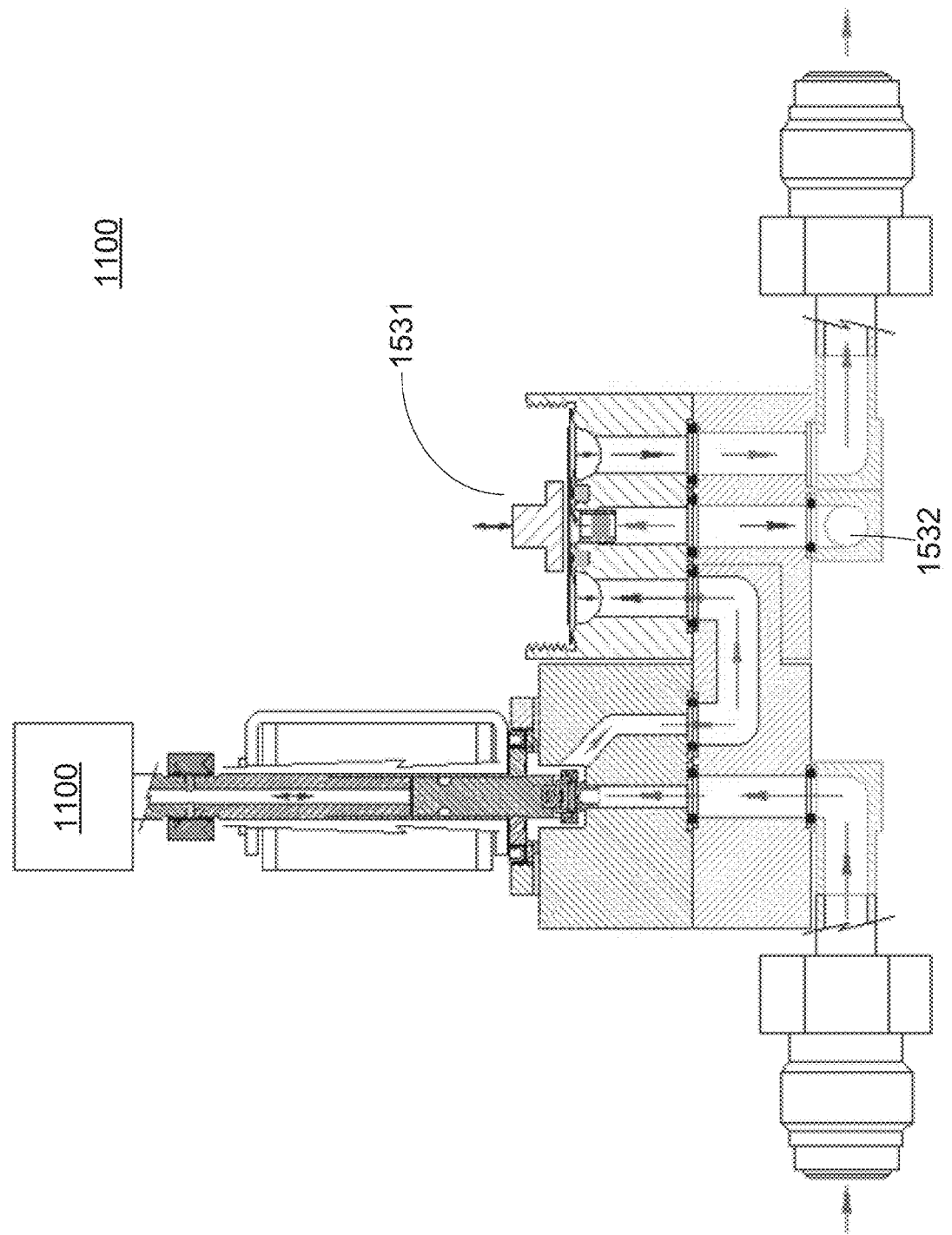

FIGS. 5A-5C are schematic diagrams illustrating a flow node supplied by a self-venting electronic regulator, according to some embodiments.

The proportional dump valve, or optional on/off valve with flow limiting restrictor in series, allows process gas to be vented from the additional conduit routed to a vent. By quickly depressurizing the conduit in a low flow scenario, changes in mass flow rate are realized with reduced bleed times.

As shown in FIG. 5A, an electronic regulator 1501A includes a valve 1502 and optional flow limiting restrictor 1503 in series with a conduit to a vent. A feedback and control 1599 can coordinate components. The configuration can relieve a volume of gas between a proportional valve 1504 and a flow node 1505 (and coupled to a pressure transducer 1506) allowing it to transition more quickly from a higher pressure set point to a new lower pressure set point than could occur without the venting of gas, thus avoiding intolerable slow bleed down.

In an embodiment of FIG. 5B, a proportional valve 1511 provides a controlled release of the process gas to a conduit 1512 for venting. In an embodiment of FIG. 5C, an on/off valve 1531 with a limiting flow restrictor is used release the process gas to a conduit 1532 for venting. The on/off valve 1531 and limiting flow restrictor are preferred in some cases due to lower cost and less complexity for control.

Figure 6:
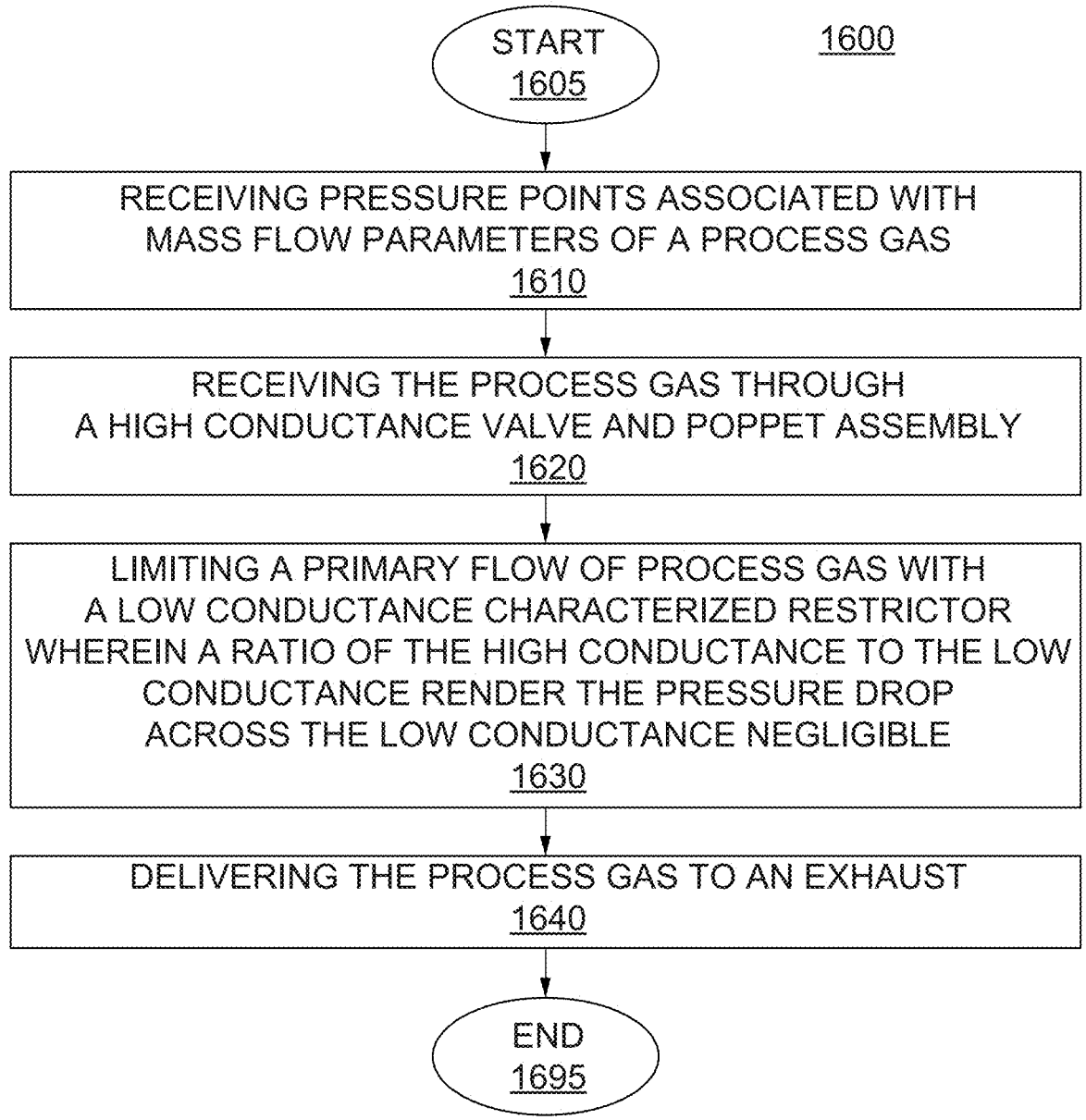
FIG. 6 is a flow chart illustrating a method for delivering a process gas making use of a remote pressure measurement device and flow node, according to an embodiment.

FIG. 6 is a flow chart illustrating a method for delivering a process gas with a remote pressure measurement, according to an embodiment. The method can be implemented by any of the flow nodes discussed above.

At step 1610, pressure points associated with mass flow parameters of a process gas are received. For example, an electronic regulator can receive pressure set points from a controller that is aware of characteristics of the flow node and a temperature and pressure, P2 (assumed or measured).

At step 1620, a process gas is received through a high conductance valve and poppet assembly. An actuator changes position to move the poppet, thereby allowing or preventing gas flow.

At step 1630, a primary flow of the process gas is limited by the low conductance characterized restrictor. As the restrictor is characterized so that flow is known as a function of pressure to the restrictor, a mass flow through the restrictor is known if one knows the pressure delivered to the flow node. Correspondingly, one can change mass flow to a new desired value by changing the pressure delivered to the flow node. As discussed, a ratio of conductance between the valve seat and the characterized restrictor, along with a minimized volume between the two, produces a very low pressure drop allowing the remote pressure measurement to represent the pressure at the inlet of the restrictor with sufficient accuracy to allow sufficiently accurate flow measurement.

At step 1640, the process gas is delivered to an exhaust. The process gas can move on to be mixed with other gases, heated, cooled, or the like.

Section II

As more refined manufacturing processes evolved with time, higher performance was needed from thermal and pressure based MFCs. The stability and accuracies of the past devices were bottlenecking semiconductor fabrication process. Process step durations shortened to 5 second steps seen now verses 30 minutes process steps of the past. The relatively long transient time to change gas flow rates to the process once acceptable with the longer process steps is problematic with the shorter process steps. Further, MFCs are lagging to meet the demand for controlling gas flows over a wider flow range with more accuracy and less costly hardware.

The pressure based MFC was introduced in the last decade and is now overtaking the use of the thermal MFC in critical etch applications. In 2002, Fugasity introduced a pressure base MFC called the Criterion. The pressure based MFC was an improvement on the thermal MFC and hence was a commercial success. However, those same forces that pushed the development of the Criterion, the demand for improved performance and reduced price, are still pushing to improve the design of the pressure based MFC.

One of the issues common to thermal and pressure based MFCs is form factor. Space is very expensive in a modern semiconductor tool. The interface connecting the MFC to the other components in a gas box has been standardized by the industry to allow interchangeability of devices such as MFC and air operated shut off valve produce by a multiple different suppliers. The dominate interface standard in the industry is based on components being 1.1" wide. MFC's are 1.1" wide (28.6 mm) by 4.13" (105 mm) in length with porting and other geometry details as describe in the Semi F82-0304 specification. Similarly a second interface specification, Semi F84-0304, defines the interface geometry for air operated valve as being 1.1" wide by 1.1" in length square interface.

Independent of the device type or manufacturer the vast majority of components (air valves, filters, check valves, regulators, etc.) found in the gas box of a modern semiconductor fabrication tool will comply with the 1.1" square interface. MFC and Electronic regulators will fit the 1.1"× 4.13" rectangular interface.

These device interchangeability issues and the resulting interface standards have had the impact of preventing spontaneous component size reductions. About every 10 to 20 years the industry has seen a new smaller standard proposed and accepted, but in time periods between these adoptions, devices are, as a practical matter, forced to retain the external envelope defined by the standards.

However, internal device design improvements that allow smaller internal components, while not affecting the external envelope, have had the beneficial effect of allowing more instrumentation and functionality to be placed into the standard external envelope. For example a supply pressure transducer, typically a 1.1" square interface, had been traditionally place upstream of an MFC. Component size reduction of the pressure transducer and similar reduction in the MFC's internal components has allow the function of the supply pressure transducer to be integrated into the MFC thus eliminating the need for the 1.1" square interface formerly used by the pressure transducer.

What is needed is a robust MFC having various space-saving layouts that allows additional component integration within the standard envelope and which incorporates improved design, components and new functionalities to address the transient response issues and accuracy limitations inherent in the current devices. Additionally, a layout in an MFC allows for a smaller pressure based MFC package size that allow it to fit the smaller standard square interface envelope rather than requiring the larger rectangular interface that current MFCs require.

An MFC device, and methods therein, with various space saving layouts is described.

Figure 7:
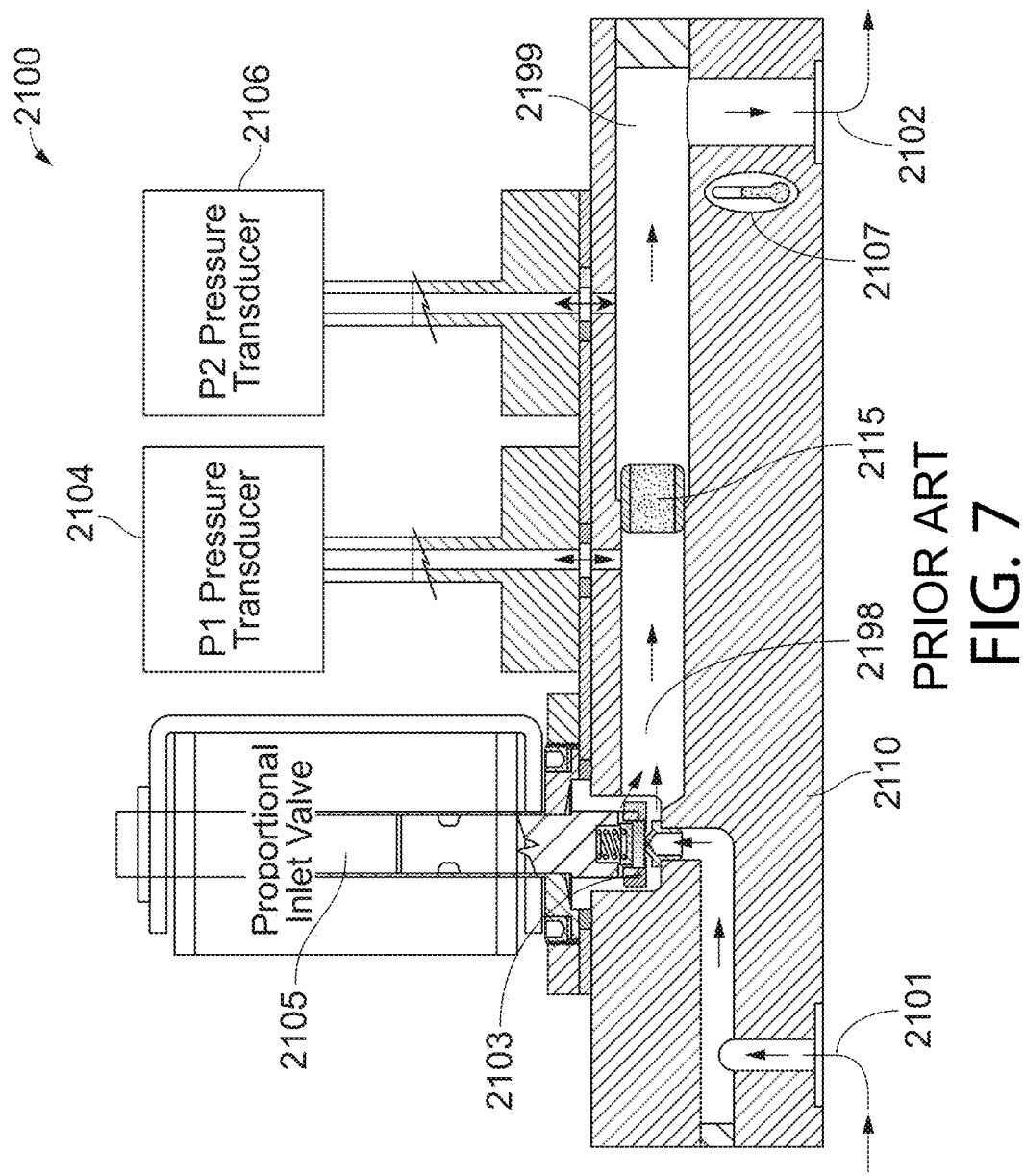
FIG. 7 is a schematic diagram illustrating a layout of a pressure based MFC with a P1 pressure transducer coupled to a base within a standard envelope.

FIG. 7 is a schematic diagram illustrating a layout of a pressure based MFC 2100 with a P1 pressure transducer 2104 coupled to a base 2110 within a standard envelope. The MFC 2100 can be 4.13" long to fit industry standards. It consists of a proportional flow control valve 2105 at an inlet 2101 of the device, followed by the P1 pressure transducer 2104 downstream of a proportional flow control valve 2105, followed by a characterized laminar flow element (LFE) 2115 acting as a flow restrictor, and a P2 pressure transducer 2106 near the outlet 2102 of the device. The MFC 2100 also utilizes a printed circuit board (PCB) (not shown) containing supporting electronics, software and calibration coefficient for receiving, pressure signals, a temperature signal (e.g., from a temperature sensor 2107 embedded in the device) and an external set point indicating the target flow. Given these inputs the PCB drives a voltage to the proportional inlet valve 2105 until sufficient pressure was achieved in the volume between a poppet of a valve and the downstream restrictor, to achieve the needed flow through the restrictor. This particular pressurized volume is referred to herein as a P1 volume. Under this paradigm, the P1 pressure transducer 2104 is coupled to the base in order to monitor the pressure of P1 volume. Gas flow follows arrows in from inlet 2101 through device 2103 to volume 2198 through LFE 2115 to volume 2199 and out at outlet 2102.

Figure 8A:
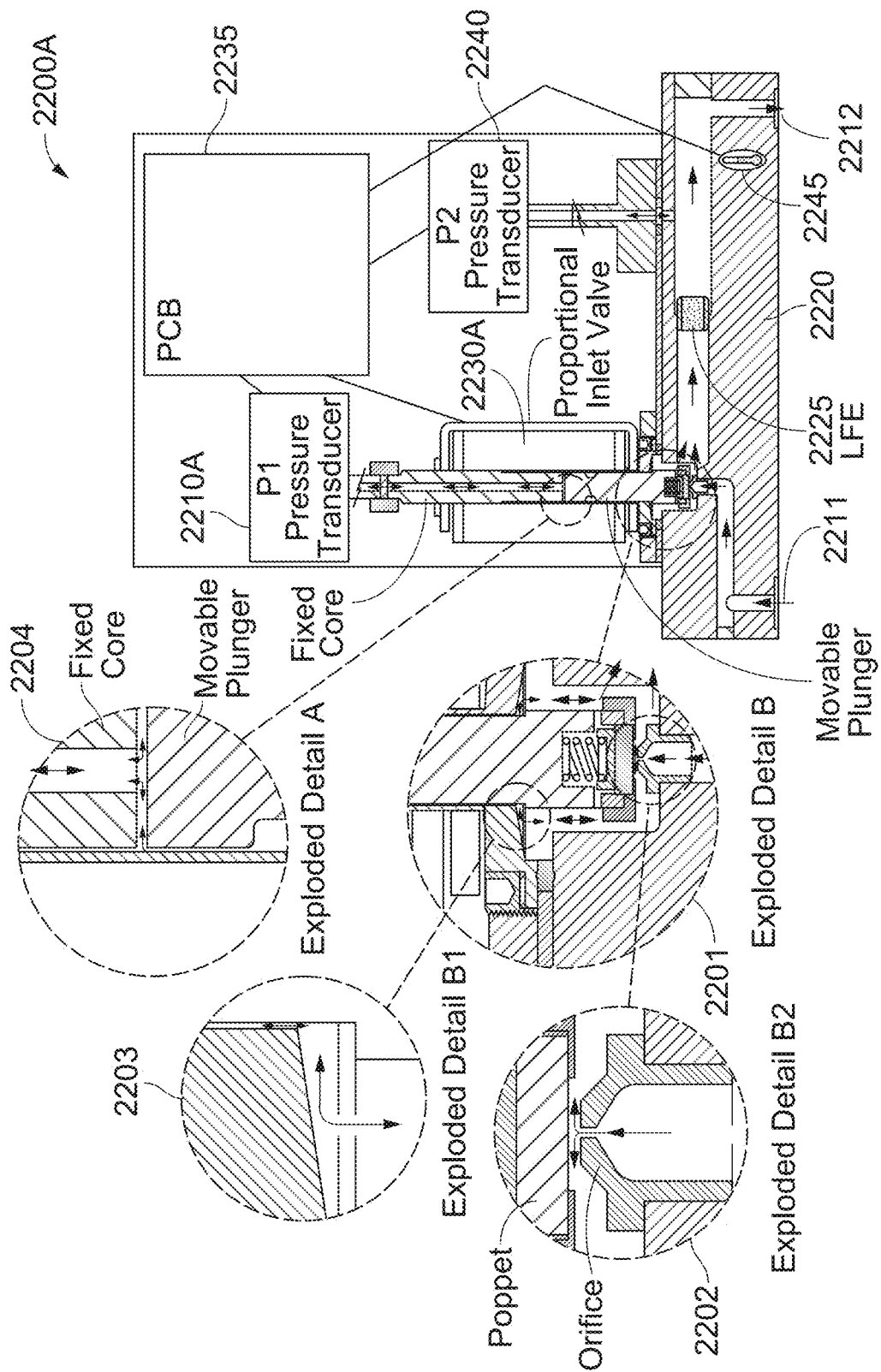
FIG. 8A is a schematic diagram illustrating a layout for a pressure based MFC with a P1 pressure transducer decoupled from a base for a smaller envelope, according to an embodiment.

FIG. 8A is a schematic diagram illustrating a layout for a pressure based MFC 2200A with a P1 pressure transducer 2210A decoupled from a base 2220, according to an embodiment. Because the P1 pressure transducer 2210A no longer occupies space on the base 2220, the envelope can be reduced from the standard size of 4.13" or the freed up space on the base can be used to add additional components and functionality.

The inlet 2211 of the MFC 2200A receives a process gas into a conduit (e.g., an inlet conduit). Nitrogen is an exemplary process gas, but any suitable gas or fluid could be substituted. The conduit can be any suitable tubing, plumbing or machined block, either rigid or flexible. A KS1 substrate block (not shown) as manufactured by Hytron Corporation, serves as an interconnecting platform for the base 2220 of the MFC 2200A and other components for supplying gas to and receiving gas from the MFC 2200A.

The proportional inlet valve 2230A can be a solenoid or other appropriate component physically coupled to the base 2220 to control gas flow through an inlet 2211 of the MFC 2200A. Process gas is received from the conduit (e.g., the inlet conduit) and sent back to the conduit after processing (e.g., the intermediate conduit). Rather than being directly connected to the base 2220, the P1 pressure transducer 2210 is communicatively coupled to monitor process gas internally downstream of from the valve seat and poppet of proportional inlet valve 2230A. In some embodiments, the proportional inlet valve 2230A has a movable portion and a fixed portion, and the P1 pressure transducer 2210A is coupled to the fixed portion.

More specifically, the proportional inlet valve 2230A has a solid upper pole rigidly attached to an outer tube, also rigidly attached to the base of the valve which is sealed to the base 2220 of the MFC 2200A. The mechanism contains the pressurized gas flowing through the proportional inlet valve 2230A. Inside the outer tube a movable plunger is suspended via a radial spring. A conduit is bored through the fixed pole to communicate gas pressure to the P1 pressure transducer 2210A attach to an end of the fixed pole, on top of the proportional inlet valve 2230. As a result, the process gas and its associated pressure can communicate from the exits of the valve seat to the P1 pressure transducer 2210A allowing the P1 pressure upstream of the restrictor to be sensed and controlled.

Details 2201 and 2204 are detail views showing the gas passages connecting the valve seat to the P1 pressure transducer 2210. Detail 2201 shows the small passages that contain gas from the valve seat to the movable plunger. Detail 2202 illustrates the flow passage in the area of the movable plunger and orifice valve seat. Detail 2203 shows the gas passage past the radial spring and into the small annular gap between the movable plunger and the lower details of the fixed outer tube assembly. Detail 2204 illustrates the annular gap passage between the top section of the fixed outer tube assembly and the movable plunger and a second passage between the gap between the movable plunger and the fixed core where it enters the bore drilled through the length of the fixed plunger.

Although these passages are small, little flow is needed to pressurize or depressurize the small volume, hence, the pressure measured by the P1 pressure transducer 2210 effectively represents the pressure at an outlet 2212 of the valve seat and the inlet to the characterized restrictor.

A P2 pressure transducer 2240 measures process gas in the conduit (e.g., outlet conduit) between an LFE 2225 and the outlet 2212. The outlet 2212 delivers the process gas to a next conduit for eventual use by the process. In some embodiments, additional processing is performed on the process gas, such as mixing with other gases, or the like. A temperature sensor 2245 provides temperature readings and a PCB 2235 processes the temperature readings and other information in controlling the components on the MFC 2200A.

Figure 14:
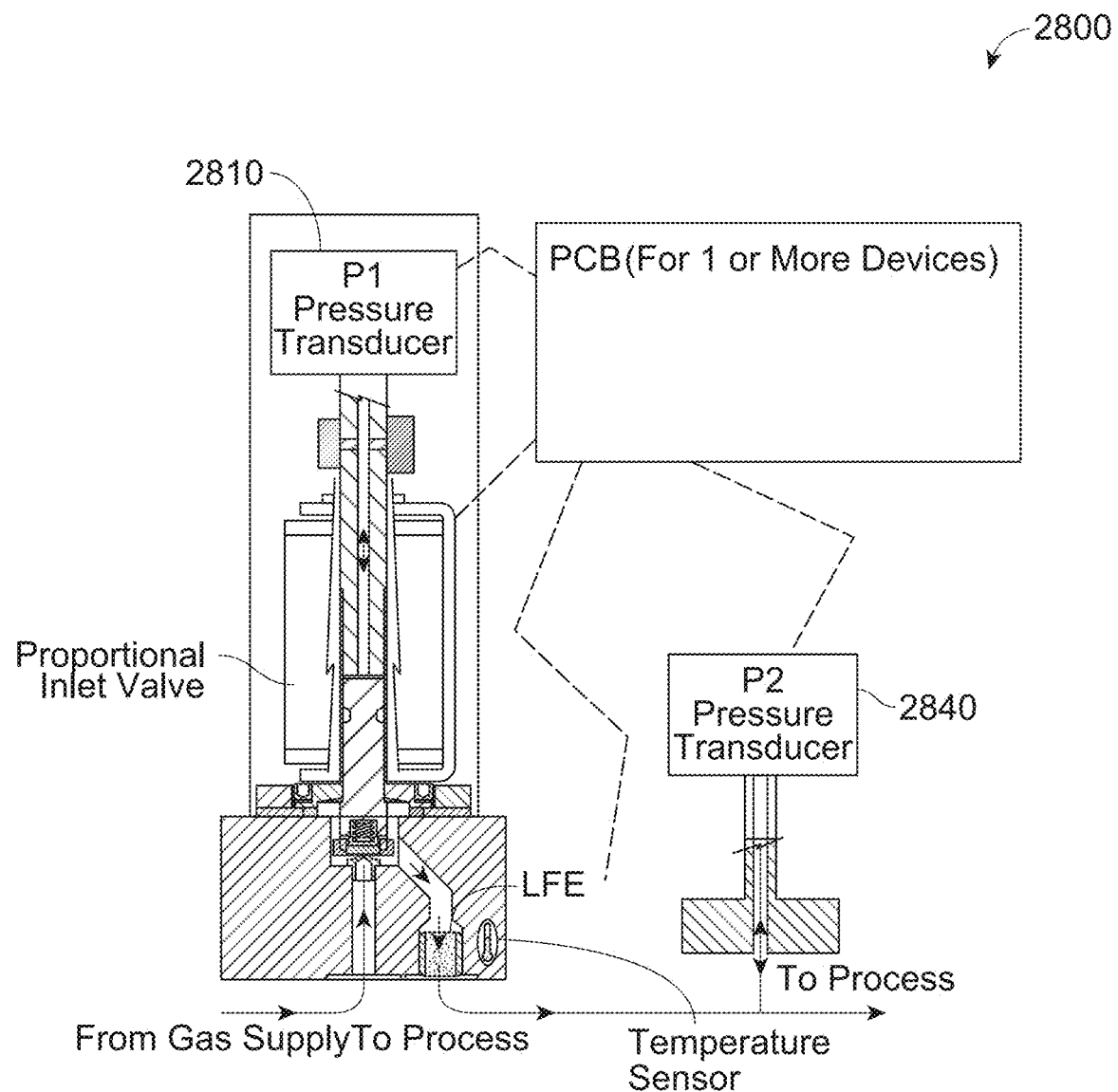
FIG. 14 is a layout for a schematic diagram illustrating a mini integrated gas system (IGS) with a P1 pressure transducer decoupled from the base, and a P2 pressure transducer remotely located, according to an embodiment.
Figure 15:
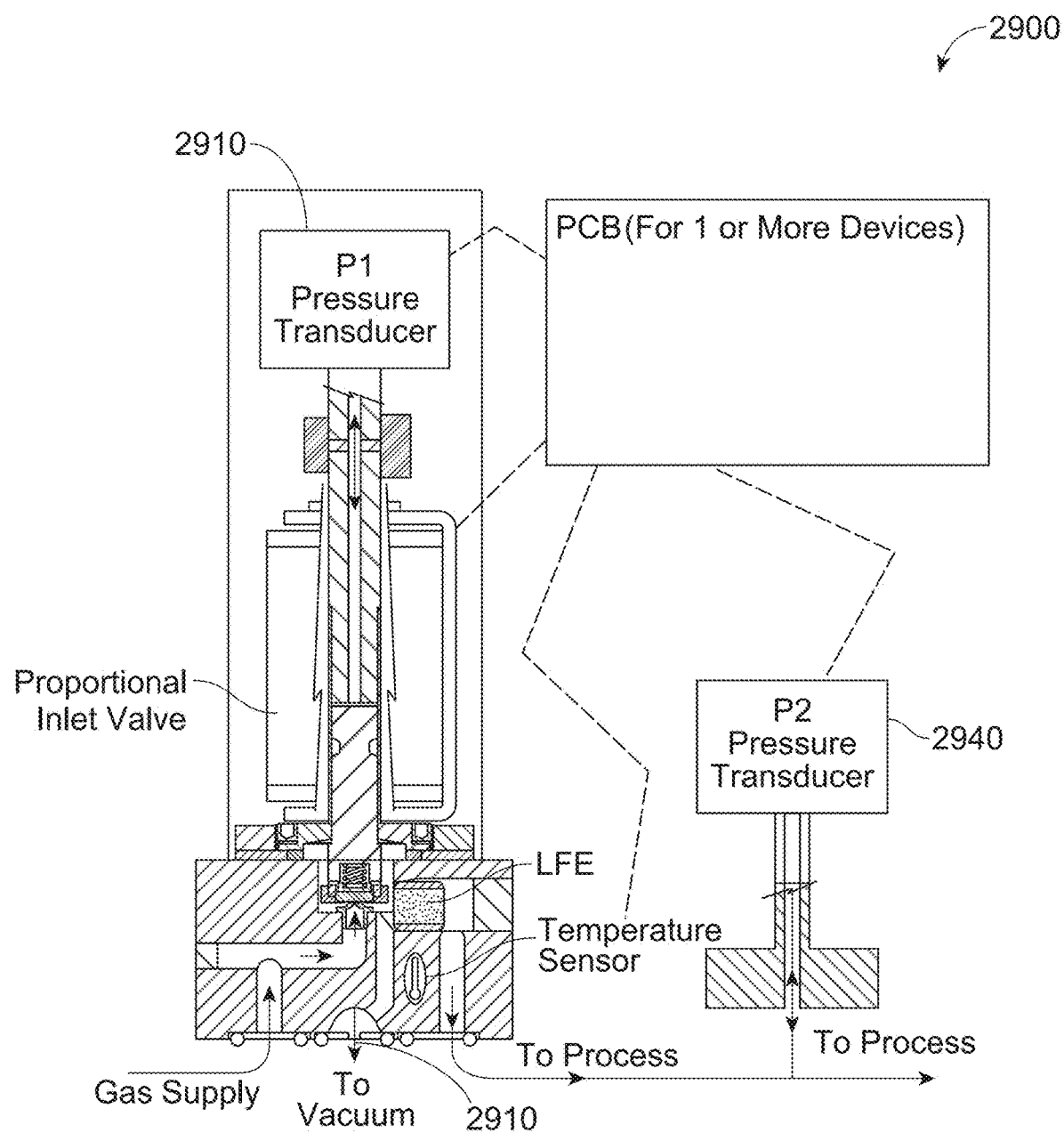
FIG. 15 is a layout for a schematic diagram illustrating a mini IGS with a P1 pressure transducer decoupled from a base, a venting orifice, and a P2 pressure transducer remotely-located, according to an embodiment.

In an embodiment of an IGS style MFC, due to arranging the P1 pressure transducer on top, the MFC functionality can be provided by a smaller envelope (e.g., see FIGS. 14 and 15). In more detail, rather than complying with the traditional interface standard of Semi F82-0304 for a rectangular-shaped interface having a 4.13" long base, the IGS style MFC can comply with the Semi F84-0304 standard for a square-shaped interface having a 1.1" base. Both standards are hereby incorporated by reference in their entirety.

Figure 8B:
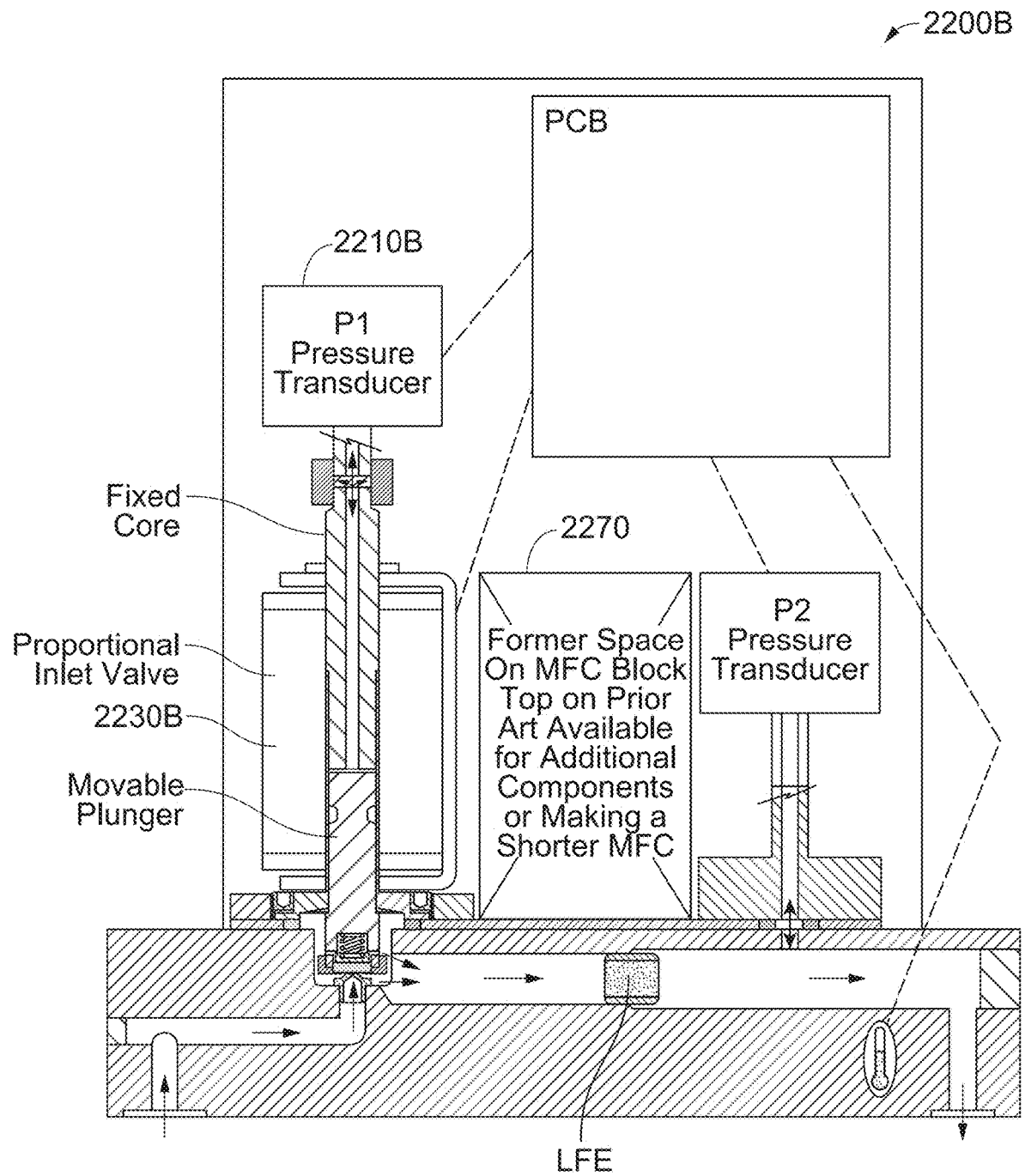
FIG. 8B is a schematic diagram illustrating a layout for a pressure based MFC with a P1 decoupled from the base and with space for an additional component to be coupled to a base within a standard envelope, according to an embodiment.

FIG. 8B is a schematic diagram illustrating a layout for a pressure based MFC 2200B with a P1 pressure transducer 2210B decoupled from the base over proportional inlet valve 2230B and an additional component coupled to the base within a standard envelope, according to an embodiment.

Relative to FIG. 8A, the newly available real estate along the base of MFC 2200B is utilized for integrating one or more additional components 2270 within the standard size envelope rather than reducing the envelope (e.g., see FIGS. 9-13 for examples of additional components).

Figure 9:
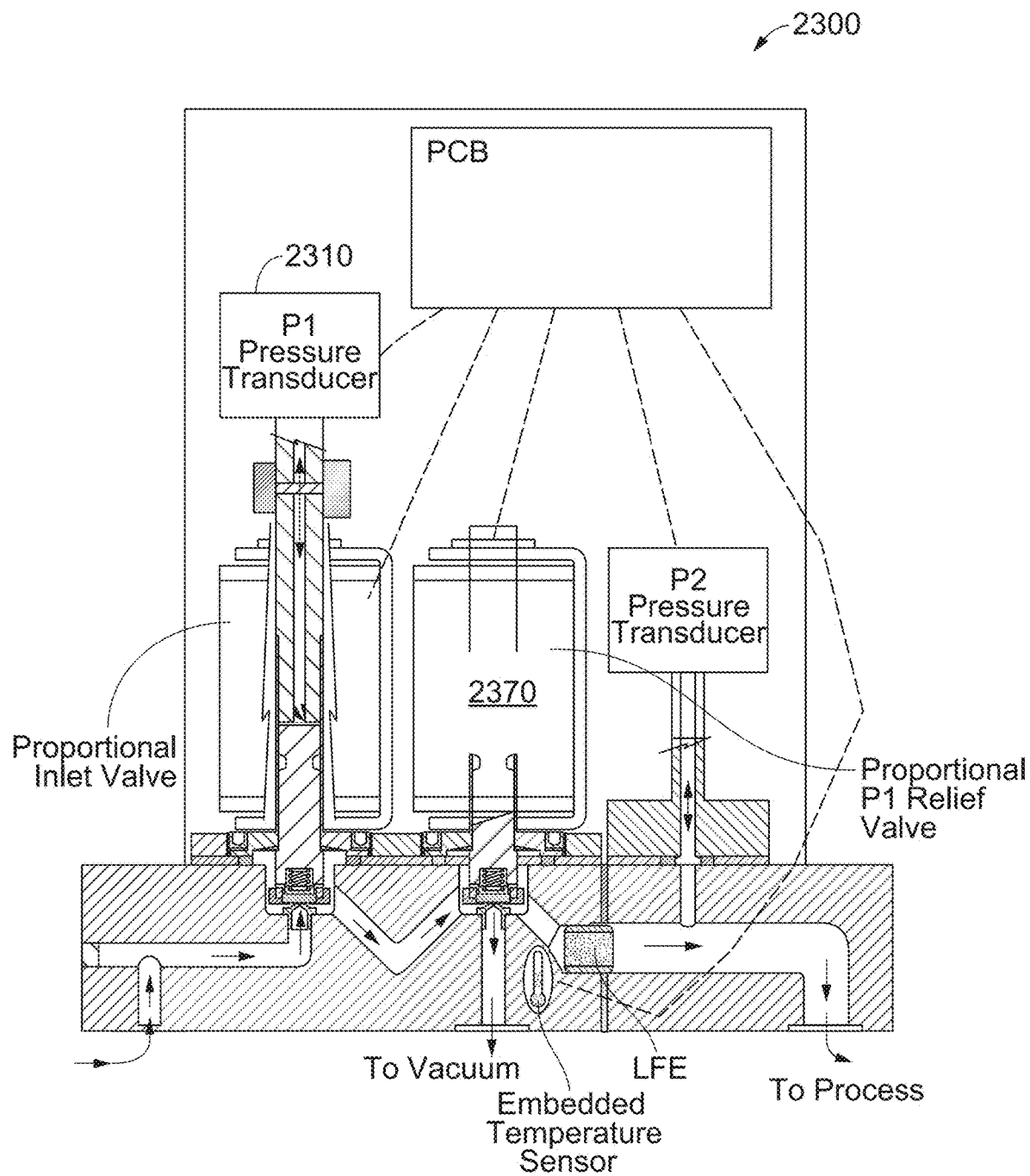
FIG. 9 is a schematic diagram illustrating a layout for a pressure based MFC with a P1 pressure transducer decoupled from A base and a relief valve coupled to the base for rapidly reducing the pressure upstream of the restrictor, to within a standard envelope, according to an embodiment.

FIG. 9 is a schematic diagram illustrating a layout for a pressure based MFC 2300 with a P1 pressure transducer 2310 decoupled from the base and a relief valve 2370 coupled to the base within a standard envelope, according to an embodiment. Space for the relief valve 2370 is enabled by the relocation of the P1 pressure transducer.

For MFCs having a small flow range, 500 sccm and below for example, the pressurized mass of gas between the valve seat of the proportional inlet valve and the inlet of the flow restrictor, the P1 volume, is significant compared to the desired flow rate to the process. Traditionally, when one gives the MFC a command to stop flow, via outputting a set point value of zero, the inlet proportional valve closes immediately but flow continues to bleed through the restrictor and to the process as the pressure in the P1 volume bleeds down to equalize with the pressure downstream of the restrictor. In the current pressure based MFC 2300, the mass at P1 pressures that correspond to 100% full scale flow is roughly 1 to 2 standard cubic centimeters (i.e., 1 scc=1 cc of gas at 0 C and 1 atm). If the MFC is relatively large, say 1000 sccm at full scale, FS, (i.e., 1000 scc per minute) then the mass in the P1 volume is insignificant compared to the working flow rate and it bleeds off relatively quickly. However, flow rates below 1 sccm are now being requested. If the MFC is a 1 sccm FS device the P1 mass is very significant and the time constant of bleeding off the P1 mass is 1 minute. If the process is 5 seconds in length, then having an MFC that continues to flow gas to the process minutes after the command to stop flow, is not an acceptable situation. As a practical matter, the traditional mechanical full scale of pressure based MFC are limited to be above 250 sccm, to avoid this issue. Pressure based MFCs, which are built and labeled with full scales below this value, typically have the large 250 sccm laminar flow element restrictor but operate in the lower range operation by electronically or numerically scaling the flow calculation so that although the device is mechanically large its full scale reading is much smaller. The larger restrictor lowers the P1 pressure and bleeds down the P1 volume quicker, however this method induces larger device calibration drift.

The relief valve 2370 of FIG. 9, by contrast, routes the P1 volume mass to a non-process abatements system via a vent or vacuum pump (also see FIGS. 10, 12, 13 and 15). In operation, a PCB controls a proportional valve controlled by a PCB. When it is desired to reduce the flow from the MFC 2300 faster than the natural bleed down time constant of the bleed off through the restrictor to the process, the proportional P1 relief valve will open and control the P1 pressure to a lesser pressure. The lesser pressure can be controlled to quickly reduce to a lower flow rate or to stop flow. In the IGS 2900 of FIG. 15, an orifice 2910 replaces the proportional valve for cost and space savings. The orifice 2910 is sized to bleed off a mass flow rate typically between 50 and 500 sccm (give a 1 cc P1 volume) to allow the speedy depressurization, relative to the intended process time, of the P1 area. It is noted that an on/off valve might be placed downstream and in series with the vent line if it is desired to reduce the quantity of gas vented. In this case continuous venting is avoided and gas is only vented when it is desired to reduce the P1 pressure.

Figure 10:
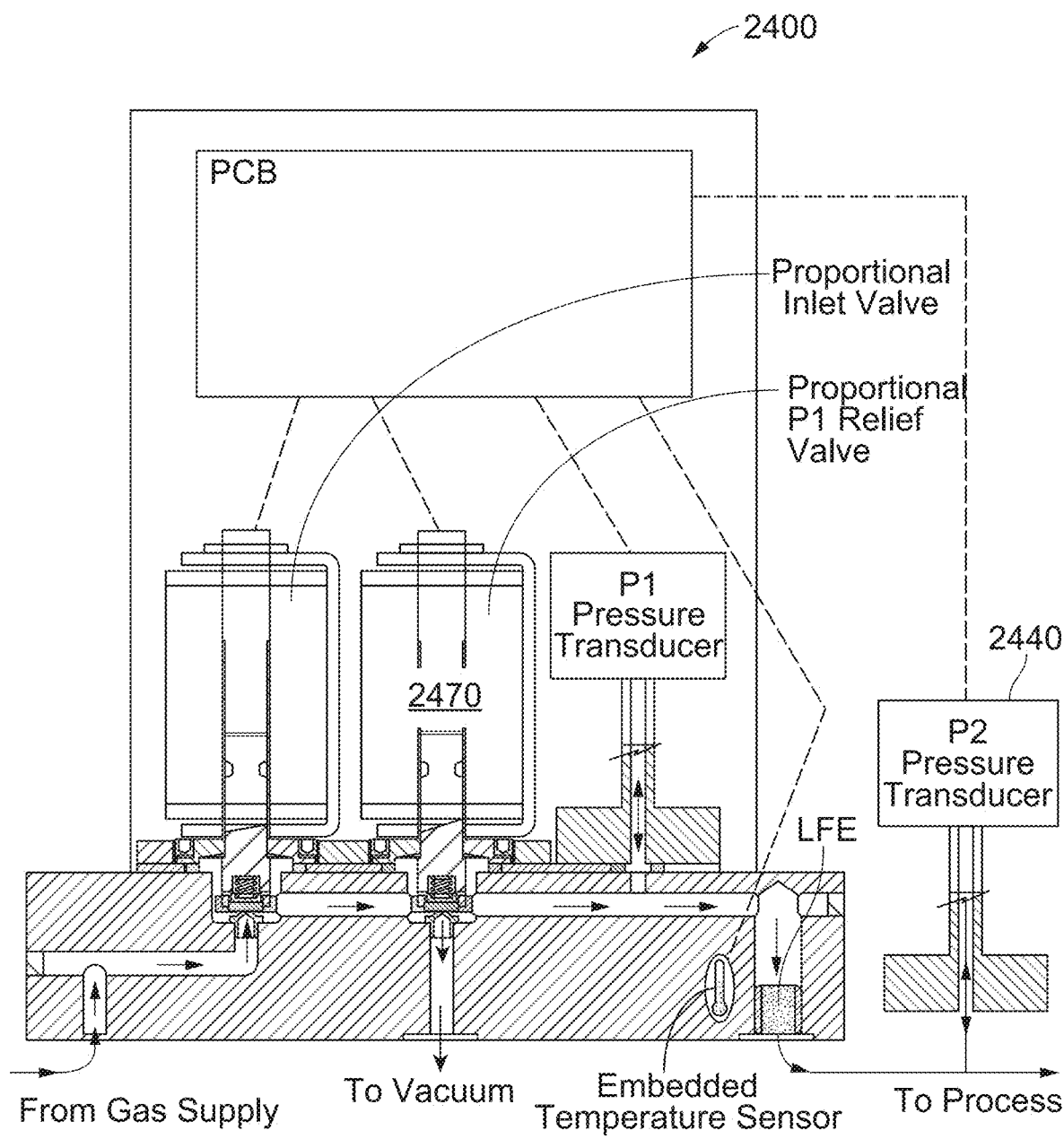
FIG. 10 is a schematic diagram illustrating a layout for a pressure based MFC with A P2 pressure transducer decoupled from a base and located remote to the envelope, and a relief valve coupled to the base, according to an embodiment.

FIG. 10 is a schematic diagram illustrating a layout for a pressure based MFC 2400 with a P2 pressure transducer 2440 decoupled from the base and located remote to the envelope, and a relief valve 2470 coupled to the base, according to an embodiment.

The gas box of a modern semiconductor fabrication tool controls and mixes the flows of multiple gas species. Typically these gases combine at a common header connected to the exhaust of each of different gas sticks contain the different MFCs. Although there is typically a shut off air valve at the end of each MFC, its conductance is sufficiently high compared to the flow rate of the MFC that the pressure of the common header is sufficiently indicative of the P2 pressure seen by the individual MFCs when the shut off air valve is open and gas is flowing from the MFC. As a result, the P2 pressure information from a single pressure transducer located on this exhaust header (via analog or digital connections) can be shared with the PCBs of the individual MFCs to provide the P2 pressure information without the need for individual P2 pressure transducers located on each MFC. Optionally the P2 information may be read by the tool controller and sent electronically to the MFCs. In this layout, space is gained by removing the second pressure transducer allowing a smaller envelope or additional integrated components. Moreover, cost savings is realized because P2 pressure transducers are not needed on each MFC.

In one embodiment, as shown by FIGS. 14 and 15, the P2 pressure transducer 2840, 2940 can be located remotely to an IGS style MFC 2800, 2900. In other embodiments, the P1 pressure transducer 2810, 2910 can be placed on top of the proportional inlet valve as described herein. Furthermore, other embodiments can add a second LFE or a self-relieving valve.

Figure 11:
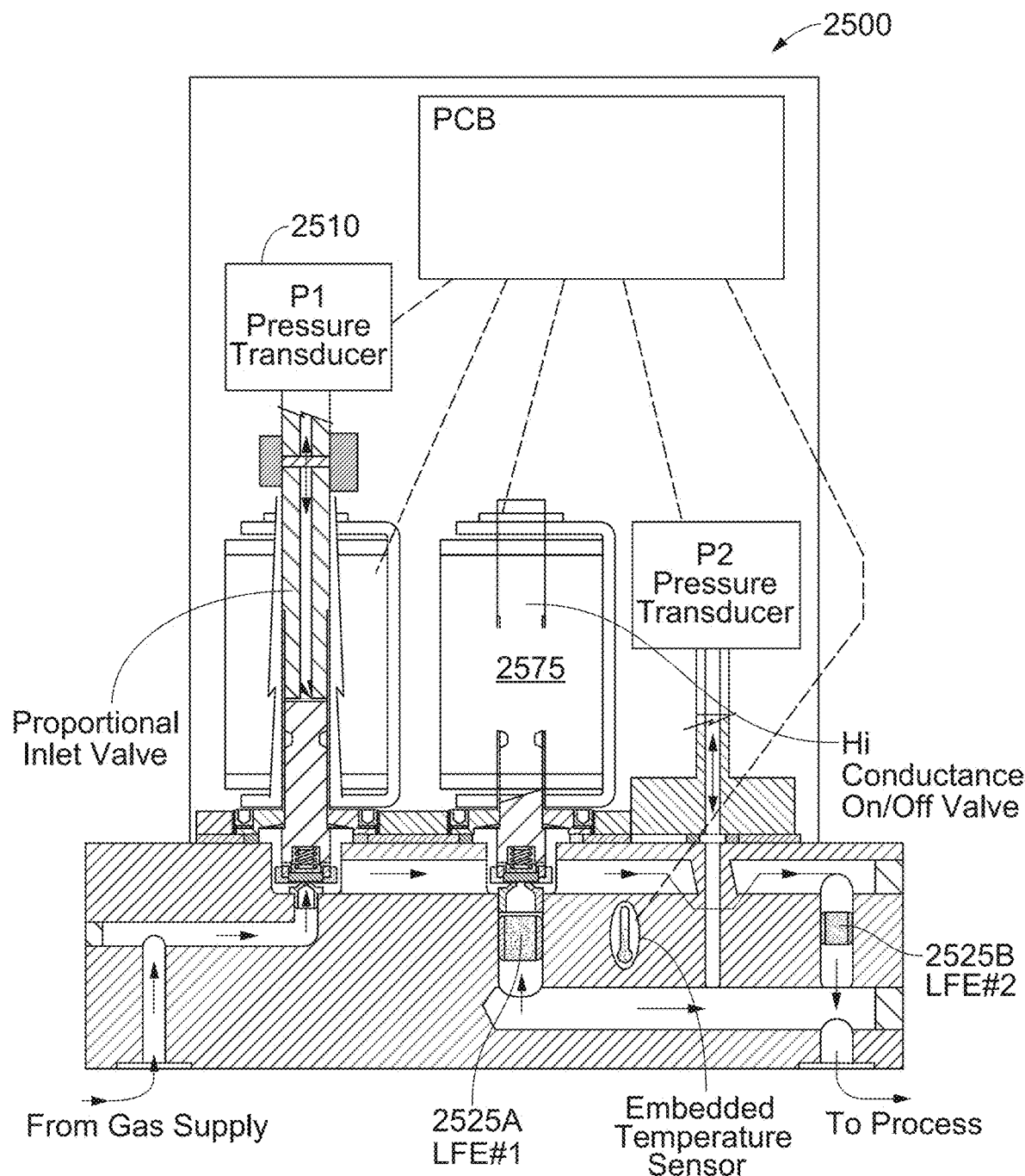
FIG. 11 is a schematic diagram illustrating a layout for a pressure based MFC with a P1 pressure transducer decoupled from a base and a second laminar flow element (LFE), which can be functionally active or inactive by the opening or closing of a high conductance valve in series with the LFE, according to an embodiment.
Figure 13:
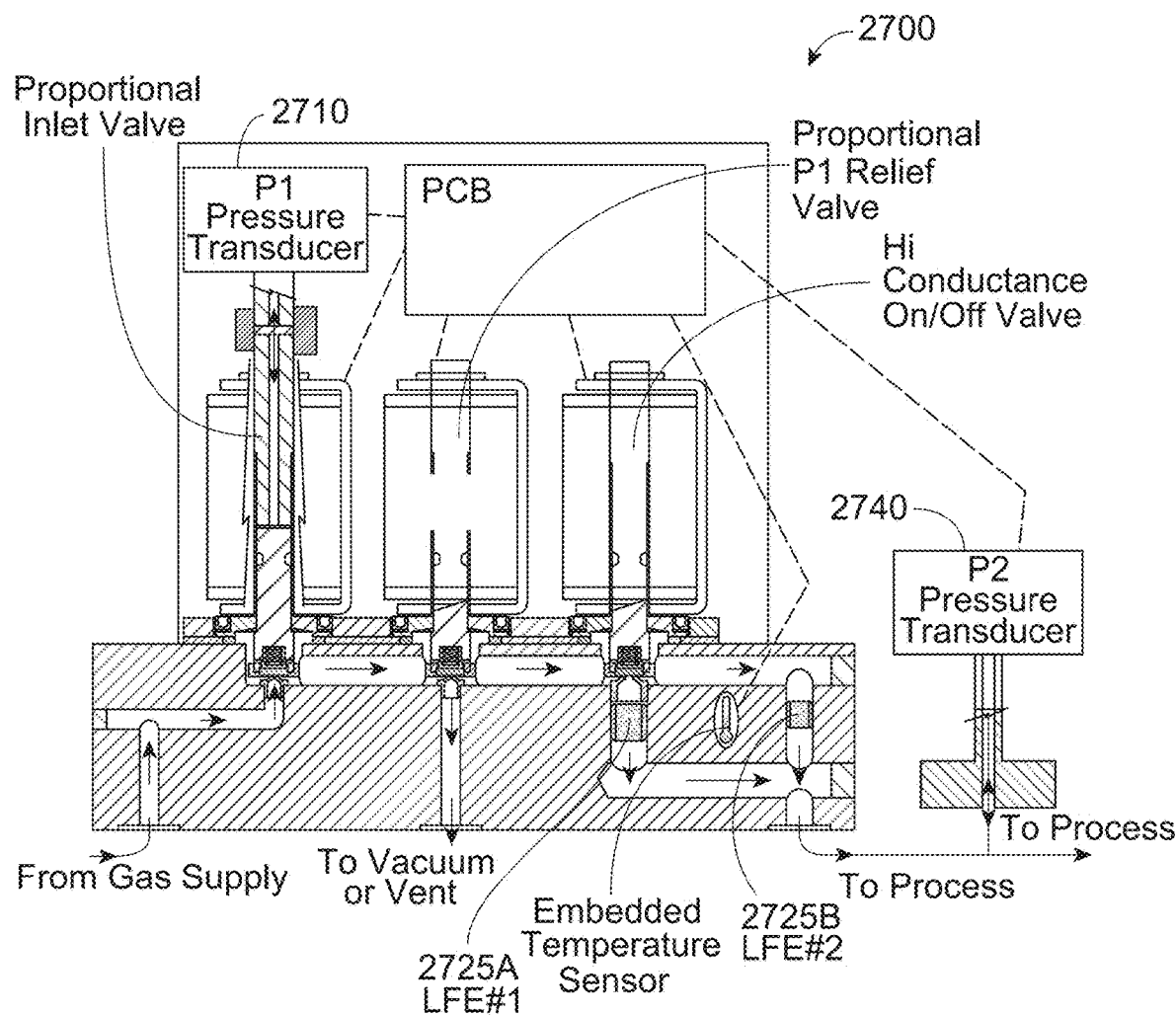
FIG. 13 is a schematic diagram illustrating a layout for a pressure based MFC with a P1 pressure transducer decoupled from a base and a second LFE, and a relief valve, and a P2 pressure transducer decoupled from the base and located remote to the envelope, according to some embodiments.

FIG. 11 is a schematic diagram illustrating a layout for a pressure based MFC 2500 with a P1 pressure transducer 2510 decoupled from the base and a second LFE 2525B, according to an embodiment. In FIG. 13, the MFC with a P1 pressure transducer 2710 decoupled from the base and a second LFE 2725B also has a remotely-located P2 pressure transducer 2740.

Returning to FIG. 11, the second LFE 2525B is configured in series with a high conductance valve 2575. The high conductance valve 2575 for this embodiment can be characterized by a pressure drop through the valve sufficiently small compared to a pressure drop across the second LFE 2225B, such that the flow calculation error induced by ignoring the valve pressure drop is acceptably small. For example, ignoring the pressure drop a standard ¾" valve used in the industry in series with a LFE typically induces a 0.15% R error at 5,000 sccm flow of N2. It is noted that this error can be further reduced, or flow rates increased without loss of accuracy, by numerically correcting the flow calculation based on the characterization of the valve used.

This additional LFE 2525B and valve are placed in parallel with the initial LFE 2525A. When the high conductance valve is closed the MFC 2500 has the full scale of the single initial LFE. When the high conductance valve is open, the MFC 2500 has the full scale of the two LFEs 2525A, 2525B in parallel. By making the added LFE 2525B markedly larger (i.e., much more flow at the same P1 and P2 pressures) than the initial LFE 2525A, the MFC 2500 will have a markedly higher full scale flow capability. Effectively, the MFC 2500 has the novel aspect of operating as a high flow MFC and a low flow MFC that shares the same inlet valve, transducers and PCB in the same package size as other MFCs. The MFC 2500 allows the replacement of multiple gas lines and MFCs for a single gas species, a situation commonly seen in a modern gas box, by a single gas line and MFC saving both space and cost.

The present MFC 2500 meets dueling industry demands for accurate flow control and wider ranges than current MFCs can support. The O2 flow rates from 0.1 sccm to 10,000 sccm are now achievable on the same tool. In other devices, separate O2 MFCs of different full scale values are configured to cover the desired flow range at the intended accuracy. The additional LFE 2525B with the high conductance on/off valve in series can cut the number of O2 (or other gas) MFCs in half, saving space and money. While the initial LFE 2525A of the pressure based MFC 2500 can maintain 1% reading accuracy over a dynamic range of 20 to 1, the dual LFE operation of the MFC 2500, with the proper ratio between the LFE's 2525A, 2525B, can maintain a 1% of reading accuracy over a dynamic range of 20×20 to 1 or 2400 to 1. One of ordinary skill in the art will recognize that a dynamic range of 20 to 1 and a reading accuracy of 1% are just examples that can be varied for different implementations.

Optionally, the two LFEs 2525A, 2525B may be sized to focus on separate flow ranges that are not adjacent but that are further apart. For example, the smaller restrictor controlling flow accurately from 0.5 sccm to 10 sccm and the larger LFE sized to control flows from 200 sccm to 4000 when the high.

In other embodiments a third or more LFEs can be added for additional range.

Figure 12:
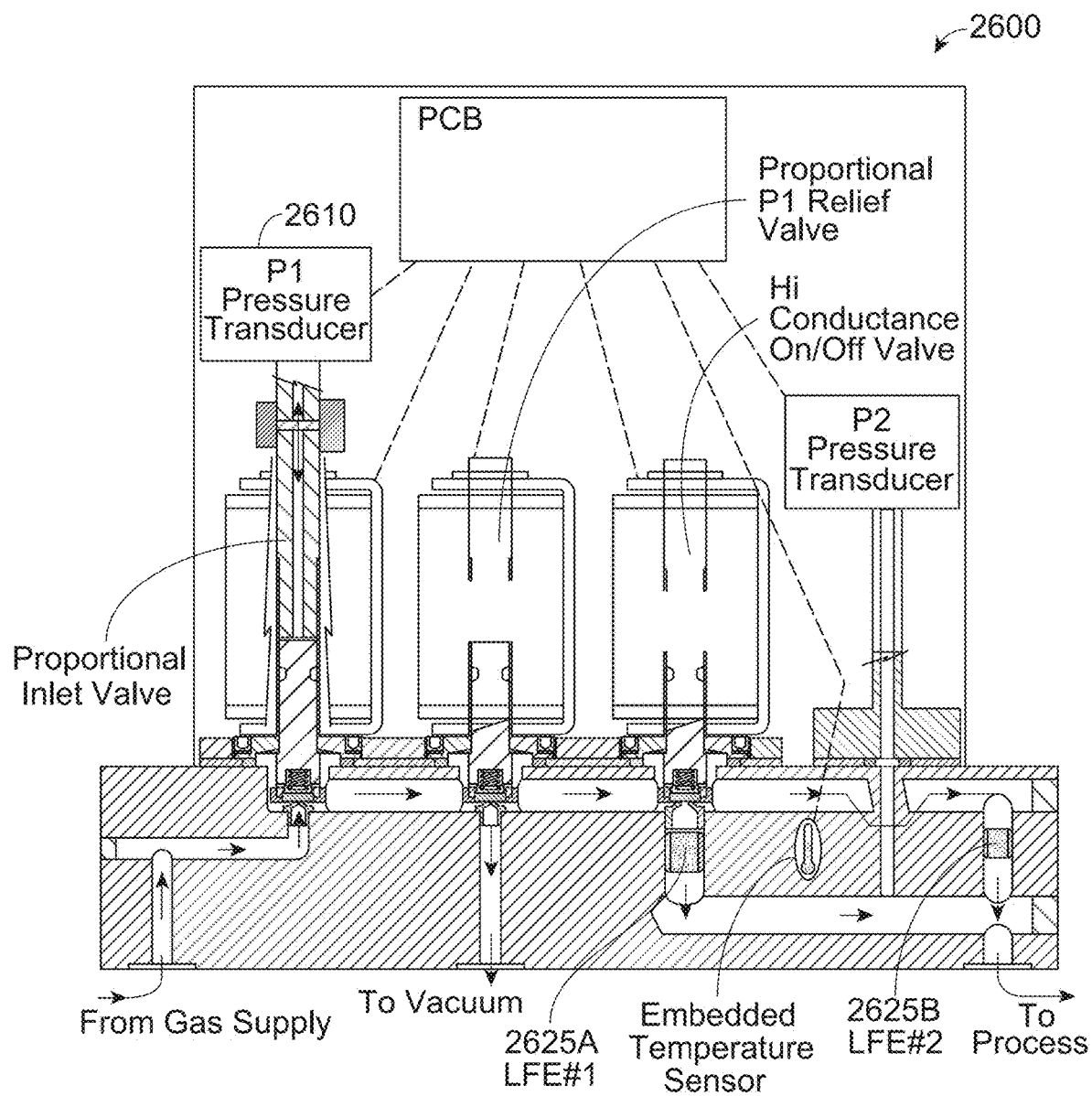
FIG. 12 is a schematic diagram illustrating a layout for a pressure based MFC with a P1 pressure transducer decoupled from a base and the second LFE, and a relief valve, according to an embodiment.

In the layout embodiment of FIG. 12, a pressure based MFC 2600 with a second LFE 2625B (in addition to a first LFE 2625A) also includes a P1 pressure transducer 2610 decoupled from the base, and a relief valve. Additionally, in the layout embodiment of FIG. 13, a pressure based MFC 2700 with a second LFE 2725B (in addition to a first LFE 2725A) with a P1 pressure transducer decoupled and a relief also includes a P2 pressure transducer decoupled from the base and located remote to the envelope. As described above, the P2 pressure transducer can be locate downstream, for example, at a common exhaust header shared by several MFCs.

Section III

MFCs and electronic regulators are important components of delivering process gasses (e.g., N2, O2, SF6, C4F8 ... etc.) for semiconductor fabrication. Of particular interest are the atomic layer deposition (ALD) and three-dimensional integrated circuit (3DIC) processes which require the rapid and repeated changing or the gas species in the process chamber thousands of times to achieve the needed feature.

Changing the gas species in the chamber requires the interruption of the flow on one gas species and beginning the flow of a second gas species. One alternately turns on a Gas A and off a Gas B, and then turns off Gas B and turns on Gas A again. MFCs are normally used to turn on, turn off, and control process gas flows, however commercially available MFCs are slow to turn on and achieve controlled flow, typically having response times between 0.3 and 1.0 seconds, thereby creating a bottleneck in semiconductor processing, particularly for ADL and 3DIC processing.

Other techniques mitigate the processing bottleneck by using an MFC operating at a steady state and flowing into an on-off valve that opens and closes more rapidly (e.g., every 10 to 50 msec). With this approach, pressure builds up behind the on-off valve when closed during an off cycle because of the MFC continuously flows into an accumulation volume between the MFC and the on-off valve. Unfortunately, as shown in FIG. 16, when the on-off valve is opened at the beginning of an on cycle, the built up pressure in the accumulation volume initially causes a large flow of gas that quickly decays in magnitude to the steady state flow of the MFC as the stored pressure and mass is released, due to a small time constant from a low flow resistance (or nearly no flow resistance) in the on-off valve.

Figure 16:
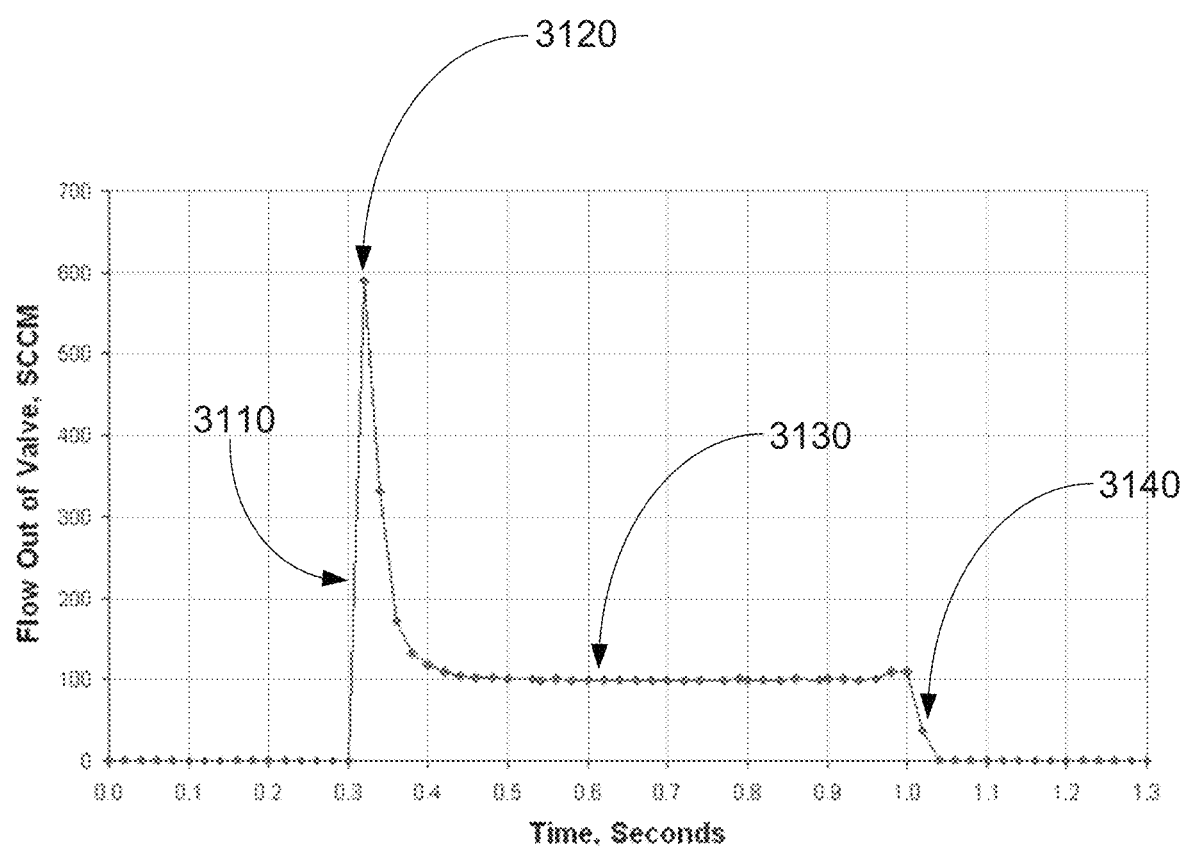
FIG. 16 is a graph of test data collected using special instrumentation to show an output wave produced by a MFC-based system having an undesirable initial spike.

FIG. 16 shows a graph 100 of test data collected using special instrumentation to show an output wave produced by a system using an embodiment of the current method. During normal processing of semiconductors, instrumentation to observe the output wave in not available and thus actual flow profiles are unseen and often unknown. Problematically, a large, initial spike 120 is produced at the beginning of an on cycle. Due to the pressure build up when the on-off valve is closed, and high conductance of the on-off valve when opened, the process gas rushes through quickly in a ramp up 110 before peaking and then settling to a steady-state flow level 130 as desired. The magnitude ramps down 140 when the on-off valve is again closed during the off cycle.

The initial spike 120, however, is undesirable because it introduces an unseen, unintended, and uncontrolled event. This event can vary from system to system depending on the specific of the plumbing, air valves and supply pressure actuating the on-off valve (assuming the on-off valve is an air operated valve), and introduces a random element introducing variation in a process in which repeatability is desired. In addition, the presence of this large transient gas flow has been largely unknown and generally, large overshoots in gas flow are undesirable.

Therefore, what is needed is a technique in gas delivery systems to overcome the above shortcomings by repeatable outputting fast square waves of flow, which is reproducible from system to system, while minimizing an initial spike.

Discussed below is a gas delivery apparatus, and methods, to output a process gas as rapid square waves by increasing a time constant of a gas flowing to a process during an on cycle, by installing flow restrictor having a specific high impedance.

Square Wave Output Characteristics of a Gas Delivery System

Figure 17A:
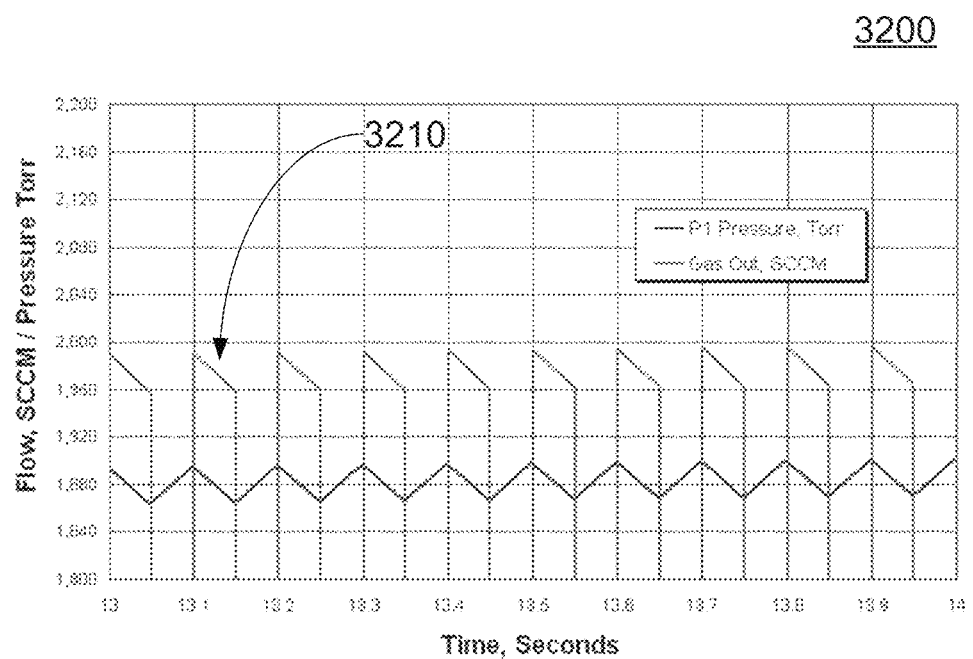
FIG. 17A is a graph illustrating the results of a computer simulation showing a series of square output waves produced by a gas delivery system with a properly sized and installed flow restrictor, in accordance with an embodiment of the present invention

FIG. 17A is a graph 3200 illustrating the results of a computer simulation showing a series of square output waves produced by a gas delivery system with a properly sized and installed flow restrictor, in accordance with an embodiment of the present invention. Given the gas pressures used and the conductance of the on-off valves typically used with the current method, the addition of a flow restrictor can increases the flow impedance and hence the a time constant of the flow out of the on-off valve up to, for example, 60,000 times. The resulting square waves (such as square wave 3210) are characterized by an on cycle at a desired magnitude of flow (and only minor decay which is affected by the sizing of the restrictor impedance for process gas flow), and an off cycle at a zero magnitude. During the on cycle, the magnitude ramps up over a leading edge, outputs at the desired magnitude during steady-state flow, and then ramps down to the zero magnitude over a trailing edge. During the off cycle, the magnitude preferably remains at zero.

Output waves are referred to as square waves, as an ideal, because of a desired consistent, steady-state magnitude during an on cycle. In implementation, the output waves are only substantially square or quasi-square waves because of limitations from physical characteristics of the system. Specifically, decay while outputting at the desired magnitude is referred to as droop and results from a time constant of the system as configured, as discussed below. An increased pressure, and hence accumulation mass, maintained in an accumulation volume during the on cycle, due to the increased flow impendence by adding the restrictor, keeps the output magnitude more consistent than the original rapidly decreasing pressure due to the low flow impendence. Relative to the output wave 3110 of FIG. 16, the undesirable spike at ramp up been eliminated due to the drastically increased time constant designed from installation of a flow restrictor. Accordingly, during the on cycle, flow from an accumulation volume is relatively constant.

Figure 17B:
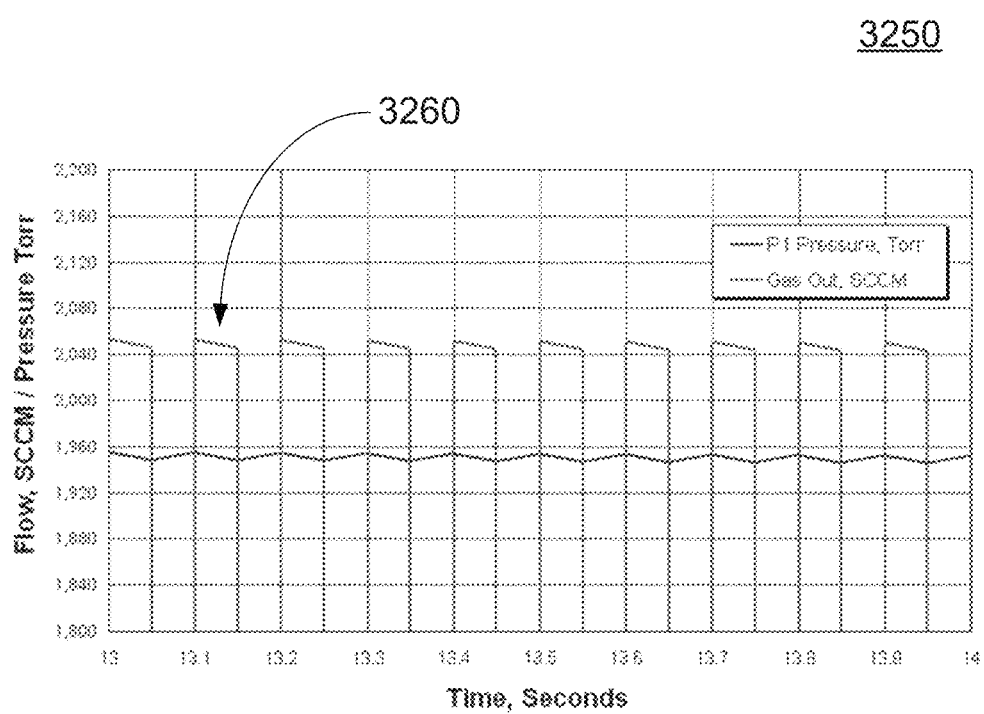
FIG. 17B is a graph of square output waves produced by a gas delivery system with a property sized and installed flow restrictor, and an increased accumulation volume, in accordance with an embodiment of the present invention.

FIG. 17B is a graph 3250 of square output waves produced by a gas delivery system with a property sized and installed flow restrictor, and an increased accumulation volume, 5 times the value of FIG. 17A, in accordance with an embodiment of the present invention. The square waves (such as wave 3260) possess the same advantage as the square waves of FIG. 17A in eliminating the large spike at ramp up. The droop, however, in the MFC embodiment is less prominent because the increased accumulation volume further increases the time constant relative to FIG. 17A.

Methods for producing the improved fast square waves, and hardware for producing such square waves, are discussed below.

Methods for Square Wave Output of Gas Delivery

Figure 18:
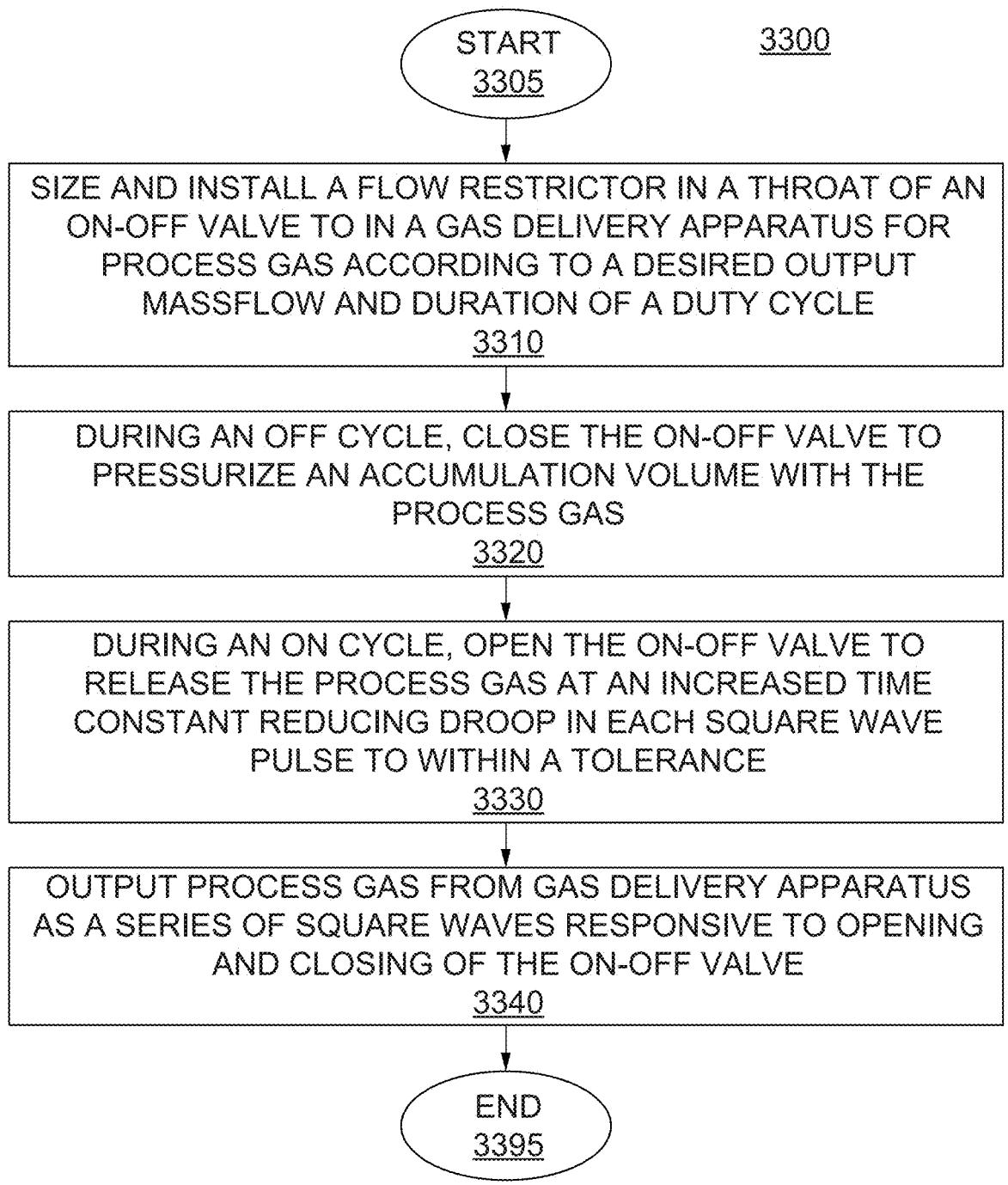
FIG. 18 is a flow chart illustrating a method for producing square waves in a gas delivery system, according to an embodiment of the present invention.

FIG. 18 is a flow chart illustrating a method 3300 for producing square waves in a gas delivery system, according to an embodiment of the present invention.

At step 3310, a flow restrictor is sized and installed in a throat of an on-off valve. A proper size primarily depends on the available supply pressure, a desired output flow (e.g., a maximum flow target), and a ratio of the on-cycle time to the total on-cycle and off-cycle time, and the desired time constant (which determines droop). For instance, the lower the selected flow coefficient, i.e. higher flow impendence, of a flow restrictor, the higher the resulting pressure drop across the combination of the on-off valve and the flow restrictor. The relationship of time constant to wave shape is described in association with FIGS. 19A-D.

During an off cycle at step 3320, the on-off valve is closed, so the process gas builds pressure in an accumulation volume of conduit located upstream from a wave generation component. For example, an MFC in the wave generation component can deliver a continuous predefined mass flow to the accumulation volume, or an electronic regulator in the wave generation component can pressurize the accumulation volume, based on set points calculated by processors. As a result, pressure builds in the accumulation volume until the on-off valve opens.

During an on cycle at step 3330, the on-off valve is opened, allowing the process gas to pass through a throat of the on-off valve, through the flow restrictor. Because the on-off valve essentially has nearly infinite impedance when closed and nearly zero impedance when open, gas delivery is unregulated at this point, leading to a spike if a restrictor of markedly higher impedance has not been placed in series with the on-off valve.

However, under the present technique, the flow restrictor is characterized with a significantly higher impedance, relative to the on-off valve, to further regulate gas flow. In some embodiments, the impedance is selected to drastically increase a time constant during a specific duration of the on cycle by decreasing a flow capacity on the order of, for example, 60,000 times or more while still delivering gas at an appropriate magnitude of flow, as described more fully below.

At step 3340, process gas is output from the gas delivery apparatus as a series of (quasi) square waves responsive to opening and closing of the on-off valve.

FIGS. 19A-D are graphs illustrating time constant decay for a linear gas delivery system, according to one embodiment of the present invention. One of ordinary skill in the art will understand, given the disclosure herein, application of the same principles to a non-linear gas delivery system.

Figure 19A:
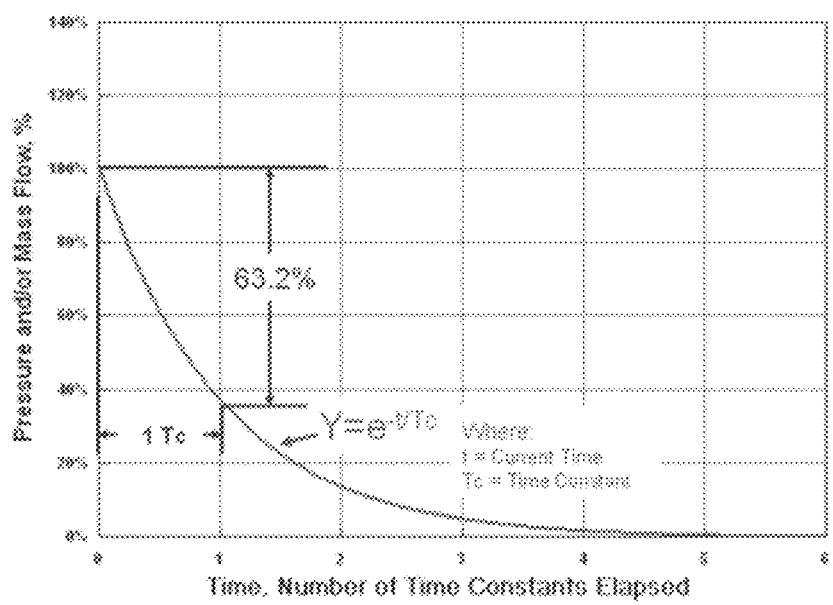
FIGS. 19A-D are graphs illustrating time constant decay for a linear gas delivery system, according to one embodiment of the present invention.

In FIG. 19A, a time constant is defined as the amount of time required for an initial variable (pressure or mass flow) to decay by 63.2% in route to steady state flow at 0%. The time constant is a defined as: Tc=(V*DP)/m, where V is an accumulation volume, DP is a total variable drop (pressure or mass flow) between an initial time and infinity, and m is the initial mass flow rate (or pressure drop rate) out of the accumulation volume. Therefore, the time constant is a function of the initial mass flow rate which is drastically reduced by a flow restrictor to drastically increase the time constant. Furthermore, the time constant is also a function of accumulation volume and can be increased to further raise the time constant. Accumulation volume, however, is limited to the available space for the device and, as such, cannot be viably increased to have the same order of affect as the flow restrictor impedance.

Figure 19B:
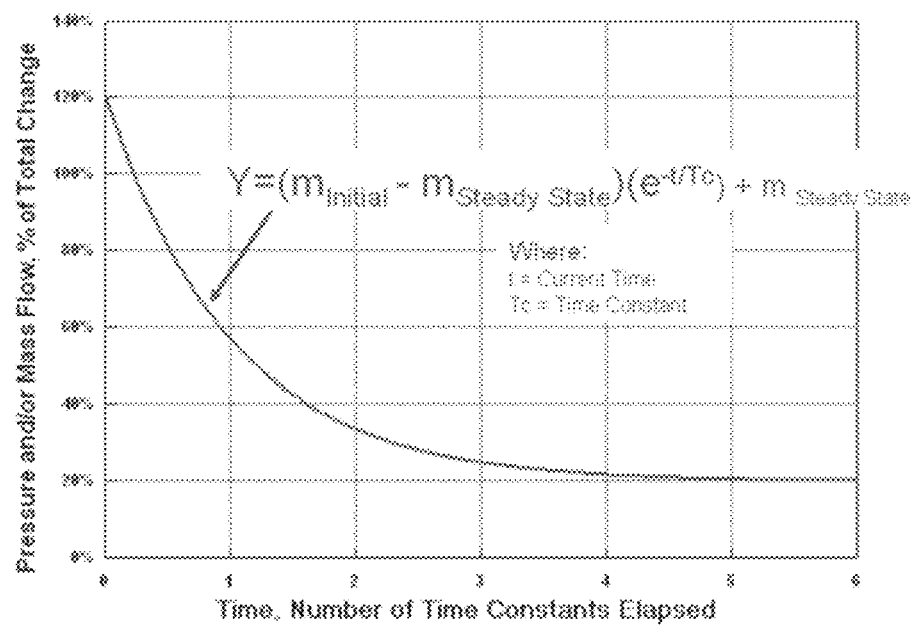

In contrast to FIG. 19A, in FIG. 19B, a 20% flow into the volume is superimposed on the decay as described in FIG. 19A which results in a 20% flow at steady state flow after several time constants have passed.

Figure 19C:
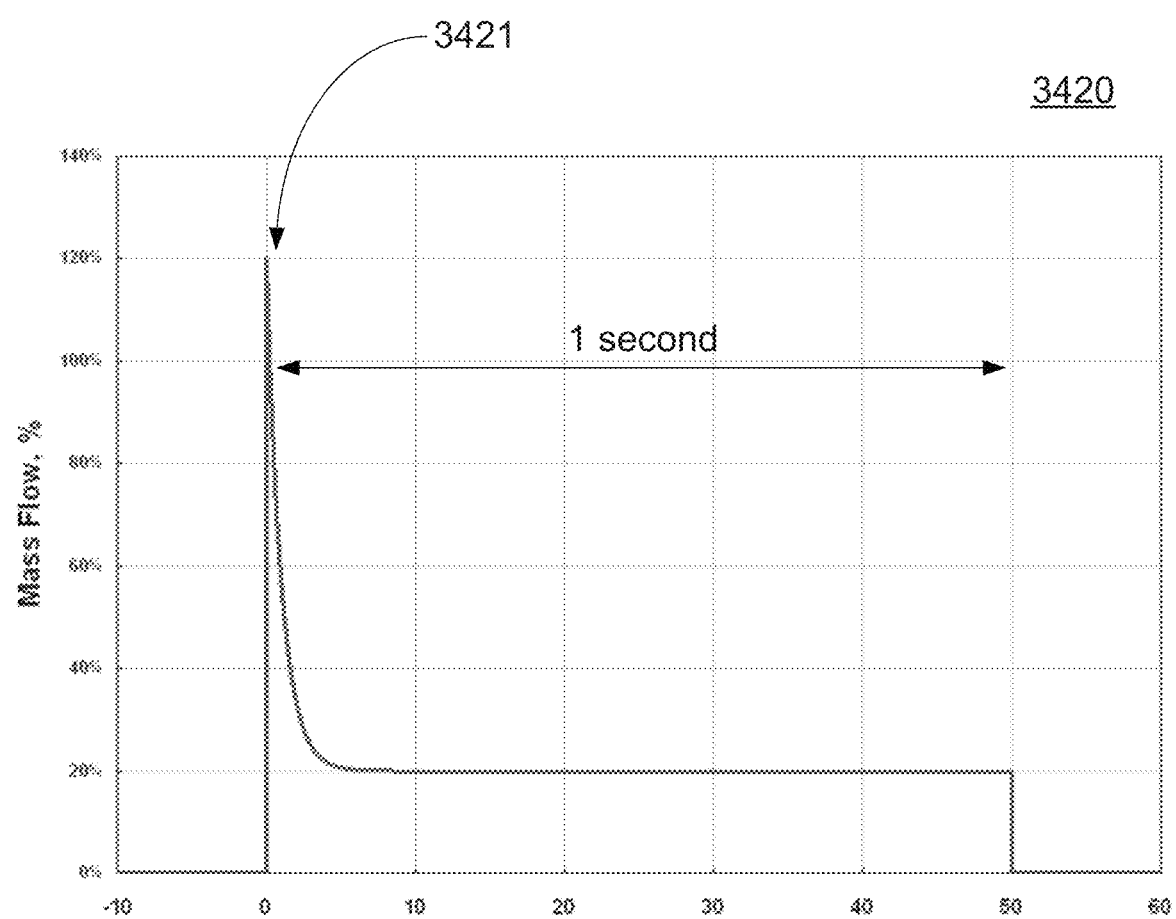
Figure 19D:
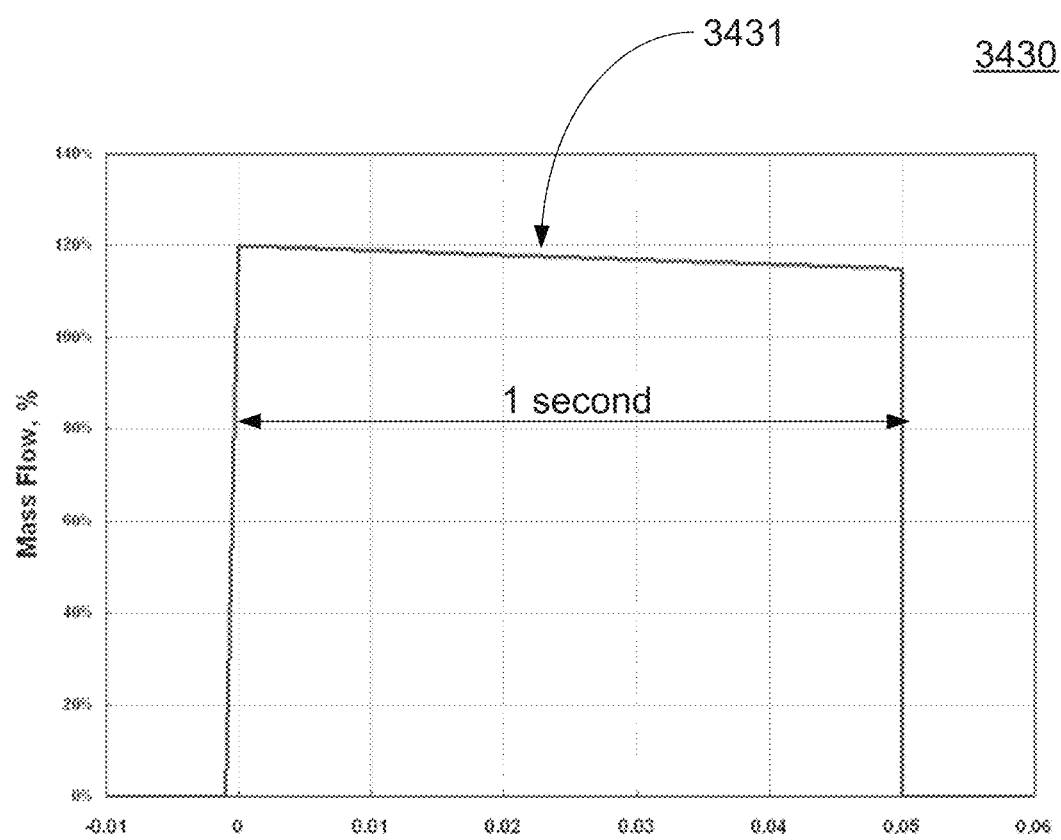
Figure 20:
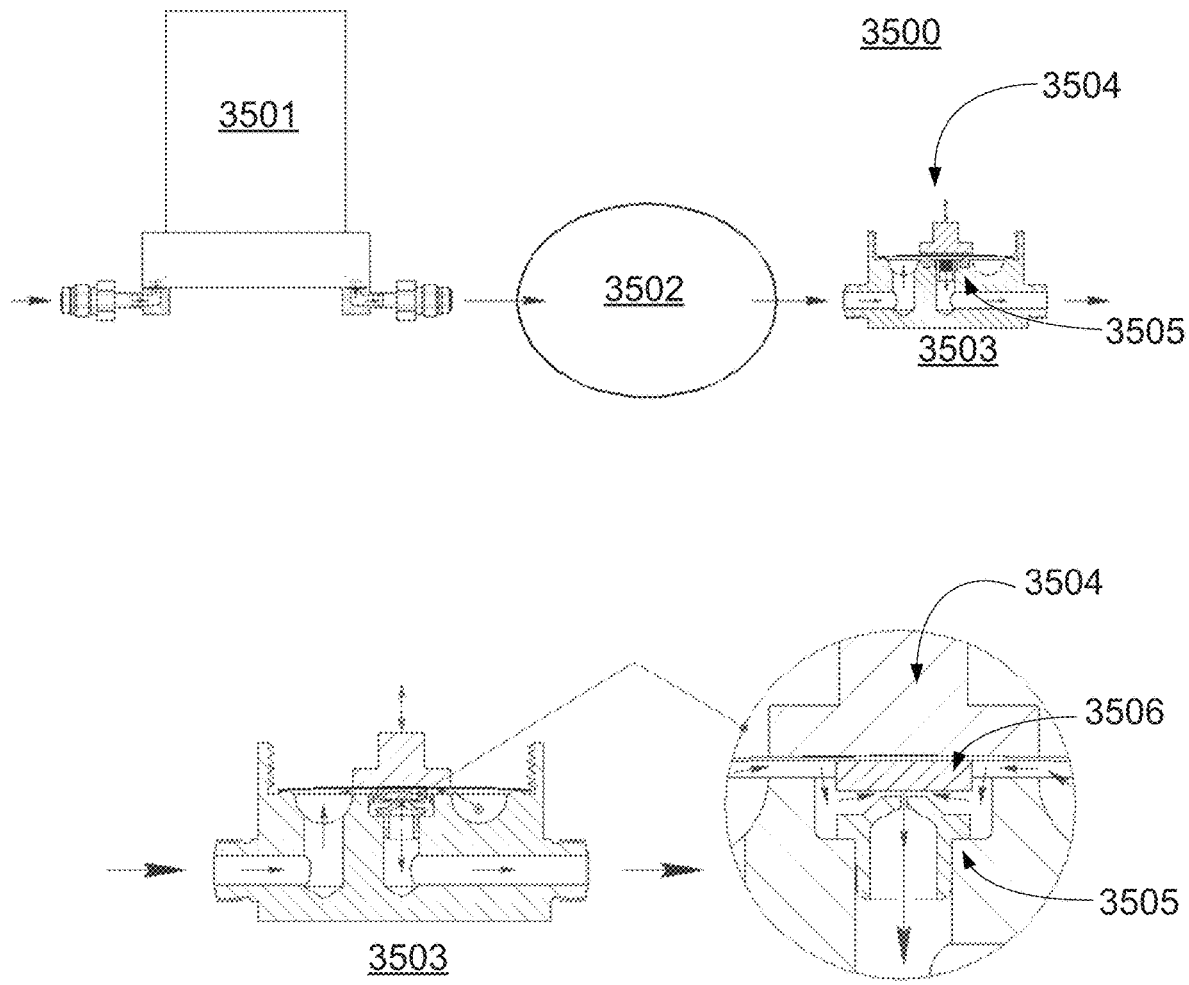
FIG. 20 is a high-level schematic diagram conceptually illustrating a system 500 to produce a square wave using an MFC, according to one embodiment of the present invention.

In FIG. 19C, the decay of FIG. 19B to 20% flow is shown over a large span of time constants for a 1 second on cycle. From this perspective, the decay to steady state resembles the system of FIG. 16, with a large spike 3421 at ramp up before reaching steady state. In other words, a time decay of the spike is small relative to an on cycle. On the other hand, FIG. 19D shows a time decay that is large relative to the same 1 second on cycle. Fewer time constants elapse in FIG. 19D than 19C over the same amount of time, so the spike 3421 is reduced to a modest droop 3431. The period of interest for the on cycle of a square wave according to FIG. 19D ends before significant pressure decay from the large time constant. The pressure decay from the smaller time constant of FIG. 19C is undesirable.

Accordingly, a flow restrictor is introduced to a gas delivery system markedly increases the decay time in order to bring droop, during an on cycle, within tolerance of a specific semiconductor process.

Systems for Gas Delivery a Square Wave Output

FIG. 20 is a high-level schematic diagram conceptually illustrating a system 3500 to produce a square wave using an MFC, according to one embodiment of the present invention.

A wave generation system or component includes an MFC 3501 coupled to an on-off valve 3504 within component 3503. An accumulation volume 3502 is shown conceptually as an aggregate of volume between the MFC 3501 and the on-off valve 3504. For instance, conduit volume, spacing within components, and even additional accumulation chambers can all add to a total accumulation volume.

The on-off valve 3504 can be air actuated to move up and down to open and close during on and off cycles, respectively. When the on-off valve 3504 moves up to open, process gas in the conduit is markedly unrestricted by the open valve seat of the on off valve but is primarily restricted by flow restrictor 3505. The flow restrictor 3505 is sized and installed in a throat of an on-off valve seat 3506. The restrictor 3505 can be selected so that the flow impendence provides a predefined amount of restriction to gas flow from the accumulation volume 3502. Sizing can refer to a size of an opening, porosity of a sintered media, or diameter of a long capillary tube. In some embodiments, a flow node is implemented in component 3503, as shown in FIG. 21.

Figure 21:
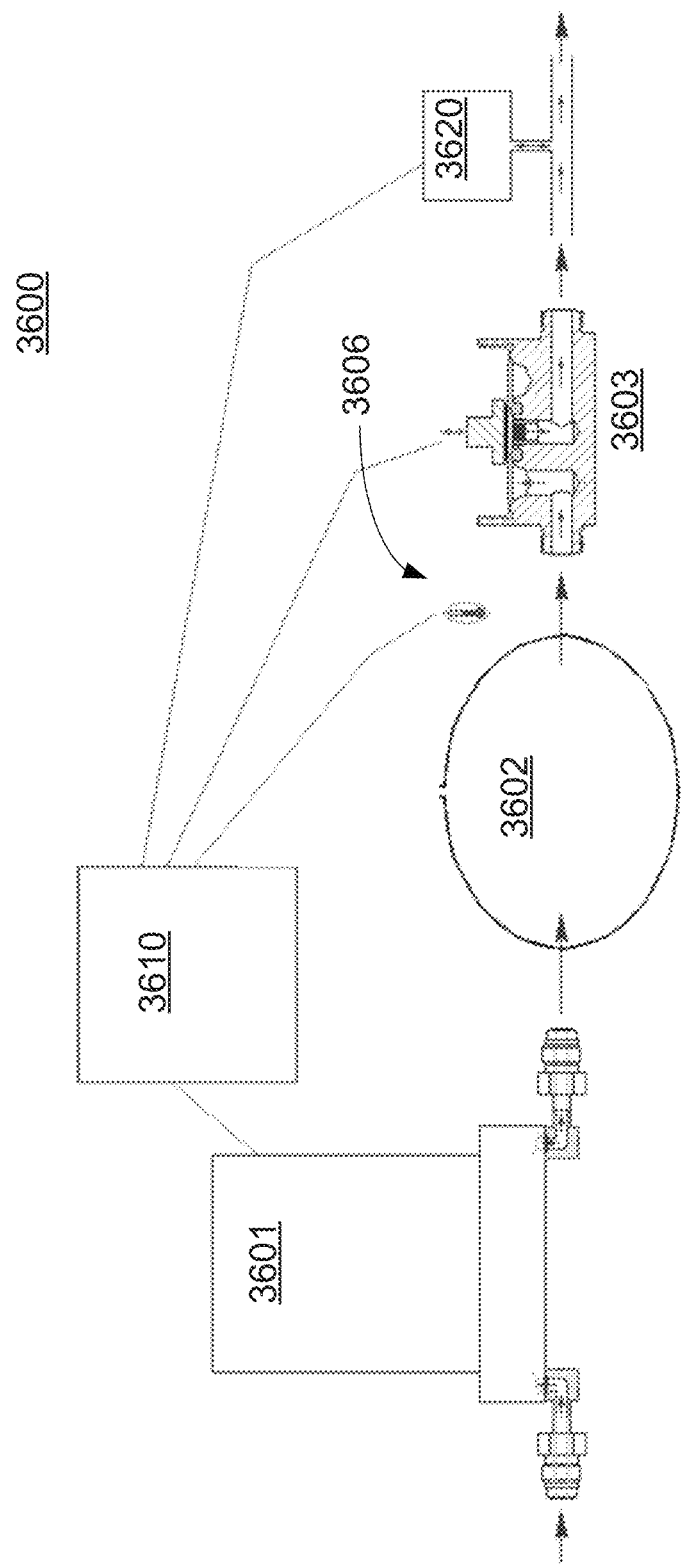
FIG. 21 is a schematic diagram illustrating a system 600 to produce a square wave using a flow node, according to one embodiment of the present invention.

FIG. 21 is a schematic diagram illustrating a system 3600 to produce a square wave optionally using a flow node, according to one embodiment of the present invention. In general, a flow node can be used along with a pressure reading from the electronic regulator 3601 to measure pressure at the inlet of the restrictor, even if the restrictor is downstream of the valve seat of the on-off valve, because the flow resistance is negligible between the on-off valve seat in component 3603 and the upstream electronic regulator 3601. In alternative embodiments, electronic regulator 3601 is replaced with a proportional valve operating in conjunction with a pressure transducer coupled to accumulation volume 3602. Note that the downstream pressure transducer 3620 may be needed for laminar and molecular flow restrictors but typically is not needed when using a sonic flow restrictor.

The space consumption and cost of a second local pressure transducer on the accumulation volume is not needed to know the pressure at the inlet to the restrictor. It is needed when using only a proportional valve but not with the e-reg present. A temperature sensor 3606 (located within component 3603) detects temperature (e.g., a flow restrictor and/or temperature of the process gas) and allows for accommodation of temperature measurement typically used in a massflow calculation utilizing pressure based methods. A PCB 3610 includes electronics to calculate flow and to adjust operation of the electronic regulator 3601 (or other device) based on feedbacks from the temperature sensor and pressure sensor(s) 3606, and the optional downstream pressure transducer 3620.

Figure 22:
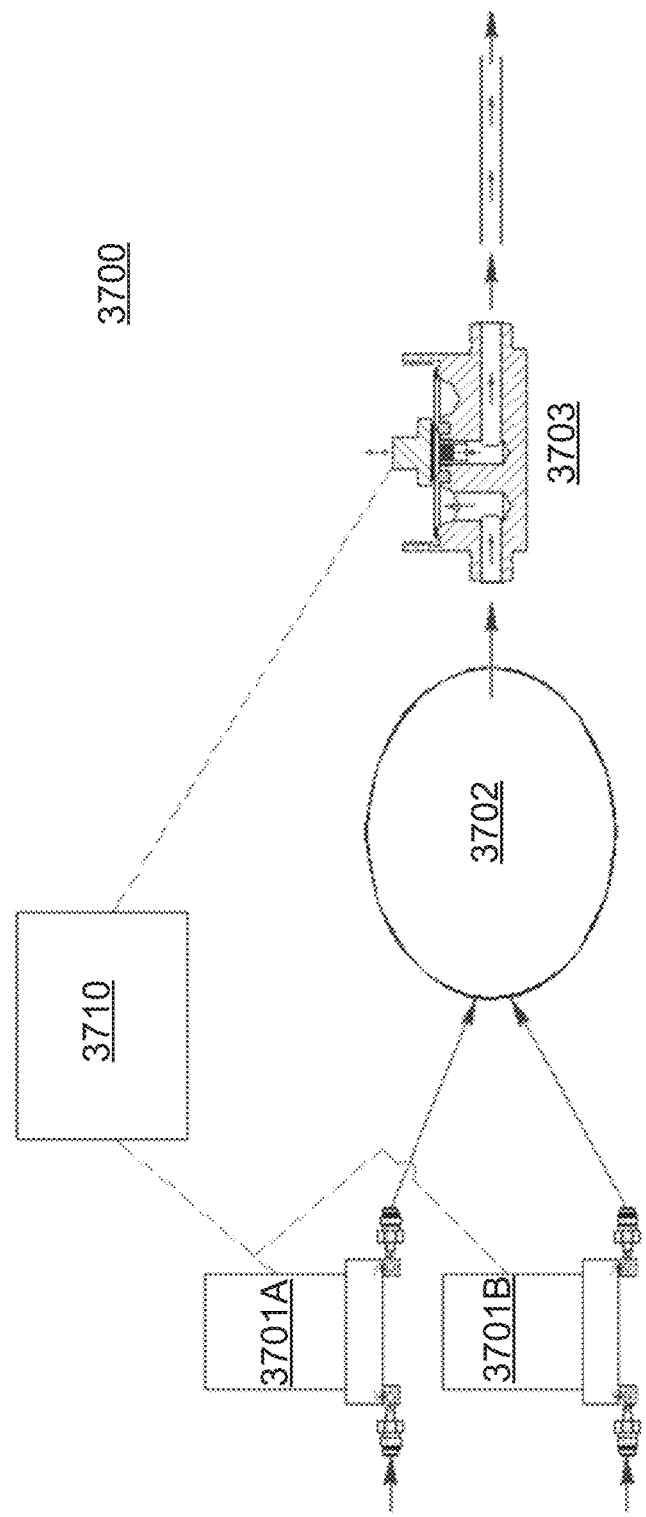
FIG. 22 is a schematic diagram illustrating a system to produce a square wave using a mixture of gases, according to one embodiment of the present invention.

FIG. 22 is a schematic diagram illustrating a system to produce a square wave of a gas mixture, according to one embodiment of the present invention. A first MFC 3701A and a second MFC 3702A are both connected to an accumulation volume 3702 feeding component 3703. A PCB 3710 controls the first and second MFCs 3701A,B. In one example, the first MFC 3701A feeds oxygen at a mass flow rate while the second MFC 3701B feeds nitrogen. The relative concentration of the two gases can be adjusted by controlling the relative set point sent to MFCs 3701A to 3701B by the PCB 3710.

Figure 23:
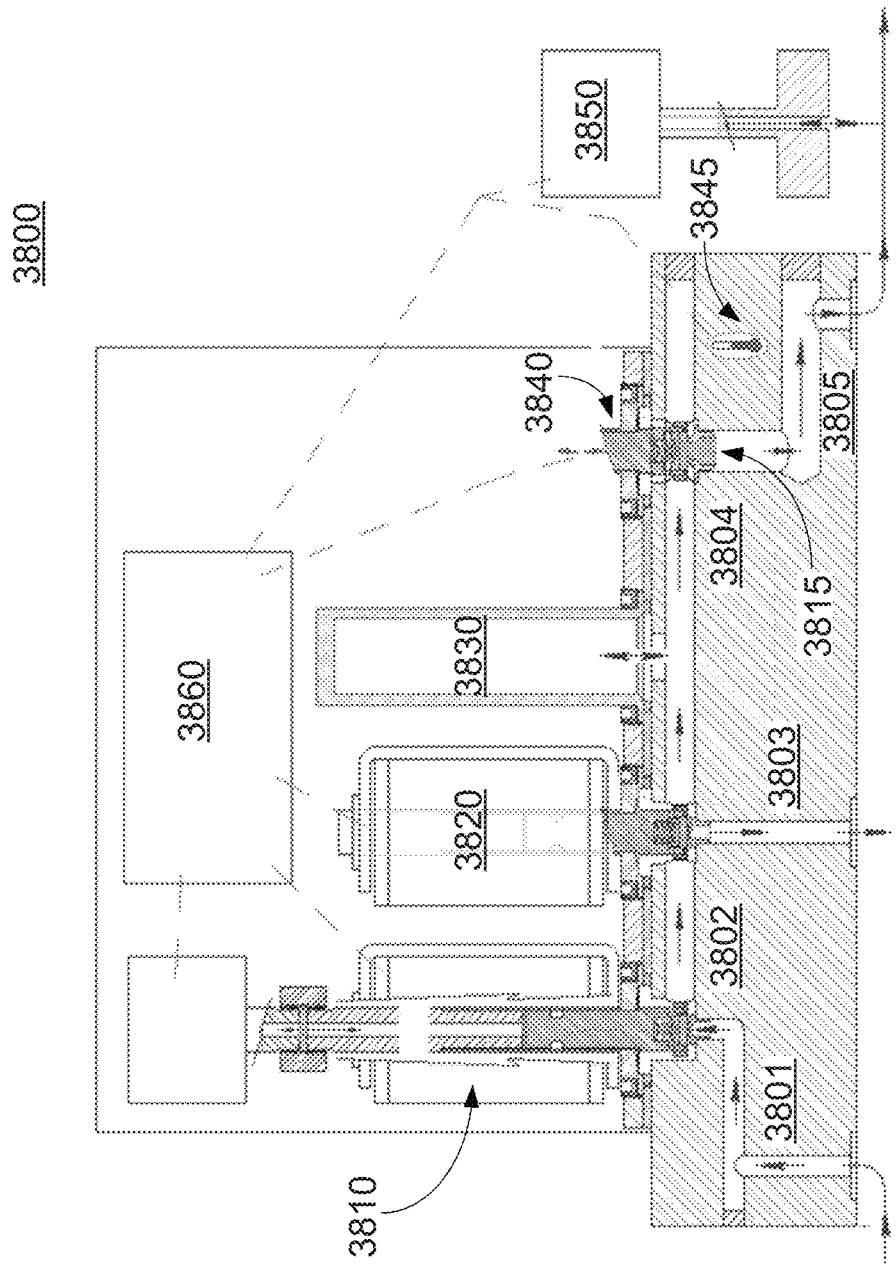
FIG. 23 is a more detailed schematic diagram illustrating an exemplary system to produce a square wave, with a relief valve and an accumulation chamber, according to one embodiment of the present invention.

FIG. 23 is a more detailed schematic diagram illustrating an example system 3800 to produce a square wave, according to one embodiment of the present invention.

The system 3800 includes an electronic regulator 3810 coupled by a first conduit section 3801 to a gas supply and coupled to a second conduit section 3802. A local pressure transducer, at the top of 3810, tracks pressure in the second conduit section 3802.

A relief valve 3820 is coupled to the second conduit portion 3802 and a third conduit portion 3803 and a fourth conduit portion 3804. The relief vale 3820 is an optional implementation for faster bleed off from an accumulation volume. Depending on the desired flow rate for the specific process, required output pressure in 3804 can vary widely, and the conduit portion 3803 can be activated to quickly send extra mass to a vacuum. When not needed, the relief valve 3820 can remain in a closed position.

An accumulation chamber 3830 is coupled to the fourth conduit portion 3804. The accumulation chamber 3830 adds to a total accumulation volume for improved performance, as described above. For example, the accumulation chamber 3830 can add 40 cc to an existing 4 cc that might be typical of the volume between the valve seats of 3810 and 3840. Time constant is a function of accumulation volume, albeit to a much lesser extent than time constant is a function of the impendence of the flow restrictor (which determines the pressure in the accumulation volume). For example, the square waves of FIG. 17B display approximately ⅕th the drop of the square waves of FIG. 17A, due to a fivefold increase in accumulation volume from 20 cc in FIG. 17A to 100 cc in FIG. 17B. Thus, additional accumulation volume can further increase a time constant as needed.

An on-off valve 3840 is coupled to the fourth conduit portion 3804 and to a fifth conduit portion 3805 that exhausts through a flow restrictor 3815 to the process and a downstream pressure transducer 3850, as described herein. In other embodiments, the flow restrictor 3815 is located upstream from the on-off valve 3840.

A PCB 3860 is electronically coupled to one or more of the electronic regulator 3810, the relief valve 3820, the on-off valve 3840, a temperature sensor 3845 and the downstream pressure transducer 3850. Note that the downstream pressure transducer 3850 may be needed for laminar and molecular flow restrictors but typically is not needed when using sonic restrictor.

Figure 24:
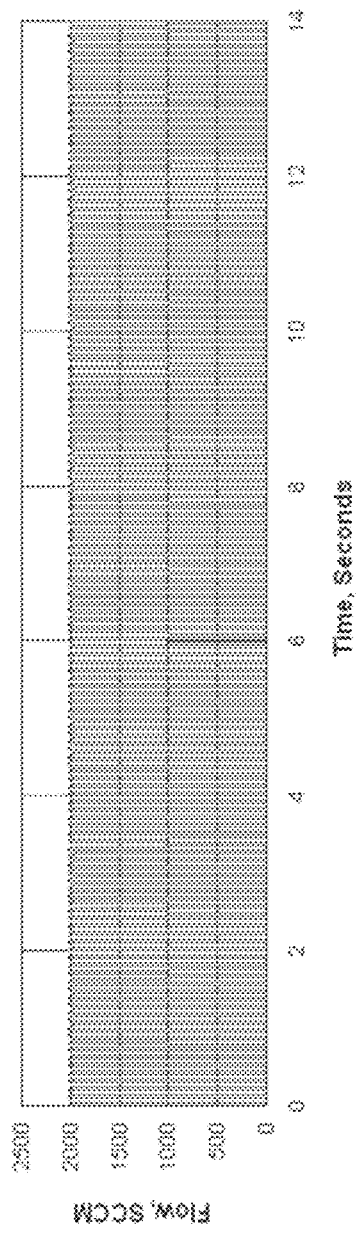
FIG. 24 shows graph with a series of square output waves produced by a gas delivery system with an electronic regulator versus a series of square output waves produced by a gas delivery system with an MFC, according to one embodiment of the present invention.
Figure 24:
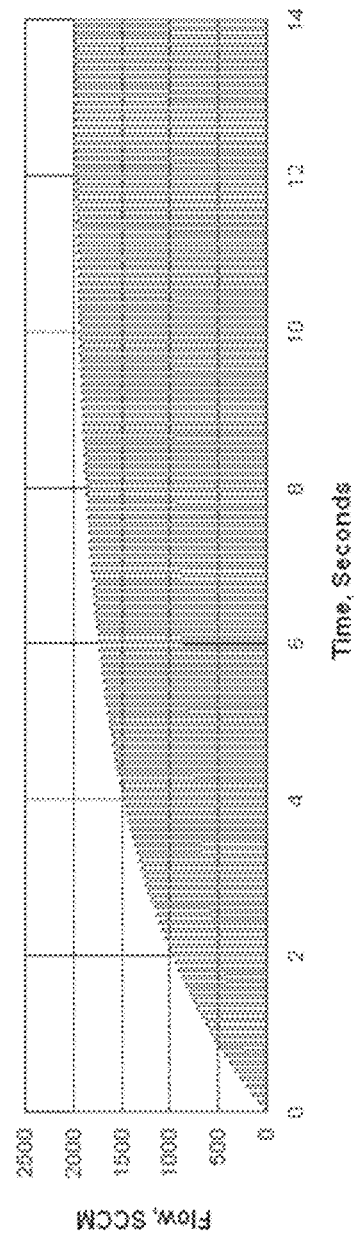

FIG. 24 shows a graph 3910 with a series of square output waves produced by a gas delivery system with an electronic regulator while graph 3920, whereas graph 3950 shows a series of square output waves produced by a gas delivery system with an MFC. As can be seen, an electronic regulator reaches a steady-state of output characteristics almost immediately while the MFC does not. Once the MFC reaches steady-state, the performance is similar. Some implementations may not have tolerance for the ramp up time of an MFC.

In some embodiments, a higher set point is initially given to an MFC so that pressure in the accumulation volume can reach steady-state more quickly. Once at steady-state, the set points are reduced to what is necessary to maintain the desired steady-state flow. The higher set points can be used for a predetermined amount of time, or alternatively, responsive to a pressure transducer coupled to measure pressure in the accumulation volume.

Section IV

The MFC typically functions as a subsystem within a larger capital equipment apparatus referred to as a tool. However, commercially available pressure based MFCs are slow to transition between gases or to transition from higher to lower flow rates of a single gas, particularly for lower full scale flow rated devices, because of space within conduits of MFCs that are depressurized during transitions (also known as an accumulation volume). Typical response times can be between 0.2 and 4.0 seconds. Response times longer than 4.0 seconds are typically not allowed on many applications as monitoring systems on some equipment alarm at 4 seconds. The smaller the device's full scale rating the slower the depressurization response time. The 4 second limit currently excludes devices with full scale flow rating 100 SCCM (standard cubic centimeter per minute) or below. This slow response either creates a bottleneck in semiconductor processing, particularly for ALD and 3D-IC processing and/or forces poorer accuracies on flow rates below 50 SCCM as larger full scale devices are used to avoid unacceptable response times. Other techniques such as natural bleed off are slower than desired. Additionally, downstream purging or diverting techniques can require undesirable hardware modifications or additions.

Of particular interest are the accumulation volumes in pressure based MFCs and flow measurement systems that delivery process gas at low flow rates. With smaller mass flows, the depressurization process of the accumulated volumes can slow down the transition of the MFC to an intolerable amount of time.

Therefore, what is needed is a robust technique in gas delivery apparatus to overcome the above shortcomings by evacuating process gas in an accumulation volume upstream of a characterized flow resistance to a non-process location.

Gas delivery apparatus, gas delivery methods, non-transitory computer-readable media with source code, for reversing gas flow from an accumulation volume for pressure regulation with fast pressure bleed down, are disclosed. One of ordinary skill in the art will recognize, given the below description, variations available to one of ordinary skill in the art, such as the application of these principles to fluid, or a mix of gasses and fluid, in an accumulation volume.

Fine chemical synthesis, pharmaceutical production, optical fiber processing, nano material manufacturing, and similar high purity fluid delivery applications will also benefit from the disclosed techniques. General industrial applications can also benefit where a single device can act as both a standard forward pressure regulator and a back pressure regulator thereby replacing the need for extra hardware and providing a cost reduction.

Figure 25:
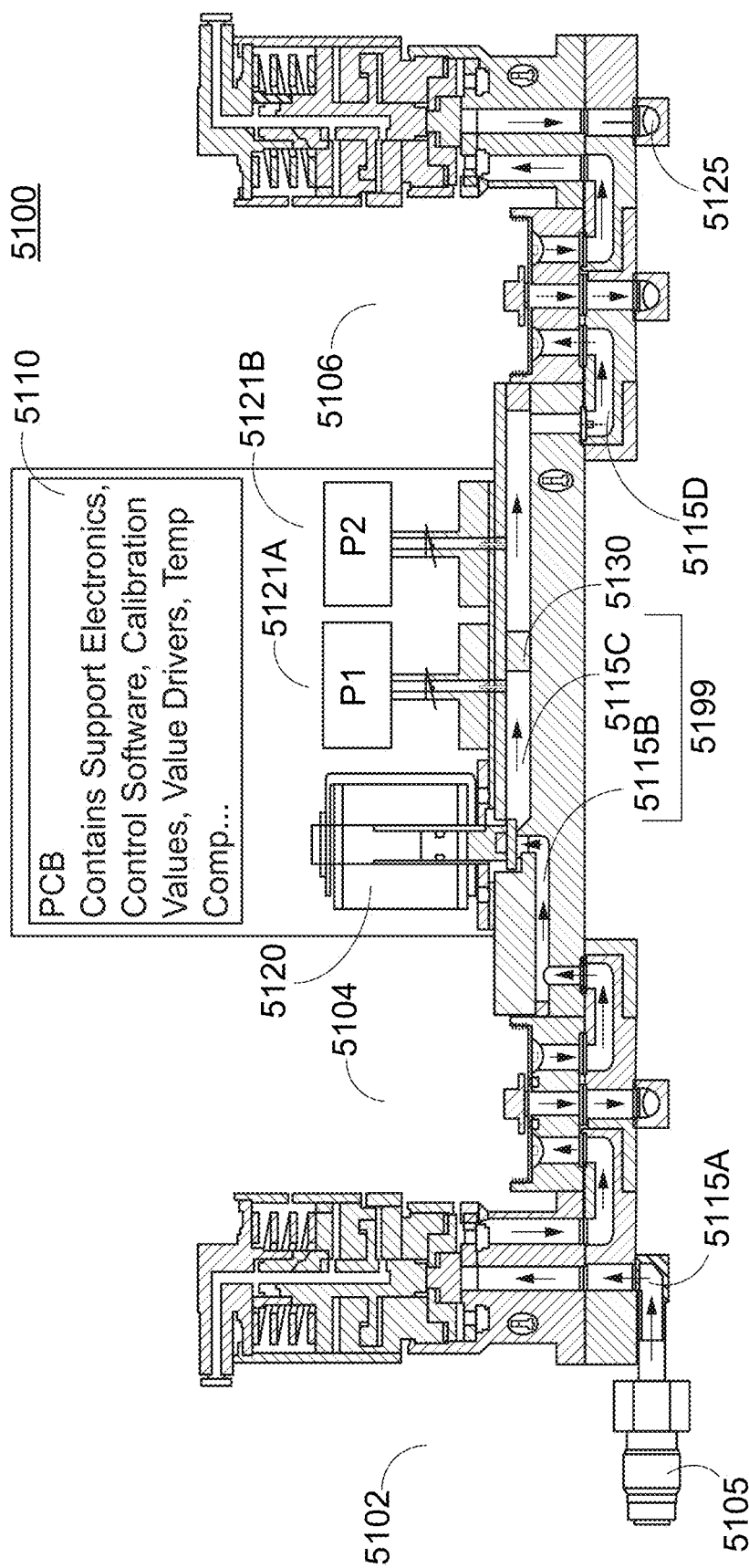
FIG. 25 is a perspective diagram illustrating a gas delivery apparatus utilizing a reverse flow mode for fast bleed down of an accumulated volume, according to one embodiment.

I. Gas Delivery Apparatus using Both Forward and Reverse Flow Mode for Pressure Regulation of an Accumulation Volume FIG. 25 is a perspective diagram illustrating a gas delivery apparatus 5100 utilizing a reverse flow mode for fast bleed down of an accumulation volume 5199, according to one embodiment. The gas delivery apparatus 5100 can be, for example, an MFC, a flow node and associated hardware, or the like. In one example, a low flow MFC delivers oxygen or nitrogen to a semiconductor fabrication process in a clean room. A flow path of the gas delivery apparatus 5100 includes a conduit inlet 5105 receiving downstream to conduits 5115A-D, accordingly, and exhausting downstream to a process at a conduit outlet 5125. A preferred embodiment of the gas delivery apparatus 5100 involves low flow gas delivery which can be characterized as less than 5100 SCCM (standard cubic centimeters per minute) or approximately 4/1000 chemical mole per minute. Although gas is referred to throughout the description for simplicity, some embodiments handle liquid or a dynamic mixture of gas and liquid (e.g., droplets). Some embodiments comprise more than one characterized restrictor for wider dynamic accuracy (e.g., in a parallel configuration).

An accumulated (accumulation) volume includes at least a portion of space within the conduit 5115C between a proportional valve 5120 and a characterized restrictor 5130. A pressure transducer 5121A measures an associated pressure (i.e., pressure P1 in volume V1). Some embodiments also include space within the conduit 5115B upstream of the proportional valve 5120. Spacing within and between components can also be included. FIGS. 28A and 28B show an abstraction of the gas delivery apparatus 5100 including the accumulated volume 5199 (P1 volume). However, space within the upstream conduit 5115A and the downstream conduit 5115D can be effectively separated from the accumulated volume 5199 and considered as a second accumulated volume and have a different pressure as measured by a second pressure transducer 5121B (i.e., volume V2 held at pressure P2). A second downstream cycle purge valve 5106 can be used to regulate pressure within the second accumulated volume of conduit 5115D. In some cases, the second accumulated volume does affect pressurization of the first accumulated volume 5199. The conduits 5115A-D can be any suitable tubing or plumbing, either rigid or flexible, to deliver gas (or fluid) to the next stage. The conduits 5115A-D can have a diameter of, for example, ¼ inch.

An electronic regulator (or electronic pressure regulator) 5110 communicatively couples to a valve system and the proportional valve 5120. Based on inputs of set points and sensor feedback (e.g., from pressure transducer 5121A), commands are sent from the electronic regulator 5110 to the valve system to open or close valves. Also commands can be sent to the proportional valve 5120 which can further open, further close, or stop adjustments. When sensor feedback indicates that the accumulated volume pressure is too low, a forward flow mode is implemented to intake a mass of the process gas with a downstream flow (e.g., by opening the proportional valve 5120). When sensor feedback indicates that the accumulated volume pressure is near a target range, a halt or rate reduction is implemented (e.g., by stopping or slowing down adjustments of the proportional valve 5120). Finally, when sensor feedback indicates that the accumulated volume pressure is too high, some embodiments implement a reverse flow mode to evacuate a mass of the process gas (e.g., by closing the gas supply shut-off valve 5102, opening the upstream cycle purge valve 5104, and controlling the proportional valve 5120). In some embodiments, a control system of the electronic regulator 5110 may function in the forward flow mode as a standard pressure reducing regulator and may function in the reverse flow mode as a back pressure regulator. In both instances the electronic regulator 5110 will actively adjust and control the pressure in the accumulated volume 5199 according to inputs of set points and sensor feedback.

The electronic regulator 5110 can switch modes periodically or in near real-time responsive to changing inputs. In some implementations, the electronic regulator 5110 may switch control strategy responsive to more inputs than just pressure. For example, a flow command below a threshold can require a relatively large accumulation volume pressure drop, or a pressure drop in a short amount of time (i.e., short bleed down time), accomplished by resorting to the reverse flow mode. In such a situation the electronic regulator 5110 may close the gas supply shut-off valve 5102, open the upstream cycle purge valve 5104, and set the proportional valve 5120 to a fully open condition (not subject to customary PID control) to quickly achieve a desired large pressure drop. Another example involves switching from one type of gas to another in which the entire accumulated volume is bled. Still another embodiment factors in temperature feedback from sensors for additional control functions. A more detailed view of the electronic regulator 5110 is set forth below with respect to FIGS. 26-27.

The valve system of FIGS. 25, 28A and 28B may be controlled by a controller of the electronic regulator 5110 to implement the forward and reverse flow modes, as shown in FIGS. 28A and 28B. In the forward flow mode of FIG. 28A, a gas supply valve 5102 can be opened and a purge valve 5104 closed. This arrangement allows pressure to build up behind the proportional valve 5120 upstream for pressurizing the accumulation volume 5199 as the proportional valve 5120 is further opened. However, in the reverse flow mode of FIG. 28B, the gas supply valve 5102 can be closed and the purge (or dump) valve 5104 opened. This depressurizes space in the conduit 5115B held behind the proportional valve 5120 notionally upstream of the accumulated volume. As the proportional valve 5120 further opens, reverse flow from the accumulated volume transits into the open purge valve 5104 which evacuates gas to a non-process location using a vacuum pump. Additional valves are possible (e.g., outlet valve 5108). Alternatively, the semiconductor capital equipment tool (not shown), within which the gas delivery apparatus 5100 is installed, may control the configuration of the supply valve 5102 and the purge valve 5104 while adjusting set point commands to the electronic regulator 5110 and thereby directing suitable control of the proportional valve 5120 to implement the forward and reverse flow modes.

The proportional valve 5120, responsive to the electronic regulator 5110, may function as the primary adjustable control element in both the forward and reverse flow modes. To enable control of flow in both the forward and reverse flow modes the proportional valve 5120 is located within a conduit upstream of the accumulated volume 5199 and downstream from both the gas supply line valve 5102 that supplies the process gas and the purge line valve 5104 that evacuates process gas.

A characterized restrictor 5130 impedes (or resists) the process gas from exhausting in accordance with component sizing. Specific impedance characteristics are designed by sizing components therein. In one embodiment, the accumulated volume exists in a space downstream of the proportional valve 5120 and upstream of the characterized restrictor 5130. In other words, the characterized restrictor 5130 can effectively separate the accumulated volume from an exhaust pathway. Another embodiment includes the space upstream of the proportional valve 5120. Generally, various aggregates of conduit space and/or spacing within components can contribute to the accumulated volume. As the accumulation volume pressurizes or depressurizes, a resulting mass flow rate increases and decreases. In an embodiment, the characterized restrictor 5130 further comprises a valve seat and poppet or other valve and seat mechanisms.

Figure 26:
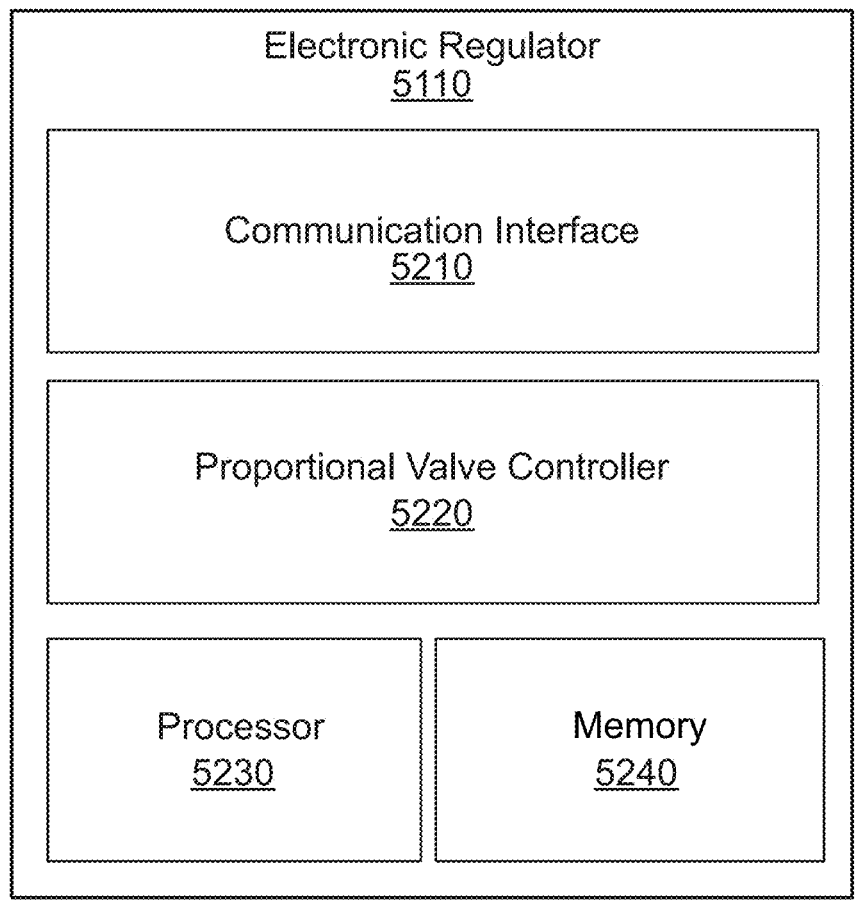
FIGS. 26-27 are a more detailed block diagram illustrating a view of an electronic regulator of a gas delivery apparatus, according to an embodiment.
Figure 27:
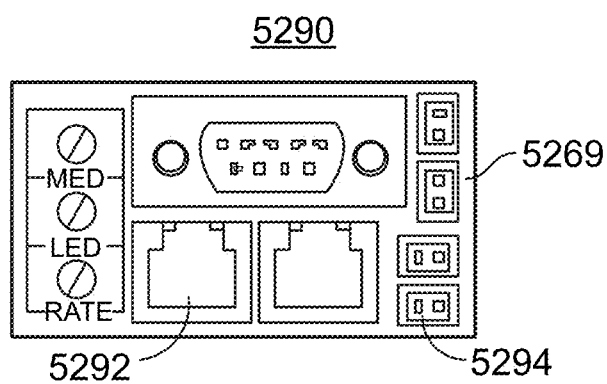

FIG. 26-27 are block diagrams illustrating a view of an electronic regulator of a gas delivery apparatus, according to an embodiment. The electronic regulator 5110 comprises a communication interface 5210, a proportional valve controller 5220, a processor 5230 and a memory 5240.

The communication interface 5210 receives data used for determination of forward and reverse flow modes, and sends data for adjustment of the proportional valve 5120. The received data can include external set points that define a desired mass flow rate for delivery of the process gas to the semiconductor process. Additional received data can be pressure sensor and/or temperature sensor feedbacks. Other embodiments of the communication interface 5210 involve sending and receiving data that is only peripherally related to determination of forward and reverse flow modes, as well as unrelated data.

The communication interface 5210 comprises hardware and/or software. Hardware can be male or female connections for inputs and/or outputs, such as a serial port, a parallel port, a USB port, a FireWire port, an IEEE 802.11 Wi-Fi radio, an Ethernet port, a Bluetooth radio, a radio jack, radios, or any other appropriate port capable of electrical or electro-magnetic signaling. The software can include network communication modules, operation systems, applications, daemons, coders, decoders, memory, source code, and any other appropriate aspects of communication, stored on a non-tangible computer readable media For example, detail 5290 illustrates a schematic of various ports used for communication in an embodiment. An R45 jack 5292 provides an Ethernet receptacle for connecting to an enterprise network for remotely sending external set points from a controller computer. A signaling port 5294 connects to a proportional valve for sending control signals for further opening, further closing, and stop, for instance. Another signaling port 5296 receives pressure and/or temperature sensor feedback. Other ports are available for other types of connections, such as a direct connection from an administrator.

The proportional valve controller 5220, responsive to the external set points, may determine whether to operate in a forward mode or a reverse mode for meeting a target pressure in an accumulated volume, and perform algorithms for PID valve control and flow calculations based in part upon existing sensed conditions. In forward mode the process gas flows in a usual downstream direction through an electronic regulator into an accumulated volume. In reverse mode the process gas flows in an unusual locally upstream direction through the electronic regulator out of the accumulated volume.

The processor 5230 can be, without limitation, a microprocessor, a customized ASIC, or any appropriate mechanism for executing source code, in accordance with embodiments described herein. For example, the processor 5230 can detect when a threshold has been exceeded leading to the reverse flow mode. Also, the processor 5230 can map specific commands from external set points.

The memory 5240 can be, without limitation, RAM, ROM, cache, virtualized memory, queues, instruction stacks, flash memory, or any appropriate hardware and/or software for storing source code, values, and the like, in accordance with embodiments described herein.

Figure 29:
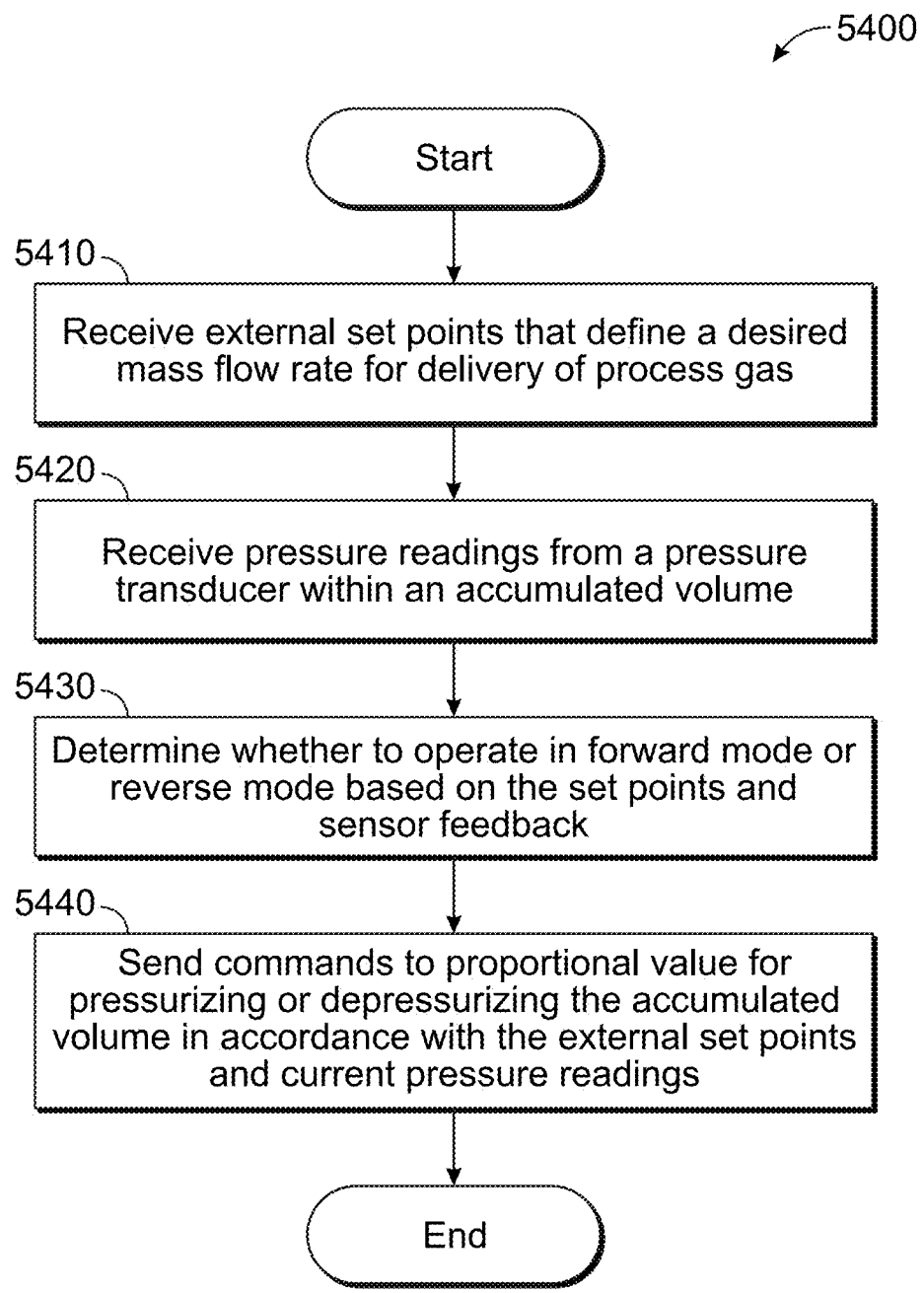
FIG. 29 is a flowchart diagram illustrating a method for utilizing a reverse flow mode for fast bleed down of an accumulated volume, according to an embodiment.

II. Methods for using Reverse Flow Mode for Pressure Regulation of an Accumulated Volume FIG. 29 is a flowchart diagram illustrating a method 5400 for utilizing a reverse flow mode for fast bleed down of an accumulated volume, according to an embodiment of the present invention. In one case, the method 5400 is implemented in the electronic regulator 5110 of the system 5100 of FIG. 25, and in other cases, is implemented in alternative systems. Further, the order of steps can be interchanged, and there can be more or less steps than shown in implementations.

External set points that define a desired mass flow rate for delivery of process gas are received (step 5410). Pressure readings are received from a pressure transducer within an accumulated volume (e.g., periodically or on demand) (step 5420). Other sensor feedback can include temperature readings. Next, it is determined whether to operate a proportional valve in forward mode or reverse mode based on the set points and sensor feedback (step 5430). In turn, commands are sent to the proportional valve for pressurizing or depressurizing the accumulated volume in accordance with the set points and current pressure readings (step 5440).

Figure 30:
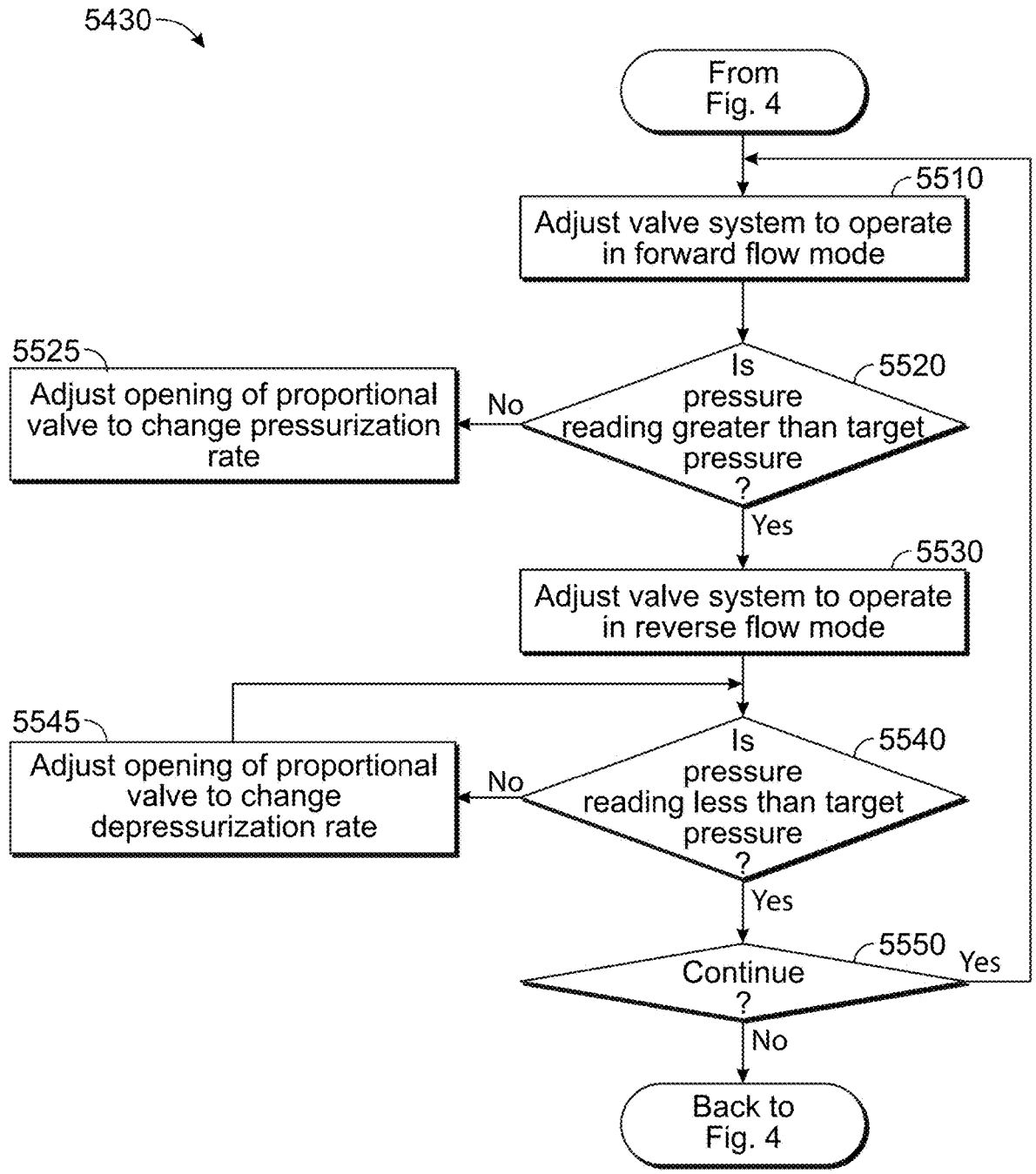
FIG. 30 is a more detailed flowchart diagram illustrating a step of transitioning from a forward flow mode to a reverse flow mode, according to an embodiment.

FIG. 30 is a more detailed flowchart diagram illustrating a step 5430 of transitioning from a forward flow mode to a reverse flow mode, according to an embodiment of the present invention. The step 5430 can be implemented, without limitation, in the proportional valve controller 5220 of the electronic regulator 5110 of FIG. 26.

A valve system initially operates in forward flow mode (step 5510). Based on pressure readings received from a pressure transducer, it is determined whether the pressure reading is greater than a target pressure (step 5520). If the pressure is greater, the valve system is adjusted to operate in reverse flow mode (step 5530). If the pressure is not greater, an opening of the proportional valve can optionally be adjusted as needed (e.g., further opened, further closed, or halted) (step 5525).

If the pressure reading is less than the target pressure while operating in a reverse flow mode (step 5540), and the process continues (step 5550), the valve system is adjusted to operate in the forward flow mode (step 5510). On the other hand, if the pressure is not less than the target pressure, the proportional valve opening can be optionally adjusted to change the depressurization rate (step 5545).

Figure 31:
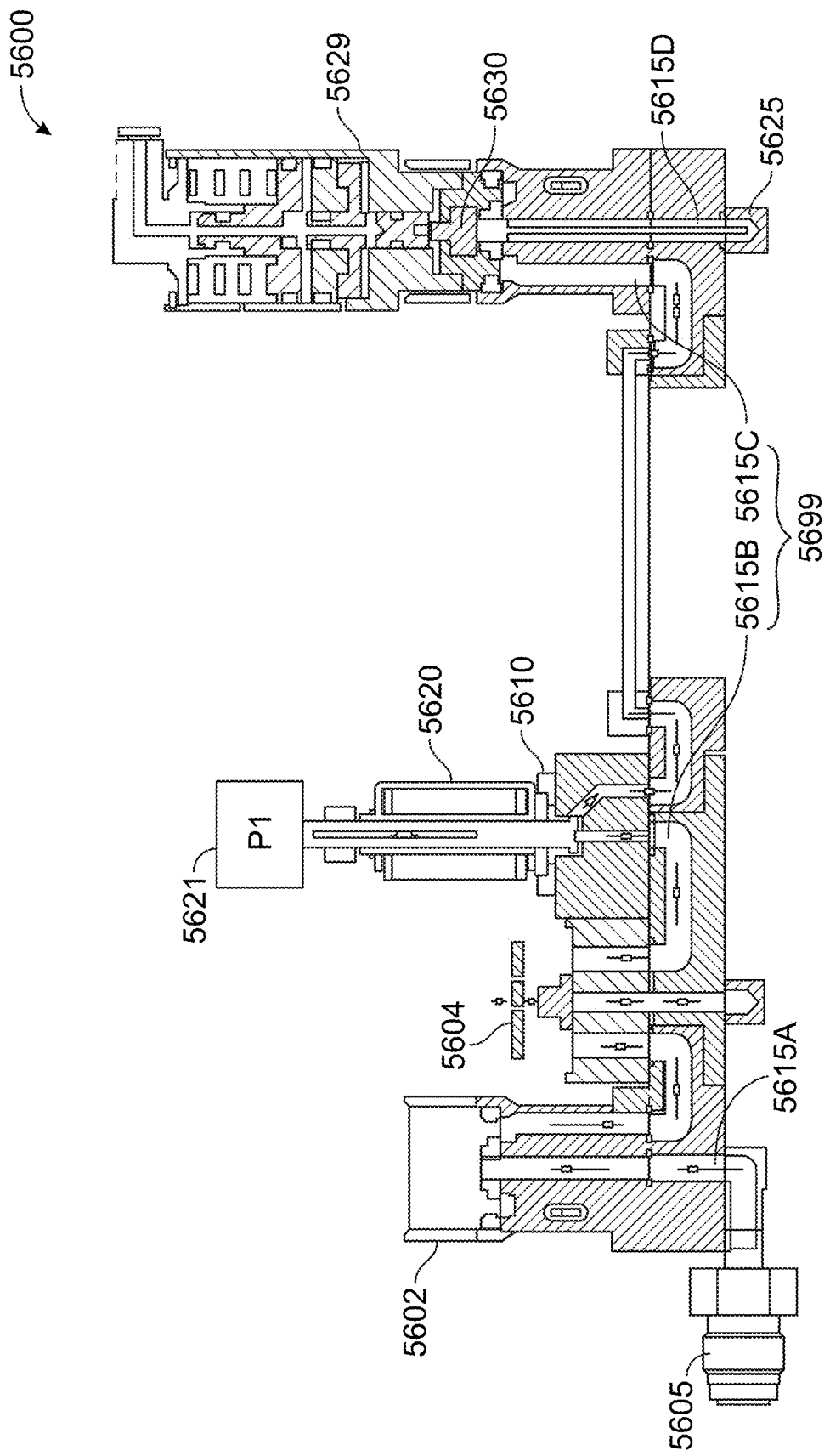
FIG. 31 is a perspective diagram illustrating a gas delivery apparatus utilizing a reverse flow mode for fast bleed down of an accumulated volume, according to an embodiment.

FIG. 31 is a perspective diagram illustrating a gas delivery apparatus 5600 utilizing a reverse flow mode for fast bleed down of an accumulation volume 5699, according to another alternative embodiment. The gas delivery apparatus 5600 may be used to provide controlled delivery of a reactant to a semiconductor manufacturing process, for example. The illustrated alternative gas delivery apparatus 5600 includes a gas supply shut-off valve 5602, an upstream cycle purge valve 5604, an electronic pressure regulator 5610, and a flow node 5629. A flow path of the alternative gas delivery apparatus 5600 includes a conduit inlet 5605 receiving downstream to conduits 5615A-D, accordingly, and exhausting downstream to a process at a conduit outlet 5625. A preferred embodiment of the gas delivery apparatus 5600 involves low flow gas delivery which can be characterized as less than 5100 SCCM (standard cubic centimeters per minute) or approximately 4/1000 chemical mole per minute. Some alternative embodiments comprise more than one flow node for wider dynamic accuracy (e.g., in a parallel configuration).

An accumulated (accumulation) volume 5699 includes at least a portion of space within the conduit 5615B between the gas supply shut-off valve 5602 and the electronic pressure regulator 5610 combined with at least a portion of space within the conduit 5615C between the electronic pressure regulator 5610 and a flow node 5629. The electronic pressure regulator 5610 includes a pressure transducer 5621 which measures an associated pressure and also a proportional valve 5620. Spacing within and between components may also be included in consideration of the accumulated volume 5699. The flow node 5629 includes a characterized restrictor 5630 in series and directly adjacent with a valve seat and diaphragm which together may function as a downstream outlet shut-off valve. The illustrated gas delivery apparatus 5600 has a form factor comprising decentralized components making up a gas stick using a flow node and associated electronic regulator, sensors and control system, as opposed to the gas stick of FIG. 25. The alternative gas delivery apparatus 5600 illustrates use of metallic tubing and machined surface mount fluid delivery substrates as known in the semiconductor capital equipment industry.

A process control system (not shown) may use the gas delivery apparatus 5600 in a forward flow mode in the following manner. Process gas enters through the inlet conduit 5605 and passes through the gas supply valve 5602 into the conduit 5615B upstream of the electronic pressure regulator 5610 while the upstream cycle purge valve 5604 is in a closed condition. A target pressure set point is provided by the process control system to the electronic pressure regulator 5610 based at least in part upon a desired mass flow rate to be provided to the process by the flow node 5629. The electronic pressure regulator 5610 includes the pressure transducer 5621 which measures a pressure within the conduit 5615C upstream of the flow node 5629, and adjusts the proportional valve 5620 to keep the measured pressure approximately equal to the target pressure (opening the proportional valve 5620 more if the measured pressure is too low or reducing the opening of the proportional valve 5620 if the pressure is too high). Process gas flows from the conduit 5615C upstream of the flow node 5629, into the flow node 5629, and through the characterized restrictor 5630 and exhausting downstream to a process at a conduit outlet 5625.

The process control system (not shown) may in the following manner use the gas delivery apparatus 5600 in a reverse flow mode in response to inputs. Changing to reverse flow mode may be done when needing a fast reduction of gas delivery flow rate, for example. The gas supply valve 5602 is placed into a closed condition and the upstream cycle purge valve 5604 is placed into an open condition thereby connecting the conduit 5615B upstream of the electronic pressure regulator 5610 to a vacuum suction (sink) thereby reversing the flow supplied to the electronic pressure regulator 5610 and rapidly reducing the supplied process gas pressure. Strategies for removing process gas from the conduit 5615C between the electronic pressure regulator 5610 and the flow node 5629 may depend upon design of the electronic pressure regulator 5610. For example, temporarily providing a large target pressure set point to the electronic regulator 5610 will cause a forward pressure regulator control system to further open the proportional valve 5620 thereby allowing process gas to reverse flow leaving the conduit 5615C and pass into the vacuum suction (sink) through the cycle purge valve 5604. Alternatively, the electronic pressure regulator 5610 may be reconfigurable to operate in a back pressure regulation mode. In such instance the process control system may provide a new reduced target pressure set point to the reconfigured pressure regulator 5610 whereby the pressure transducer 5621, which measures a pressure within the conduit 5615C upstream of the flow node 5629, provides local feedback and the reconfigured electronic pressure regulator 5610 adjusts the proportional valve 5620 to keep the measured pressure approximately equal to the target pressure (reducing the opening of the proportional valve 5620 if the measured pressure is too low or increasing the opening of the proportional valve 5620 if the pressure is too high).

Figure 32:
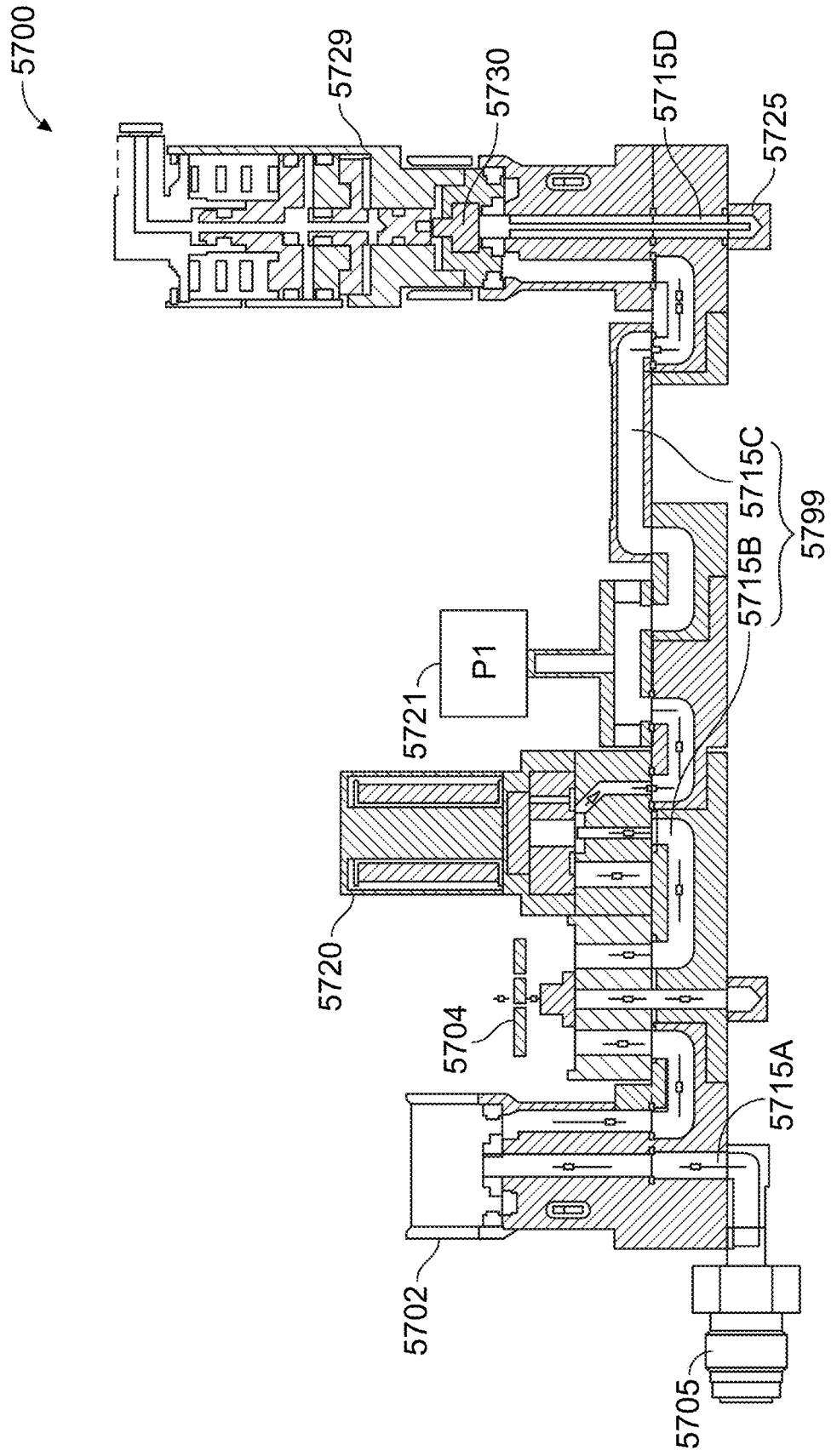
FIG. 32 is a perspective diagram illustrating a gas delivery apparatus utilizing a reverse flow mode for fast bleed down of an accumulated volume, according to an embodiment.

FIG. 32 is a perspective diagram illustrating a gas delivery apparatus 5700 utilizing a reverse flow mode for fast bleed down of an accumulation volume 5799, according to yet another embodiment. The gas delivery apparatus 5700 may be used to provide controlled delivery of a reactant to a semiconductor manufacturing process, for example. The illustrated another gas delivery apparatus 5700 includes a gas supply shut-off valve 5702, an upstream cycle purge valve 5704, a control valve 5720, a pressure transducer 5721, and a flow node 5729. A flow path of the alternative gas delivery apparatus 5700 includes a conduit inlet 5705 receiving downstream to conduits 5715A-D, accordingly, and exhausting downstream to a process at a conduit outlet 5725. A preferred embodiment of the gas delivery apparatus 5700 involves low flow gas delivery which can be characterized as less than 100 SCCM (standard cubic centimeters per minute) or approximately 4/1000 chemical mole per minute. Some alternative embodiments comprise more than one flow node for wider dynamic accuracy (e.g., in a parallel configuration).

An accumulated (accumulation) volume 5799 includes at least a portion of space within the conduit 5715B between the gas supply shut-off valve 5702 and the control valve 5720 combined with at least a portion of space within the conduit 5715C between the pressure transducer 5721 and a flow node 5729. Spacing within and between components may also be included in consideration of the accumulated volume 5799. The flow node 5729 includes a characterized restrictor 5730 in series and directly adjacent with a valve seat and diaphragm which together may function as a downstream outlet shut-off valve. The illustrated gas delivery apparatus 5700 has a form factor comprising decentralized components making up a gas stick using a flow node and associated valves, sensors and control system, as opposed to the gas stick of FIG. 25. The alternative gas delivery apparatus 5700 illustrates use of metallic tubing and machined surface mount fluid delivery substrates as known in the semiconductor capital equipment industry.

A process control system (not shown) may use the gas delivery apparatus 5700 in a forward flow mode in the following manner. Process gas enters through the inlet conduit 5705 and passes through the gas supply valve 5702 into the conduit 5715B upstream of the control valve 5720 while the upstream cycle purge valve 5704 is in a closed condition. A target pressure set point may be calculated by the process control system based at least in part upon a desired mass flow rate to be provided to the process by the flow node 5729. Signals from the pressure transducer 5721, which measures a pressure within the conduit 5715C upstream of the flow node 5729, are used by the process control system to determine adjustments to the proportional valve 5720 intended to keep the measured pressure approximately equal to the target pressure (opening the proportional valve 5720 more if the measured pressure is too low or reducing the opening of the proportional valve 5720 if the pressure is too high). Process gas flows from the conduit 5715C upstream of the flow node 5729, into the flow node 5729, and through the characterized restrictor 5730 and exhausting downstream to a process at a conduit outlet 5725.

The process control system (not shown) may in the following manner use the gas delivery apparatus 5700 in a reverse flow mode in response to inputs. Changing to reverse flow mode may be done when needing a fast reduction of gas delivery flow rate, for example. The gas supply valve 5702 is placed into a closed condition and the upstream cycle purge valve 5704 is placed into an open condition thereby connecting the conduit 5715B upstream of the control valve 5720 to a vacuum suction (sink) thereby reversing the flow supplied to the control valve 5720 and rapidly reducing the supplied process gas pressure. Strategies for removing process gas from the conduit 5715C between the control valve 5720 and the flow node 5729 may depend upon the inputs which led to use of the reverse flow mode. For example, the process control system may maximally open the proportional valve 5720 thereby allowing process gas to very rapidly reverse flow leaving the conduit 5715C and pass into the vacuum suction (sink) through the cycle purge valve 5704. Alternatively, the process control system may calculate a new reduced target pressure set point and adjust the proportional valve 5720 to keep the measured pressure approximately equal to the new reduced target pressure (reducing the opening of the proportional valve 5720 if the measured pressure is too low or increasing the opening of the proportional valve 5720 if the pressure is too high).

While the invention has been described with respect to specific examples, those skilled in the art will appreciate that there are numerous variations and permutations of the above described invention. It is to be understood that other embodiments may be utilized and structural and functional modifications may be made without departing from the scope of the present invention. Thus, the spirit and scope should be construed broadly as set forth in the appended claims.

What is claimed is:

1. A system for controlling the delivery of a process gas comprising:
   a first mass flow device comprising:
     a substrate block comprising an inlet conduit and an outlet conduit;
     a proportional valve comprising a first valve body mounted to the substrate block and fluidly connected to the inlet conduit;
     a characterized restrictor fluidly connected to the proportional valve and the outlet conduit; and
     a valve comprising a second valve body mounted to the substrate block and fluidly coupled between the proportional valve and the outlet conduit;
   a pressure transducer isolated from the substrate block and downstream of the outlet conduit of the first mass flow device.

2. The system of claim 1 wherein the pressure transducer is accessed by one or more mass flow devices.

3. The system of claim 1 further comprising a printed circuit board.

4. The system of claim 3 wherein the printed circuit board receives signals from the pressure transducer.

5. The system of claim 1 wherein the pressure transducer outputs an analog signal.

6. The system of claim 1 wherein the pressure transducer outputs a digital signal.

7. The system of claim 1 further comprising a second mass flow device, the first and second mass flow devices accessing the pressure transducer.

8. A system for processing articles comprising:
   a first flow controller comprising a first printed circuit board, a first inlet conduit, a first outlet conduit, a first proportional valve fluidly coupled to the first inlet conduit, and a first characterized restrictor coupled between the first proportional valve and the first outlet conduit;
   a second flow controller comprising a second printed circuit board, a second inlet conduit, a second outlet conduit, a second proportional valve fluidly coupled to the second inlet conduit and a second characterized restrictor coupled between the second proportional valve and the second outlet conduit, the first and second outlet conduits fluidly connected;
   a pressure transducer fluidly connected to the first and second outlet conduits;
   wherein measurements from the pressure transducer are received by the first printed circuit board and the second printed circuit board.

9. The system of claim 8 wherein the first flow controller comprises a first substrate block, the first inlet conduit and the first outlet conduit formed within the first substrate block.

10. The system of claim 9 wherein the second flow controller comprises a second substrate block, the second inlet conduit and the second outlet conduit formed within the second substrate block.

11. The system of claim 10 wherein the pressure transducer is coupled to the first substrate block and is isolated from the second substrate block.

12. The system of claim 8 further comprising a manifold fluidly coupling the first outlet conduit, second outlet conduit, and the pressure transducer.

13. The system of claim 8 further comprising a tool controller electrically coupled to the pressure transducer.

14. The system of claim 13 wherein the tool controller communicates the measurements from the pressure transducer to the first and second printed circuit boards.

15. A system for processing articles comprising:
   a first flow controller comprising a first substrate block, a first proportional valve mounted to the first substrate block, a first inlet conduit, a first characterized restrictor, a first outlet conduit, and a pressure transducer mounted to the first substrate block and fluidly connected to the first outlet conduit, the pressure transducer fluidly connected between the first outlet conduit and the first characterized restrictor;
   a second flow controller comprising a second substrate block, a second proportional valve mounted to the second substrate block, a second inlet conduit, a second characterized restrictor, and a second outlet conduit, the second characterized restrictor located between the second proportional valve and the second outlet conduit, the first and second outlet conduits fluidly connected, the pressure transducer fluidly connected to the second outlet;

wherein measurements from the pressure transducer control operation of the first and second proportional valves; and wherein the second flow controller is free of pressure transducers between the second characterized restrictor and the second outlet conduit.

16. The system of claim 15 further comprising a tool controller electrically coupled to the pressure transducer.

17. The system of claim 16 wherein the first flow controller further comprises a printed circuit board and the second flow controller further comprises a printed circuit board, the printed circuit boards of the first and second flow controllers receiving measurements from the tool controller.

18. The system of claim 15 wherein the first flow controller further comprises a valve mounted to the first substrate block, the valve fluidly coupled between the first proportional valve and the outlet conduit.

19. The system of claim 15 wherein the measurements from the pressure transducer are transmitted directly from the first flow controller to the second flow controller.

20. The system of claim 15 wherein the first inlet conduit and the first outlet conduit are formed in the first substrate block and the second inlet conduit and the second outlet conduit are formed in the second substrate block.

* * * * *